United States Patent
Yamaura et al.

(10) Patent No.: US 8,523,500 B2
(45) Date of Patent: Sep. 3, 2013

(54) MACHINE TOOL INCLUDING A Z-TABLE AND PROCESSING SPINDLE ROTATABLY SUPPORTED ON A ROTATION ARM

(75) Inventors: Yuki Yamaura, Utsunomiya (JP);
Tatsuya Koizumi, Utsunomiya (JP);
Taro Nakamura, Utsunomiya (JP);
Katsumune Inaki, Utsunomiya (JP);
Motoki Uchikawa, Utsunomiya (JP);
Kouichi Tanizaki, Utsunomiya (JP);
Shugo Arakawa, Utsunomiya (JP);
Tatsuhiko Tanaka, Utsunomiya (JP);
Tomoyoshi Miyagi, Utsunomiya (JP);
Takayuki Motojima, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1368 days.

(21) Appl. No.: 12/281,201

(22) PCT Filed: Mar. 2, 2007

(86) PCT No.: PCT/JP2007/054076
§ 371 (c)(1),
(2), (4) Date: Aug. 29, 2008

(87) PCT Pub. No.: WO2007/102435
PCT Pub. Date: Sep. 13, 2007

(65) Prior Publication Data
US 2009/0053004 A1     Feb. 26, 2009

(30) Foreign Application Priority Data

| Mar. 3, 2006 | (JP) | 2006-057078 |
| Mar. 3, 2006 | (JP) | 2006-057577 |
| Mar. 28, 2006 | (JP) | 2006-089300 |
| Apr. 17, 2006 | (JP) | 2006-113709 |
| May 11, 2006 | (JP) | 2006-132505 |
| May 11, 2006 | (JP) | 2006-132509 |
| May 11, 2006 | (JP) | 2006-132544 |

(51) Int. Cl.
*B23P 23/02* (2006.01)

(52) U.S. Cl.
USPC ............... 409/211; 409/206; 409/235; 29/40

(58) Field of Classification Search
USPC ............. 409/201, 216, 235, 211; 483/39–40, 483/48, 54–56; 408/236; 29/40
See application file for complete search history.

(56) References Cited

U.S. PATENT DOCUMENTS 2,227,410 A * 12/1940 Johnson ......................... 409/211
3,277,568 A * 10/1966 Wetzel ................................ 483/9

(Continued)

FOREIGN PATENT DOCUMENTS

DE  19860709 A1  2/2001
EP  1285721 A1   2/2003

(Continued)

OTHER PUBLICATIONS

Machine Translation JP 10034461, which JP 10034461 was published Feb. 1998.*

*Primary Examiner* — David Bryant
*Assistant Examiner* — Jason L Vaughan
(74) *Attorney, Agent, or Firm* — Rankin, Hill & Clark LLP

(57) ABSTRACT

A machine tool has a Z table sliding in the Z direction in a horizontal plane, a support body provided on the Z table and sliding in the vertical direction, a rotation arm supported at the support body and endlessly rotatable in a vertical plane facing work, an arm motor for rotating the rotation arm, a processing spindle rotatably supported and placed at a position of a distance R from the center C of rotation of the rotation arm, and a spindle motor for rotating the processing spindle.

13 Claims, 73 Drawing Sheets

(56) References Cited

U.S. PATENT DOCUMENTS

| | | | | |
|---|---|---|---|---|
| 4,102,035 | A | * | 7/1978 | Voglrieder et al. ............. 483/56 |
| 4,196,501 | A | * | 4/1980 | Shimajiri et al. ............. 29/26 A |
| 4,574,463 | A | | 3/1986 | Palfery et al. |
| 4,617,720 | A | | 10/1986 | Palfery |
| 4,858,290 | A | * | 8/1989 | Hirose et al. ................... 29/35.5 |
| 4,884,332 | A | * | 12/1989 | Ozawa et al. ................... 483/44 |
| 4,888,865 | A | * | 12/1989 | Okada et al. ................... 483/39 |
| 5,117,552 | A | * | 6/1992 | Babel ............................. 483/36 |
| 5,372,568 | A | * | 12/1994 | Matsuoka ....................... 483/56 |
| 5,486,151 | A | * | 1/1996 | Bergmann et al. ................ 483/1 |
| 5,533,846 | A | * | 7/1996 | Geissler ....................... 409/201 |
| 5,632,075 | A | * | 5/1997 | De Bernardi et al. ............. 29/40 |
| 5,944,643 | A | * | 8/1999 | Koelblin et al. ................ 483/55 |
| 7,083,368 | B2 | * | 8/2006 | Nakazato et al. ............. 409/201 |
| 7,223,221 | B2 | * | 5/2007 | Sugata et al. ..................... 483/3 |
| 7,527,460 | B2 | * | 5/2009 | Gueli et al. ................... 409/235 |
| 2005/0239620 | A1 | * | 10/2005 | Lutz et al. ....................... 483/63 |

FOREIGN PATENT DOCUMENTS

| | | |
|---|---|---|
| JP | 55-112753 | 8/1980 |
| JP | 59-069242 | 4/1984 |
| JP | 61-192427 | 8/1986 |
| JP | 62-019354 | 1/1987 |
| JP | 63-052937 | 3/1988 |
| JP | 63-063757 | 4/1988 |
| JP | 63-229232 | 9/1988 |
| JP | 63-251138 | 10/1988 |
| JP | 63-283847 | 11/1988 |
| JP | 64-026134 | 2/1989 |
| JP | 64-026136 | 2/1989 |
| JP | 01-257537 | 10/1989 |
| JP | 03-202240 | 9/1991 |
| JP | 03-241895 | 10/1991 |
| JP | 05-111803 | 5/1993 |
| JP | 07-251333 | 10/1995 |
| JP | 08-197361 | 8/1996 |
| JP | 10034461 A * | 2/1998 |
| JP | 10-128608 | 5/1998 |
| JP | 2000126953 A * | 5/2000 |
| JP | 2000-280139 | 10/2000 |
| JP | 2001-018136 | 1/2001 |
| JP | 2001-198762 | 7/2001 |
| JP | 2003-266203 | 9/2003 |
| JP | 2004-314203 | 11/2004 |
| JP | 2005-349532 | 12/2005 |
| JP | 2006-055934 | 3/2006 |

* cited by examiner

MACHINE TOOL INCLUDING A Z-TABLE AND PROCESSING SPINDLE ROTATABLY SUPPORTED ON A ROTATION ARM

TECHNICAL FIELD

The present invention relates to a machine tool equipped with a plurality of machine tools having a rotation arm, which is rotatable in a vertical plane, and a processing spindle directed horizontally in the vicinity of the rotation arm, along with a method of controlling a machine tool on which a stocker, which retains a plurality of required tools therein for processing a workpiece, is disposed.

Further, the present invention concerns a workpiece positioning table that is utilized by a machine tool for manufacturing various types of components, and a machine tool equipped with such a table.

BACKGROUND ART

From the viewpoints of improving installation space efficiency, transporting workpieces to adjacent machine tools, and operability of an operator, in a machine tool, it is preferable for the occupied area to be small, and in particular, it is desirable for the width as viewed from the front to be small. For the purpose of making the occupied area small in this manner, for example, in Patent Document 1, a machine tool is proposed in which two spindle units are disposed on a column that is movable forward and backward in a horizontal direction, the spindle units being capable of moving up and down and horizontally. The machine tool of Patent Document 1 is favorable in terms of lowering costs and conserving space.

Further, in Patent Document 2, a numerically controlled NC lathe is proposed in which, by means of a structure in which a spindle is oriented vertically, space is conserved and the equipment number per unit area is increased, thereby enhancing productivity.

Incidentally, with the machine tools disclosed in Reference Document 1 and Reference Document 2, the structure is complex because a biaxial slide mechanism, which is perpendicularly arranged as viewed from the front, is provided. Moreover, because a heavy slide member is moved, in order to obtain sufficient stability, a base portion must be provided and affixed, such that the overall weight of the apparatus becomes quite heavy.

Looked at from this standpoint, in Patent Document 3, an arm is provided that rotates within a vertical plane with respect to a horizontally directed slide mechanism. According to this type of machine tool, a single axis is sufficient for the slide mechanism as view from the front, thus advantageously enabling a simple structure.

Patent Document 1: Japanese Patent No. 3278135
Patent Document 2: Japanese Laid-Open Patent Publication No. 2003-266203
Patent Document 3: Japanese Patent Publication No. 05-002446
Patent Document 4: Japanese Laid-Open Patent Publication No. 2004-314203
Patent Document 5: Japanese Laid-Open Utility Model Publication No. 63-063757
Patent Document 6: Japanese Laid-Open Patent Publication No. 55-112753
Patent Document 7: Japanese Laid-Open Patent Publication No. 07-251333

Although the machine tool disclosed in the aforementioned Patent Document 3 has a simple construction, the machine tool includes a biaxial slide mechanism (X table and Z table) that intersects on the horizontal plane, and the area occupied thereby is not small by any means. Further, as viewed from the front, because an X-axis direction slide mechanism is provided, the width of the machine tool also is not small in scale.

Furthermore, due to the fact that a unit including a processing spindle slides horizontally in the X direction, a moment force is generated with respect to the floor, which tends to shake the equipment laterally about a support point. The unit that includes the processing spindle is comparatively heavy, and therefore the moment is large as well, so that in order to obtain sufficient stability, the base portion must be substantially affixed in place, such that the overall weight of the structure increases. Furthermore, similar to the example disclosed in Patent Document 2, the base must be set in an overhanging or jutting manner, and in the case that plural machine tools are arrayed laterally, the line length thereof increases.

When a mechanism is adopted, in which the horizontal X-direction slide mechanism of the machine tool in Patent Document 3 is rotated by 90° so as to become vertically oriented, the width of the machine as viewed frontally becomes quite small.

Further, with the configuration of Patent Document 3, even if the machine width is made smaller, because the length of the rotation arm is not changed, in the case that a plurality of machine tools are arranged adjacent to one another, the machine tools must be positioned while being separated sufficiently so that the rotation arms thereof do not interfere mutually with each other, thus presenting another obstacle to further improving space efficiency.

Further, with the structure of Patent Document 3, even though the width of the machine tool and the installation area thereof may be small, transporting of workpieces between each of the machine tools is not automated, and moreover, even if such an automated system were provided, with a slow transport mechanism, the processing time becomes longer as a result, and efficiency is poor.

In addition, when the workpiece transport mechanism is provided separately from the mechanism that fixes the workpiece and processing is performed thereon, delivery of workpieces between both of these mechanisms is required, so that the mechanisms and processing sequence becomes complex. Still further, with such a complicated mechanism, the overall scale is increased, so that the point of making the machine tool itself smaller in scale is overlooked.

Further, with the machine tool, processing is performed while attaching and detaching a plurality of tools with respect to the workpiece, and it is preferable to store multiple tools, which are capable of responding to various types of workpieces. However, when the occupied area by the machine tool is small, the space for storing such multiple tools vanishes as well.

When a mechanism is provided in addition with respect to the machine tool for storing multiple tools, the area occupied by the machine tool becomes enlarged, and efforts to make the machine tool itself smaller in scale are ignored.

When a mechanism is adopted as described above, in which the horizontal X-direction slide mechanism of the machine tool in Patent Document 3 is rotated by 90° so as to become vertically oriented, since the machine tool assumes a shape of being longer than it is wide, if a mechanism were added for storing tools, the slider is brought into an imbalance state and worsened by generation of vibrations and the like, and processing precision tends to be lowered.

Furthermore, in the case that a mechanism for storing multiple tools is provided, a burden is placed on the operator to confirm that all of the tools are normal and proper, and before processing is carried out, it would be preferable to provide an automated type of confirmation.

Further, in a machine tool for manufacturing engine components, for example, it is desirable to provide a machine tool that is effectively small in scale, which conserves space, and which facilitates reductions in cost.

In a machine tool of this type, in Patent Document 1, in relation to a processing apparatus for processing valve holes in a cylinder head making up an engine, the applicant of the present invention has proposed a configuration for carrying out a process to incline a rotating unit, on which a cylinder that forms the workpiece is mounted, at a predetermined angle. According to this processing apparatus, it is possible to reduce the apparatus size and simplify the apparatus overall, while conserving space and reducing the cost thereof.

In Patent Document 4, a machine tool is disclosed which includes, in place of the aforementioned rotating unit, a rotation table apparatus having a circular shaped rotation table that rotates on a horizontal surface, wherein a spindle is provided on the rotation table, the spindle being affixed to and rotatably supported by the inner ring of a roller bearing.

Incidentally, in the cylinder block, cylinder head, etc., in the aforementioned engine components, various forms and models are provided. According to the differences in these types, for example, such as straight and V-type, or 4-cylinder and 6-cylinder types, there are a large number of parts having different shapes.

Consequently, with the aforementioned conventional configuration, two or more reference holes for positioning are provided in the workpiece, and positioning of the workpiece is performed by providing pins, which correspond to the reference holes, on a pallet which makes up a mounting base on which the workpiece is mounted. The pallet with the positioned workpiece loaded thereon is fixed onto a table of the machine tool.

Notwithstanding, because a large number of workpiece shapes exist as described above, a large number of pallets corresponding to the various shapes of the workpieces must be prepared, and thus the manufacturing cost for the table, as well as the storage location therefor, etc., tends to cause problems.

Further, in terms of the aforementioned positioning pins, in Reference Document 3, movable type pins are disclosed, along with a pin positioning device, corresponding to each respective type of workpiece shape.

However, with the pin positioning device disclosed in the aforementioned Patent Document 5, because the workpiece, which is the object to be positioned, is a printed wiring board to be inspected, it cannot be assumed that a large load (e.g., a radial load or the like), such as the cutting resistance that is incurred during processing by a machine tool, would be imposed on the positioning pins and the moving elements therefor.

Furthermore, in the case of a machine tool that carries out machining on the aforementioned engine components, because machining chips (cutting chips) of the workpieces are generated, which could cause problems in the seals of the aforesaid moving elements, it would be difficult to divert use of the aforementioned positioning pin apparatus for the purpose of positioning workpieces for a machine tool.

With the aforementioned conventional machine tool, two or more positioning reference holes are provided in the workpiece, and positioning of workpieces is carried out by providing pins corresponding to the reference holes in a pallet, which makes up a mounting base on which the workpiece is mounted, and the pallet with the positioned workpiece loaded thereon is structured so as to be fixed onto a table of the machine tool.

However, because the shapes of the workpieces are large in number, a plurality of different pallets must be prepared corresponding to the shapes of the respective workpieces. Thus, manufacturing costs for the table, as well as the storage location therefor, etc., tends to cause problems.

Further, for these types of positioning pins, in Reference Document 5, movable pins are disclosed, along with a pin positioning device corresponding to each respective type of workpiece shape. However, with such a pin positioning device, because the workpiece, which is the object to be positioned, is a printed wiring board to be inspected, use thereof with a machine tool cannot be envisioned. Furthermore, in this pin positioning device, a structure is provided for positioning the printed wiring board with two pins by an urging force of a coil spring. More specifically, a structure is provided for positioning the printed wiring board while the pins are moved and retained at predetermined positions, and thus, positioning of the workpiece is not carried out precisely, and automatization thereof is difficult.

On the other hand, with the table that serves as a supporting body in the machine tool, lightness in weight and a small scale structure therefor are desirable. In Patent Document 6, a numerically controlled machine tool is disclosed, in which a pallet transport tool is operated by means of a moving unit equipped with a spindle, and from a pallet supporting base on which the pallet that positions the workpiece is disposed, the pallet is transported inwardly and outwardly on a horizontally displaceable table.

However, with the machine tool disclosed in the aforementioned Patent Document 6, a pallet that positions the workpiece and a pallet supporting base are used, and moreover, the machine tool is constituted by a structure in which the pallet is transported inwardly and outwardly on the table. Because a pallet supporting base and a table displacing mechanism, etc., are required, it is difficult for the table as well as other devices in the periphery around the table to be made small in scale.

Further, in general, when a machined object, for example, an engine component such as a cylinder block, cylinder head, etc., is processed by the machine tool, such processing is carried out under a condition in which the machined object has been positioned at a desired location.

In a case such as this, for example, together with providing two reference holes for positioning, in the machined object, by providing positioning pins (reference members), which correspond to the reference holes, on a pallet that forms a mounting base for the machined object, the machined object is properly positioned in a desired position. In addition, the pallet on which the machined object has been positioned and mounted is affixed to a table of the machine tool and processing is carried out thereon.

Consequently, in Patent Document 7, in relation to a table for positioning a printed substrate that forms a workpiece, a technical concept is disclosed in which two moving tables on which two edge portions of the printed substrate are fixedly mounted and which are movable in the Y-axis direction, and a fixed pin and moving pin disposed between the two moving tables, are provided. In addition, the fixed pin is affixed on the surface of the table, and by structuring the moving pin so as to be movable in the X-axis direction, the pins are made to correspond with the two reference holes of the printed substrate that is mounted on the moving tables, whereby positioning is carried out.

However, with engine components of the type described above, the positions of the reference holes that are utilized for positioning differ depending on the shape of the components. Thus, the position of the reference hole of the workpiece, corresponding to the fixed pin on the workpiece positioning table according to the above conventional configuration, is not limited to a fixed position, and in particular, when processing is performed on the side surfaces of the workpiece, it would be difficult for the processing surface to face toward the front of the tool, and thus accurate and rapid processing is difficult to carry out.

Further, there are also cases in which the workpiece positioning table itself is necessarily used as a transporting pallet. For this purpose, it is desirable for the structure of the table to be simplified and for the table to be light in weight. However, with the table of the aforementioned conventional technique, a total of three moving means, i.e., two moving means for moving the two moving tables, and a moving means for moving the aforementioned moving pin, are included. Therefore, the structure of the table is complex and the weight thereof is large.

DISCLOSURE OF THE INVENTION

The present invention has the object of providing a machine tool with a compact structure, with high space efficiency, yet which is lightweight and highly stable.

Further, the present invention has the object of providing a machine tool, in which multiple tools can be stored, while having a compact structure, and wherein the stability thereof is high.

Furthermore, the present invention has the object of providing a control method, in which it can be confirmed automatically, at an appropriate timing prior to carrying out processing, that a tool is proper.

Still further, the present invention has the object of providing a machine tool having a compact structure and which is high in space efficiency.

The present invention also has the object of providing a machine tool with a compact structure, in which workpieces can be transported with high efficiency between machine tools.

The present invention has the object of providing a workpiece positioning table for positioning a workpiece on a machine tool, which is capable of responding to shapes of various different workpieces, and which is responsive to loads during machining.

The present invention has the object, in a machine tool equipped with a workpiece positioning table, of providing a machine tool and a control method for a machine tool, which enables the structure of the table to be simplified and made lightweight, while carrying out accurate positioning of workpieces thereon.

The present invention has the object of providing a workpiece positioning table as well as a machine tool equipped with a workpiece positioning table having a compact structure, which can position various types of workpieces at desired postures, and in which production efficiency is excellent.

A control method for a machine tool according to the present invention comprises the steps of installing a fixing part moving member, for moving a fixing part that engages with a positioning member of a workpiece, on a spindle which is supported by a spindle head unit such that the spindle is movable and rotatable to a predetermined position in three dimensions, engaging the fixing part moving member with the fixing part by moving the spindle, and moving the fixing part to a position of the positioning member, so as to position the workpiece at a desired posture, by moving the spindle in a state in which the fixing part moving member is engaged with the fixing part.

According to the above method, by moving the fixing part of a table using the spindle head unit, positioning of the workpiece can be performed reliably and with high precision. Further, a drive source for driving the fixing part, which is utilized for positioning on the table, can be eliminated, whereby the structure of the table can be simplified and made lighter in weight.

Next, a control method for a machine tool according to the present invention, is provided, wherein the machine tool comprises a Z table, which is moved slidably in a Z direction that makes up one direction in a horizontal plane, a supporting body disposed on the Z table and which is moved slidably in a vertical direction, a spindle unit disposed on the supporting body, a sensor for measuring a length of a tool that is mounted on a processing spindle of the spindle unit, a main stocker in which a plurality of tools needed for carrying out processing of at least a predetermined workpiece are retained, and which performs attachment and detachment of the retained tools with respect to the processing spindle, and a sub-stocker in which a tool needed for carrying out processing of another workpiece is included and retained, and which performs attachment and detachment of the retained tool with respect to the processing spindle, in which the method includes the step of measuring the length of the tool by the sensor, when a tool that was supplied to the processing spindle from the sub-stocker is moved to the main stocker, and outputting a predetermined warning when the length differs from a previously recorded length.

In the foregoing manner, when a tool is moved to the main stocker from the sub-stocker, the length of the tool is confirmed automatically by the sensor, and therefore prior to carrying out processing, an abnormality such as erroneous mounting or breakage of the tool can be discovered, so that processing does not have to be halted, and productivity and operation efficiency of the machine tool can be improved.

A machine tool according to the present invention comprises a Z table that is moved slidably in a Z direction that forms one direction in a horizontal plane, a supporting body disposed on the Z table and which is moved slidably in a vertical direction, a rotation arm supported on the supporting body, and which is rotatable 360° in a vertical plane that faces toward a workpiece oriented in the Z direction, an arm drive source for rotating the rotation arm, a processing spindle, which is disposed at a position distanced from a center of rotation of the rotation arm, and which is rotatably supported with respect to the rotation arm and points in the Z direction, a spindle drive source for rotating the processing spindle, and an automated machine tool exchange mechanism equipped with a main stocker in which a plurality of tools that are attachable and detachable on the processing spindle are stored, wherein a central axis of rotation of the rotation arm and an axis of rotation of the main stocker are disposed on the same vertical plane.

In this manner, by providing the main stocker on an upper portion of the machine tool, a large number of tools can be stored without enlarging the installation area. Further, due to the fact that the central axis of rotation of the rotation arm and the axis of rotation of the main stocker are disposed on the same vertical plane, a force vector, which is generated accompanying raising and lowering of the rotation arm, points in the direction of the main stocker, and because a moment is not generated thereby, stability is increased.

In this case, a sub-stocker, which stores a plurality of machine tools therein, is included on a side surface in the X direction perpendicular to the Z direction in the horizontal plane. The sub-stocker may also have a retaining arm in which the tools are retained pointing in the X direction, a tool delivery and exchange mechanism, for extracting one of the tools from the retaining arm, changing a direction of the extracted tool to a Z direction, and delivering the tool to the processing spindle, and an index mechanism for intermittently moving the retaining arm. In accordance with such a sub-stocker, an even greater number of tools can be stored, although the occupied width increases, at most, to the length of the tools.

Further, the processing spindle may also directly perform an attaching and detaching operation of the tools with respect to the main stocker. Owing thereto, a dedicated attachment/detachment mechanism becomes unnecessary, making the system simple and more convenient.

Furthermore, a sensor may be included for measuring a length of the tools installed on the processing spindle. In accordance with such a sensor, erroneous mounting or breakage, etc., of the tool can be detected, so that a designated countermeasure can be carried out.

The machine tool according to the present invention includes a Z table that is moved slidably in one direction in a horizontal plane, a supporting body disposed on the Z table and which is moved slidably in a vertical direction, a rotation arm supported on the supporting body, and which is rotatable 360° in a vertical plane that faces toward a workpiece oriented in the one direction, an arm drive source for rotating the rotation arm, a processing spindle, which is disposed at a position distanced from a center of rotation of the rotation arm, and which is rotatably supported with respect to the rotation arm and points in the Z direction, and a spindle drive source for rotating the processing spindle.

In this manner, with the machine tool of the present invention, those which move in the vertical plane are the supporting body, which is moved slidably in the vertical direction, and two axes of the rotation arm, and because an axis does not exist that moves in a lateral direction, a narrow and compact structure can be provided, whereby space efficiency is improved.

Further, the supporting body is moved slidably in the vertical direction, and a moment force is not generated that tends to shake laterally with respect to the installed portions. Furthermore, since the rotation arm is lightweight, stability is not lost or upset, even when the arm is rotated. Accordingly, the machine tool can be constructed to be not only light in weight, but also is highly stable.

In this case, when the central axis of rotation of the rotation arm and the drive axis of the spindle drive source are disposed on the same vertical plane, an even narrower structure can be provided.

Further, the arm drive source may comprise a hollow rotation shaft and may be disposed on the supporting body, the spindle drive source being connected with the processing spindle through a power transmission member that penetrates through the hollow rotation shaft for transmitting power, and is disposed on a back surface side of the supporting body, such that the arm drive source and the spindle drive source are disposed coaxially. In accordance with such a structure, the arm drive source and the spindle drive source can be constructed together integrally as a compact unit.

When an automated tool exchange mechanism is provided, equipped with a rotating magazine in which a plurality of tools that are attachable and detachable on the processing spindle are stored, and a central axis of rotation of the rotation arm and an axis of rotation of the rotating magazine are disposed on the same vertical plane, an even narrower structure can be provided.

When, as viewed from the front, a movable distance of the supporting body in a vertical direction is 1.7 to 20.0 times the distance from the center of rotation of the rotation arm to the processing spindle, or when, as viewed from the front, a movable distance of the supporting body in a vertical direction is 0.66 to 10.0 times a width of the equipment installation surface, the range (area) within which processing can be carried out becomes enlarged.

Further, the fixing parts are made movable in an unlocked state, and correspond to standard positioning parts of the workpiece, and when a fixing part moving member is installed on the processing spindle and locking of the fixing parts is released, and the fixing part moving member is made to engage with the fixing parts, each of the fixing parts may be moved corresponding to positions of the respective positioning parts, so as to position the workpiece at a predetermined posture. In this manner, when the fixing parts are moved directly by movement of the processing spindle, such movements can be performed easily. Further, it is unnecessary to provide a separate moving means for the fixing parts, and thus the machine tool can be constructed in a compact manner.

A machine tool according to the present invention comprises a first machine tool and a second machine tool, and a controller for controlling the first machine tool and the second machine tool, wherein the first machine tool and the second machine tool are arranged adjacently in parallel, and the first machine tool and the second machine tool each comprises, respectively, a Z table that is moved slidably in a Z direction that forms one direction in a horizontal plane, a supporting body disposed on the Z table and which is moved slidably in a vertical direction, a rotation arm supported on the supporting body, and which is rotatable 360° in a vertical plane that faces toward a workpiece oriented in the Z direction, an arm drive source for rotating the rotation arm, a processing spindle, which is disposed at a position distanced from a center of rotation of the rotation arm, and which is rotatably supported with respect to the rotation arm and points in the Z direction, a spindle drive source for rotating the processing spindle, and an automated tool exchange mechanism equipped with a rotating magazine in which a plurality of tools that are attachable and detachable on the processing spindle are stored, wherein a central axis of rotation of the rotation arm and an axis of rotation of the rotating magazine are disposed on the same vertical plane.

Further, a machine tool according to the present invention comprises a first machine tool and a second machine tool, and a controller for controlling the first machine tool and the second machine tool, wherein the first machine tool and the second machine tool are arranged adjacently in parallel, and the first machine tool and the second machine tool each comprises, respectively, a Z table that is moved slidably in a Z direction that forms one direction in a horizontal plane, a supporting body disposed on the Z table and which is moved slidably in a vertical direction, a rotation arm supported on the supporting body, and which is rotatable 360° in a vertical plane that faces toward a workpiece oriented in the Z direction, an arm drive source for rotating the rotation arm, a processing spindle, which is disposed at a position distanced from a center of rotation of the rotation arm, and which is rotatably supported with respect to the rotation arm and points in the Z direction, and a spindle drive source for rotating the processing spindle, wherein, as viewed frontally in the Z direction, a distance in the horizontal widthwise direction between the centers of rotation of the rotation arms of the first machine tool and the second machine tool is shorter than a total length of the rotation arms, and wherein, in the case that one of the rotation arms or the supporting body is moved, the controller compares a position of the rotation arm at a movement destination with the position of the other rotation arm, and when mutual interference therebetween is generated, movement of the one rotation arm is halted, or an operation that is one sequence ahead is performed first.

In this manner, the first machine tool and the second machine tool are controlled integrally and cooperatively, and while confirming the position of each of the rotation arms, in the case that mutual interference therebetween is generated, movement of one of the rotation arms is halted, or an operation that is one sequence ahead is performed first. Owing thereto, the machine tools can be constructed compactly and space efficiency is improved, while interference between the machine tools is avoided.

In this case, when the controller divides, into a plurality of areas, the movement range of each of the rotation arms, and determines, at each area unit, the position of each of the rotation arms, and whether interference therebetween exits or not, operations can be simplified.

Further, when displacements in the Z direction of the rotation arms of the first machine tool and the second machine tool differ from each other, the controller may enable the rotation arm on the side closest to the workpiece to be unlimited, while limiting the rotation arm on the side farthest from the workpiece to turn inwardly. Owing thereto, even in the case that displacements in the Z direction of the rotation arms differ from each other, interference of the rotation arm of one of the machine tools with the supporting body or the Z table of the other machine tool can be prevented. Further, due to the fact that movement of the rotation arm on the side closest to the workpiece is unlimited, operations are not unduly restricted, and processing within a range in which operations are still possible can be continued.

Further, when a central axis of rotation of the rotation arm and a drive axis of the spindle drive source are disposed on the same vertical plane, the machine tool can be constructed more narrowly.

Furthermore, the arm drive source may include a hollow rotation shaft and is disposed on the supporting body, and the spindle drive source may be connected with the processing spindle through a power transmission member that penetrates through the hollow rotation shaft for transmitting power, and is disposed on a back surface side of the supporting body, wherein the arm drive source and the spindle drive source are disposed coaxially. According to such a structure, the arm drive source and the spindle drive source can be constructed together integrally as a compact unit.

Still further, when an automated tool exchange mechanism is equipped with a rotating magazine, in which a plurality of tools that are attachable and detachable on the processing spindle are stored, such that a central axis of rotation of the rotation arm and an axis of rotation of the rotating magazine are disposed on the same vertical plane, the machine tool can be constructed more narrowly. Further, because the central axis of rotation of the rotation arm and an axis of rotation of the rotating magazine are disposed on the same vertical plane, a force vector, which is generated accompanying raising and lowering of the rotation arm, is oriented toward the direction of the rotating magazine, and due to the fact that a moment is not generated, stability is high.

An automated tool exchange mechanism may be provided, which is equipped with a rotating magazine in which a plurality of tools that are attachable and detachable on the processing spindle are stored, wherein, as viewed frontally in the Z direction, the rotation axis of the rotating magazine is disposed within a range of the horizontal widthwise distance between the centers of rotation of the rotation arms of the first machine tool and the second machine tool. Owing thereto, the rotating magazine can be disposed in a well balanced manner. Further, a single rotating magazine can be used in common with the first machine tool and the second machine tool.

A machine tool according to the present invention comprises a first machine tool and a second machine tool, and a workpiece moving device that retains a workpiece processed by the first machine tool and the second machine tool. The first machine tool and the second machine tool each comprises, respectively, a Z table that is moved slidably in a Z direction that forms one direction in a horizontal plane, a supporting body disposed on the Z table and which is moved slidably in a vertical direction, a rotation arm supported on the supporting body, and which is rotatable 360° in a vertical plane that faces toward a workpiece oriented in the Z direction, an arm drive source for rotating the rotation arm, a processing spindle, which is disposed at a position distanced from a center of rotation of the rotation arm, and which is rotatably supported with respect to the rotation arm and points in the Z direction, and a spindle drive source for rotating the processing spindle. The workpiece moving device comprises a turntable capable of rotating in a horizontal plane, a plurality of auxiliary rotating mechanisms disposed on the turntable, which rotate in a horizontal plane, and which set a surface to be processed of the workpiece, so as to face toward the processing spindle, and a main rotating mechanism for intermittently rotating the turntable so that one from among the auxiliary rotating mechanisms is placed at a first retaining position facing toward the processing spindle of the first machine tool, whereas another one from among the auxiliary rotating mechanisms is placed at a second retaining position facing toward the processing spindle of the second machine tool.

Further, a machine tool according to the present invention comprises a first machine tool and a second machine tool, and a workpiece moving device that retains a workpiece processed by the first machine tool and the second machine tool. The first machine tool and the second machine tool each comprises, respectively, a spindle head unit, which supports a processing spindle thereon such that the spindle is movable and rotatable to a predetermined position in three dimensions by a drive source. The workpiece moving device comprises a turntable capable of rotating in a horizontal plane, which positions a workpiece provided with a plurality of positioning members, by means of a plurality of fixing parts that correspond to each of the positioning members, a plurality of auxiliary rotating mechanisms disposed on the turntable, which rotate in a horizontal plane, and which set a surface to be processed of the workpiece, so as to face toward the processing spindle, and a main rotating mechanism for intermittently rotating the turntable so that one from among the auxiliary rotating mechanisms is placed at a first retaining position facing toward the processing spindle of the first machine tool, while another one from among the auxiliary rotating mechanisms is placed at a second retaining position facing toward the processing spindle of the second machine tool, each of the fixing parts being movably disposed on the turntable. The machine tool further comprises a fixing part moving member for moving each of the fixing parts to correspond to a position of each of the positioning members, to enable positioning of the workpiece at a predetermined posture, wherein the fixing part moving member includes an installation portion, which is detachably installed on the processing spindle in place of a tool, and an engagement portion that engages with the fixing parts. The workpiece is processed by the tool, which is detachably installed on the processing spindle. The spindle head unit comprises a Z table that is moved slidably in a Z direction that forms one direction in a horizontal plane, a supporting body disposed on the Z table and which is moved slidably in a vertical direction, a rotation arm supported on the supporting body, and which is rotatable 360° in a vertical plane that faces toward a workpiece oriented in the Z direction, an arm drive source for rotating the rotation arm, the processing spindle, which is disposed at a position distanced from a center of rotation of the rotation arm, and which is rotatably supported with respect to the rotation arm and points in the Z direction, and a spindle drive source for rotating the processing spindle.

In the foregoing manner, by intermittently rotating the turntable by means of the main rotating mechanism, and setting the workpiece at a predetermined orientation by the auxiliary rotating mechanism, along with a compact structure, efficiency in transporting workpieces between respective machine tools can be improved.

In this case, when the Z tables of the first machine tool and the second machine tool are arranged in parallel to each other, the lateral width of the machine tool can be set narrowly.

A machine tool according to the present invention comprises a spindle head unit, which supports a processing spindle thereon such that the spindle is movable and rotatable to a predetermined position in three dimensions by a drive source, and a table for positioning a workpiece equipped with a plurality of positioning members, by means of plural fixing parts that correspond to the positioning members, wherein the workpiece is processed by tools, which are capable of being attached to and detached from the processing spindle, and each of the fixing parts is movably disposed on the table. The machine tool further comprises a fixing part moving member for moving each of the fixing parts to correspond to a position of each of the positioning members, so as to enable positioning of the workpiece at a predetermined posture, wherein the fixing part moving member includes an installation portion, which is detachably installed on the processing spindle in place of the tool, and an engagement portion that engages with the fixing parts.

In accordance with such a structure, by using the spindle head unit and thereby moving the fixing parts of the table, positioning of the workpiece can be performed with high accuracy and reliability. Further, the drive source for driving the fixing parts, which are used for carrying out positioning on the table, can be curtailed, thereby enabling structure of the table to be simplified and made lightweight.

Further, the fixing part moving member is made to engage with the fixing parts by moving the processing spindle, and the invention preferably is provided with a control means for controlling the spindle head unit to move the fixing parts, by causing the processing spindle to be moved in a state in which the fixing part moving member engages with one of the fixing parts.

In addition, when a brake is provided for fixing the fixing parts in place, positioning of the workpiece can be carried out even more reliably.

A machine tool according to the present invention comprises a spindle head unit, which supports a processing spindle thereon such that the spindle is movable and rotatable to a predetermined position in three dimensions by a drive source, and a table for positioning a workpiece equipped with a plurality of positioning members, by means of a plurality of fixing parts that correspond to the positioning members, wherein the workpiece is processed by tools, which are capable of being attached to and detached from the processing spindle. The fixing parts are affixed to the workpiece positioning table, and are made up from a first fixing part that engages with one from among the plurality of positioning members, and a second fixing part that engages with another one from among the plurality of positioning members. The machine tool further comprises a rotation means for rotating a surface of the table, and a linear moving means for moving the second fixing part along a straight line, wherein the linear moving means includes a rotating member, a moving member that moves linearly upon receipt of a rotary drive force from the rotating member, the second reference member being disposed on the moving member, a first detection means for detecting a movement amount or a position of the moving member or the second reference member, a processing spindle on which a rotation tool for rotatably driving the rotating member is mounted, in order to relatively move the fixing parts linearly corresponding to positions of the positioning members, so as to position the workpiece at a predetermined posture. The rotation tool includes a mounting member, which is detachably installed on the processing spindle in place of the rear part, and an engagement member that engages with the rotating member. Also, the machine tool further comprises a second detection means for detecting a phase of the workpiece positioning table, and a controller for controlling driving of the spindle and the rotation means, wherein the controller matches a movement direction of the moving member with an axial direction of the processing spindle, and wherein, after the second reference member has been moved to a predetermined position by rotary driving of the rotating member by the rotation tool, the workpiece positioning table is rotated to a predetermined position.

In accordance with the above structure, the second reference member can be moved linearly, without the linear moving means being equipped with any drive source such as a motor or the like. Accordingly, the structure of the workpiece positioning table can be simplified and made lightweight.

The workpiece positioning table of the present invention makes up a workpiece positioning table for positioning a workpiece having a first reference part and a second reference part thereon, and comprises a first reference member affixed to a surface of the table for engaging with the first reference part, a second reference member movably disposed on the table surface for engaging with the second reference part, a linear moving means, which linearly moves the second reference member, a mounting base detachably affixed to the table surface, on which the workpiece, positioned by the first reference member and the second reference member, is mounted, and a rotation means for rotating a surface of the table.

According to the above structure, various differently shaped workpieces can be positioned at desired postures by means of a simple structure having two axes made up of a linear movement axis along which the second reference member is moved linearly, and a rotation axis for the table. Owing thereto, the structure of the workpiece positioning table can be made simpler and lighter in weight.

Further, the linear moving means comprises an elastic body, which resiliently supports the second reference member in the movement direction thereof, so that when the workpiece is positioned, a small amount of movement is permitted by the second reference member. Owing thereto, substantially no influence of pitch errors, etc. at the first and second reference parts of the workpiece is imparted, and the workpiece can be positioned easily.

Further, when the workpiece positioning table is constituted from a driving section including the rotation means, and a rotating unit, including the table surface, which is separably connected to the driving section, the rotating unit can be separated from the driving section, which includes the rotation means and which is heavy. Accordingly, by means of such separation, the rotating unit including the table surface becomes lighter in weight, and therefore, the rotating unit can be used as a workpiece transporting pallet for transporting the workpiece.

Further, the machine tool of the present invention, for the purpose of positioning a workpiece having a first reference part and a second reference part, includes a first reference member disposed on the table surface and which engages with the first reference part, and a second reference member disposed movably on the table surface and which engages with the second reference part, and being equipped with a workpiece positioning table onto which the workpiece, which is positioned on the table surface by the first reference member and the second reference member, is loaded, and further comprising a linear slide means, which linearly slidably supports the second reference member, a first detection means that detects a movement amount or a position of the second reference member, an axial support means for rotatably and axially supporting the workpiece positioning table, braking means for positioning and fixing the workpiece positioning table in position, a second detection means that detects a phase of the workpiece positioning table, a processing spindle that moves the second reference member using a installed moving tool, and a controller for controlling movement operations of the processing spindle, wherein, by means of the controller, the second reference member is moved to a predetermined position by causing the processing spindle, on which the moving tool is installed, to be moved.

According to the above structure, the workpiece positioning table can be provided with a simple structure in which the second reference member is linearly slidably supported by the linear slide means, and wherein highly precise positioning movements of the second reference member are enabled by the moving tool mounted and installed on the processing spindle. Accordingly, the structure of the workpiece positioning table is simplified and made lighter in weight.

The workpiece positioning table of the present invention comprises a rotation mechanism for positioning the workpiece that includes a plurality of positioning members thereon by means of a plurality of fixing parts corresponding to the positioning members, and wherein the rotation mechanism comprises a first rotation member rotatably supported by a bearing on an inner side of a frame and having a first fixing part on a surface on which the workpiece is mounted, a second rotation member rotatably supported by a bearing on the inside of the frame and having a second fixing part on a surface on which the workpiece is mounted, a first drive source for rotatably driving the first rotation member, a second drive source for rotatably driving the second rotation member, a first brake for fixing the first rotation member in place, and a second brake for fixing the second rotation member in place.

In accordance with such a structure, the first fixing part and the second fixing part can be moved easily, and by means of the first brake and the second brake, the first rotation member and the second rotation member can be fixed in place. Owing thereto, even with a machine tool that experiences a large cutting resistance during machining, positioning of workpieces having various shapes is enabled, and moreover, even during machining thereof, the workpiece can be reliably held and maintained.

Further, when a structure is provided in which, by rotating the first rotation member and/or the second rotation member, and then rotationally moving the first fixing part and/or the second fixing part, the distance between or the positions of the first fixing part and the second fixing part are changed, and positioning of the workpiece is carried out, positioning of the workpiece can be performed even more easily.

Further, the workpiece positioning table of the present invention is equipped with a rotation mechanism for positioning the workpiece that includes a plurality of positioning members thereon by means of a plurality of fixing parts corresponding to the positioning members. The rotation mechanism comprises an outer side rotation member rotatably supported by a bearing on an inner side of a frame, and having a first fixing part on a surface on which the workpiece is mounted, an inner side rotation member rotatably supported by a bearing on an inner side of the outer side rotation member, and having a second fixing part on a surface on which the workpiece is mounted, a first drive source for rotatably driving the outer side rotation member, a second drive source for rotatably driving the inner side rotation member, a first brake for fixing the outer side rotation member in place, and a second brake for fixing the inner side rotation member in place.

According to such a structure, the first fixing part and the second fixing part can be moved easily, and furthermore, by means of the first brake and the second brake, the outer side rotation member and the inner side rotation member can be fixed in place. Owing thereto, even with a machine tool that experiences a large cutting resistance during machining, positioning of workpieces having various shapes is enabled, and moreover, during machining thereof as well, workpieces can be reliably held and maintained.

Further, positioning of the workpiece can be carried out more easily when a structure is provided in which, by rotating the outer side rotation member and/or the inner side rotation member, and then rotationally moving the first fixing part and/or the second fixing part, the distance between or the positions of the first fixing part and the second fixing part are changed, and thereby positioning of the workpiece is carried out.

Further, when the rotation mechanism is equipped with a plurality of rotation mechanisms, a controller may be provided in which, by rotating each of the outer side rotation members and/or each of the inner side rotation members, and then rotationally moving each of the first fixing parts and/or each of the second fixing parts in each of the rotation mechanisms, the controller changes the distance between or the positions of each of the first fixing parts and each of the second fixing parts, and selectively changes the distances or positions of the fixing parts of two or more of each of the first fixing parts and/or each of the second fixing parts.

BEST MODE FOR CARRYING OUT THE INVENTION

Explanations shall be given with reference to the accompanying drawings concerning embodiments of the present invention.

Figure 1:
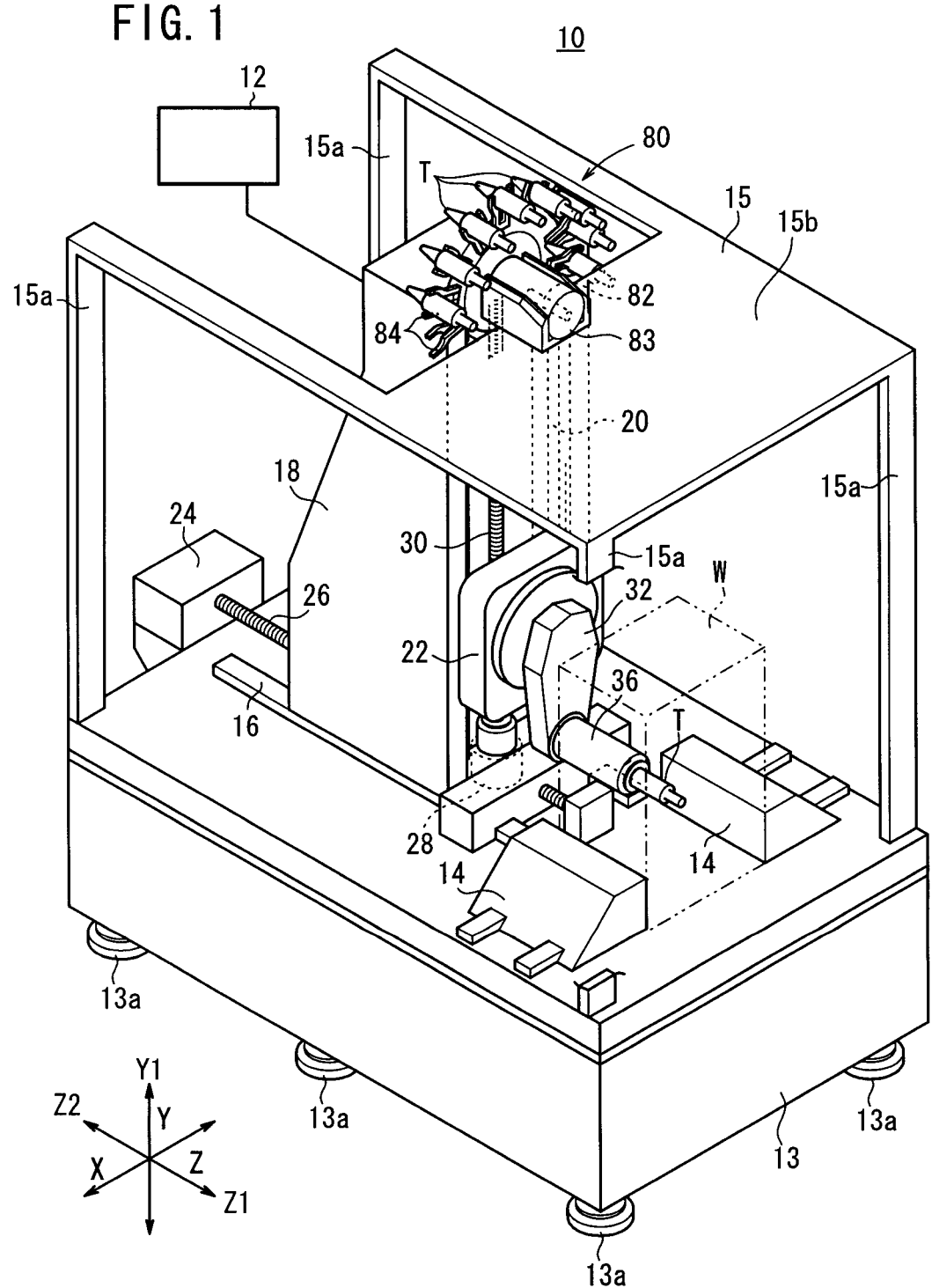
FIG. 1 is a perspective view of a machine tool according to a first embodiment.
Figure 2:
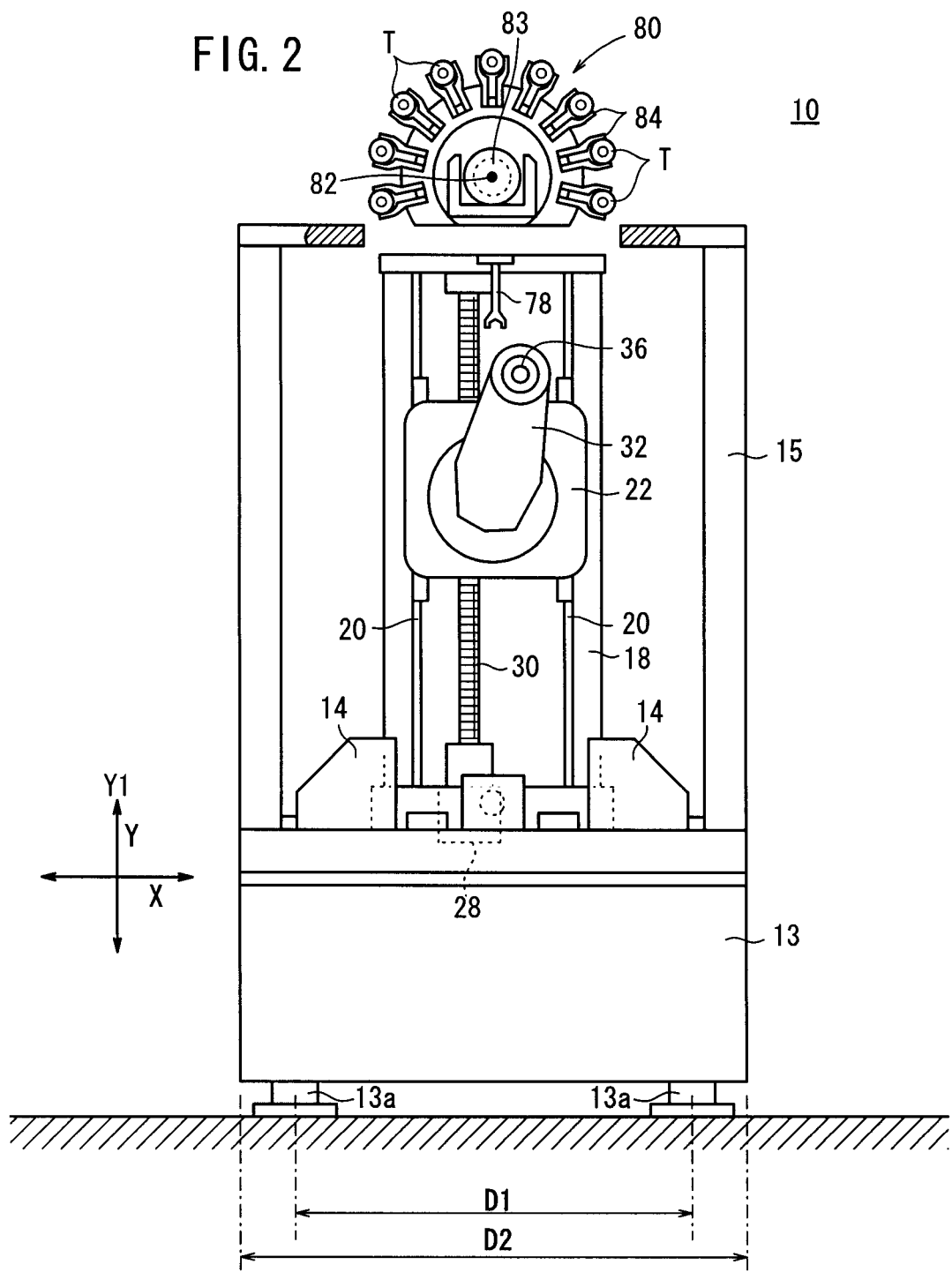
FIG. 2 is a front view of the machine tool according to the first embodiment.
Figure 3:
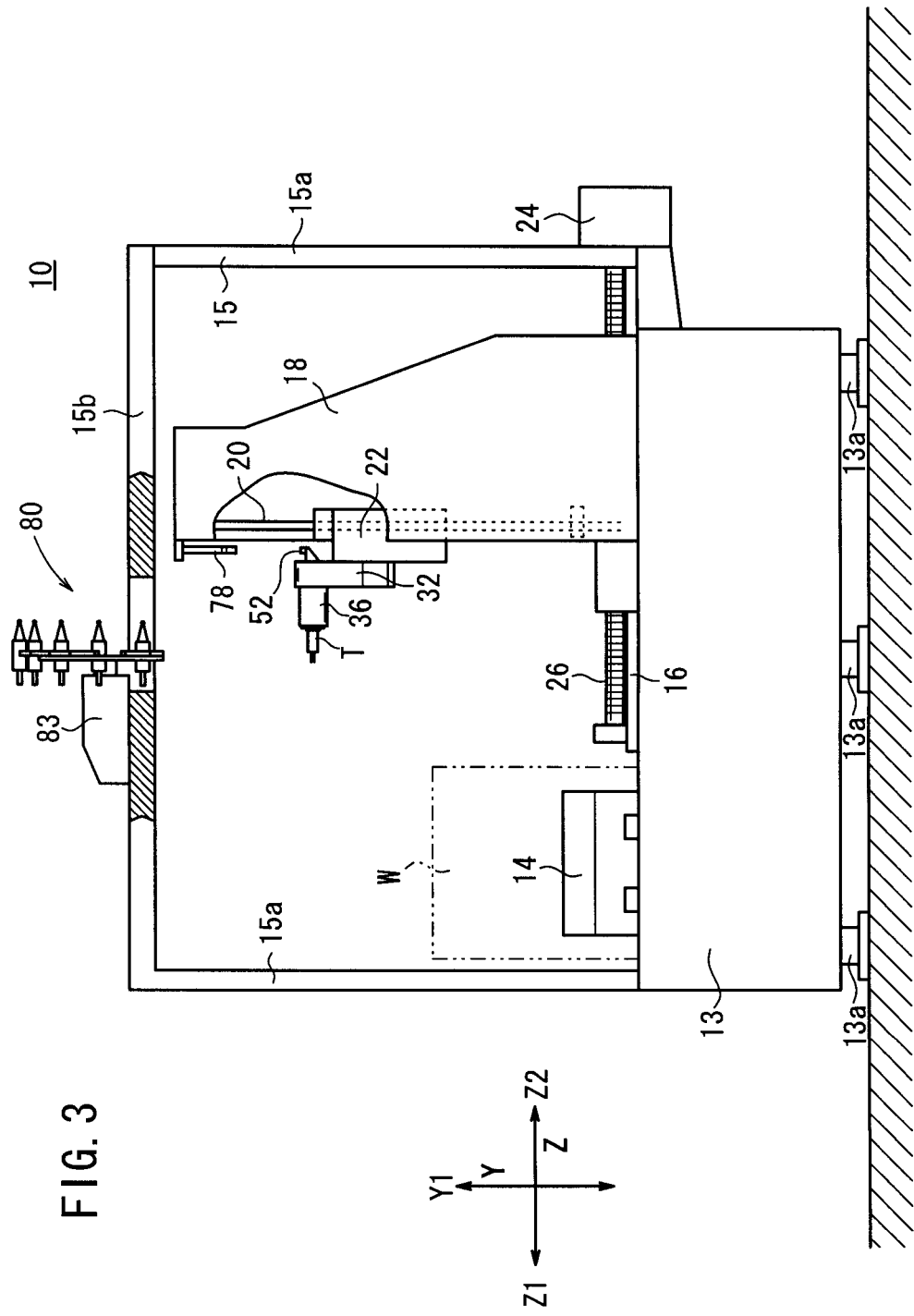
FIG. 3 is a side surface view of the machine tool according to the first embodiment.

FIGS. 1 to 3 are perspective, front, and side surface views of a machine tool according to a first embodiment. As shown in FIGS. 1 through 3, the machine tool according to the first embodiment carries out processes such as drilling, boring, and tapping with respect to a workpiece W, and is constructed with a narrow width as viewed frontally (see FIG. 2). Below, in order to specify the orientation of the machine tool 10, in FIG. 2, the left and right lateral direction is designated as an X direction, the height direction is designated as a Y direction, and the depth-wise direction perpendicular to the Y and Y directions is designated as a Z direction (see FIG. 3). Each of the X and Y directions is a predetermined one direction in a horizontal plane, and the X and Y directions are perpendicular to each other.

In the machine tool 10, a machine platen 13 constitutes a base that is affixed to the floor. A plurality of leveling legs 13a are screw-attached to a lower surface of the machine platen 13 for enabling horizontal placement of the machine tool 10, which normally are provided at least at the four corners of the machine platen 13. In the event that the machine tool 10 is installed on a floor surface enabling the machine tool 10 to be mounted sufficiently horizontal, the leveling legs 13a are unnecessary. The machine platen 13 has a narrow width in the X direction and low shape in the Y direction. Fixing bases 14 and a frame 15 are assembled on the machine platen 13. The fixing bases 14 serve to affix a workpiece W such that a surface to be processed thereon points rearwardly (in the direction of the arrow Z2), and are set in the vicinity of a front side (side of the arrow Z1) on an upper surface of the machine platen 13.

The frame 15 serves to support a rotating magazine (automatic tool exchange mechanism) 80 (as well as 80a, 80b) to be described later, and includes four supporting posts 15a, which extend upwardly from both ends in the direction of the arrow Z of the machine platen 13, and a plate 15b, which is supported via the supporting posts 15a.

The machine tool 10 includes a controller 12, a pair of Z rails 16 disposed on the upper surface of the machine platen 13 and extending in the Z direction, a column (Z table) 18 that slides in the Z direction while guided by the Z rails 16, a pair of Y rails 20 that extend in the Y direction on the front surface of the column 18, and a supporting body 22 that slides in the Y direction while guided by the Y rails 20. The column 18 is moved in the Z direction through a ball screw mechanism 26 under the action of a Z motor 24 disposed rearwardly on the machine platen 13. The supporting body 22 moves reciprocally in the Y direction through a ball screw mechanism 30 under the action of a Y motor 28, which is arranged at a lower portion of the column 18 at an inner portion of the machine platen 13. The Y motor 28 may also be disposed on an upper portion of the column 18. Apart from the ball screw mechanisms 30, 26, as a means for linearly and reciprocally moving the supporting body 22 or the column 18, for example, a linear reciprocal movement mechanism that utilizes a linear motor may be used. In the case that the amount of movement in the Y direction is large, use of a linear motor is preferable. More specifically, in the case of using a linear reciprocal moving mechanism in which a ball screw mechanism is used, although it is preferred for the lead pitch interval of the ball screw to be large so as to make the movement speed high, in such a case the resolution capability of the position-detecting encoder is lowered and positioning accuracy is degraded. Further, backlash and twisting of the ball screw mechanism tend to occur easily and accuracy thereof is comparatively low. On the other hand, such phenomena do not occur in a linear motor. Further, in place of the Z motor 24 of a servo motor, in the case that a linear motor movement means is used, a high speed honing process can be carried out.

The column 18 is moved in the Z direction through a ball screw mechanism 26 under action of the Z motor 24, which is disposed rearwardly on the machine platen 13. The supporting body 22 moves reciprocally in the Y direction through a ball screw mechanism 30 under action of the Y motor 28, which is positioned inwardly on the machine platen 13. Ball screw mechanisms have been shown as examples, however, linear motor mechanisms may also be used in place of the ball screw mechanisms. As a result, movements become higher in speed and are performed with greater accuracy. The column 18 and the Y rails 20 are formed with proper lengthwise shapes in the Y direction, so that the supporting body 22 can be moved over a comparatively long distance.

Figure 4:
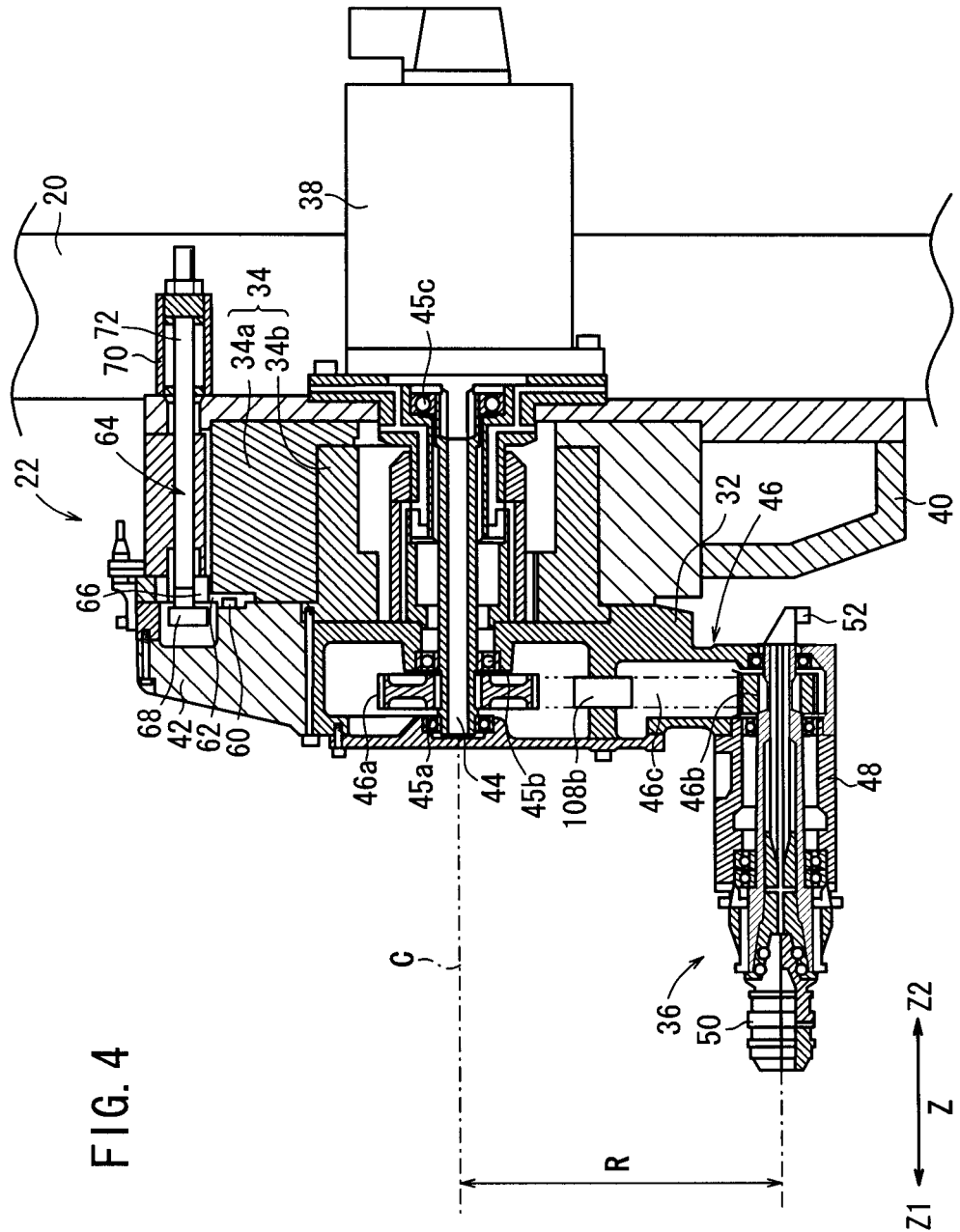
FIG. 4 is a cross sectional side plan view of a supporting body.

As shown in FIG. 4, the supporting body 22 comprises a rotation arm 32 oriented in the Z1 direction, which rotates in a vertical plane that faces the workpiece W, an arm motor (arm drive source) 34 that rotates the rotation arm 32, a processing spindle 36 disposed in the vicinity of a distal end of the rotation arm 32 and which is rotatably supported with respect to the rotation arm 32 and points in the Z1 direction, and a spindle motor (spindle drive source) 38 for rotating the processing spindle 36. The arm motor 34 is a direct motor, for example. The processing spindle 36 constitutes a spindle unit.

The supporting body 22 is constructed based on a frame 40, and the arm motor 34 is disposed in an interior part of the frame 40. The arm motor 34 includes a stator 34a affixed to the frame 40 and a hollow rotor 34b disposed at an inner side of the stator 34a.

The rotation arm 32 is affixed on an end in the direction of the arrow Z1 of the rotor 34b, and is rotated under action of the arm motor 34. As also made clear from FIG. 4, although the rotation arm 32 is capable of being endlessly rotated, at a minimum, a capability of rotation of 360° is acceptable. The processing spindle 36 is disposed at a location separated by a distance R from the center of rotation C of the rotation arm 32. A balancer 42 is disposed on the rotation arm 32 on a side thereof (the upper side in FIG. 4) opposite from the side on which the processing spindle 36 is disposed. The balancer 42 is a liquid tank into which a coolant liquid or the like is introduced, wherein, corresponding to the tool that is assembled onto the processing spindle 36, balancing can be provided by changing the liquid amount contained therein. The balancer 42 may also be a metallic weight. Apart from the location where the balancer 42 is provided, the interior of the rotation arm 32 has a hollow construction. The rotation arm 32 is comparatively lightweight in comparison to the supporting body 22, so that even when rotated, stability with respect to the supporting body 22 and the machine tool 10 is not lost. The angle of the rotation arm 32 with respect to the supporting body 22 is measured by an angle sensor (see an angle sensor 41 shown in FIG. 17) and is supplied to the controller 12. The length from the center of rotation C to the outer distal end of the rotation arm 32 is designated by L.

The spindle motor 38 projects in the direction of the arrow Z2, and is affixed with respect to a back surface of the frame 40 on the supporting body 22, so that the spindle motor 38 is made coaxial with the arm motor 34. Because the spindle motor 38 and the arm motor 34 are disposed coaxially, the supporting body 22 can be constructed as a compact unit. More specifically, the spindle motor 38 does not exist on the same axis as the processing spindle 36, and when the spindle motor 38 is at a location near to the center of the rotation arm 32, the mass and size of the balancer 42 can be small, and the supporting body 22 can be made compact overall. Accordingly, it is preferable for the axis of the spindle motor 38 and the axis of the rotation arm 32 to be arranged coaxially.

Further, as shown in FIG. 4, the rotation arm 32, and the processing spindle 36 and the spindle motor 38 that sandwich the rotation arm 32 from the front and rear therebetween in the Z-axis direction, are disposed so as to be properly weight-balanced in the Z direction with respect to the supporting body 22. Accordingly, the center of gravity of the entire supporting body 22 is positioned substantially in the same plane together with the vertical plane of disposition of the Y rails 20 and the ball screw mechanism 30, and thus suitably, the supporting body 22 can be reciprocally moved smoothly in the Y direction.

A shaft (power transmission unit) 44 is provided, which penetrates through the hollow portion of the rotor 34b. One end of the shaft 44 is affixed to the rotation axis of the spindle motor 38, whereas the other end projects from the frame 40 and reaches a side plate of the rotation arm 32, on a side thereof in the direction of the arrow Z1. The shaft 44 is supported by bearings 45a, 45b, 45c at three locations, i.e., at the arrow Z1 end side of the rotation arm 32, at the arrow Z2 end side thereof, and at the arrow Z2 end side of the frame 40.

A pulley mechanism 46 includes a drive pulley 46a fixed on a shaft 44 between the bearing 45a and the bearing 45b, a driven pulley 46b fixed to an end in the direction of the arrow Z2 of the processing spindle 36, and a belt 46c, which is supported and stretched between the drive pulley 46a and the driven pulley 46b. The power transmission mechanism in which the pulley mechanism 46 is provided suitably enables the rotation arm 32 to be made lightweight.

Further, as a power transmission mechanism, apart from the pulley mechanism 46, for example, a silent chain drive transmission mechanism may be used, in which the drive pulley 46a is replaced by a gear and the driven pulley 46b is replaced by a pinion. In this case, the drive force may be transmitted through a plurality of gears, etc., between the gear and the pinion. Of course, other types of power transmission mechanisms apart therefrom may also be utilized.

Figure 7:
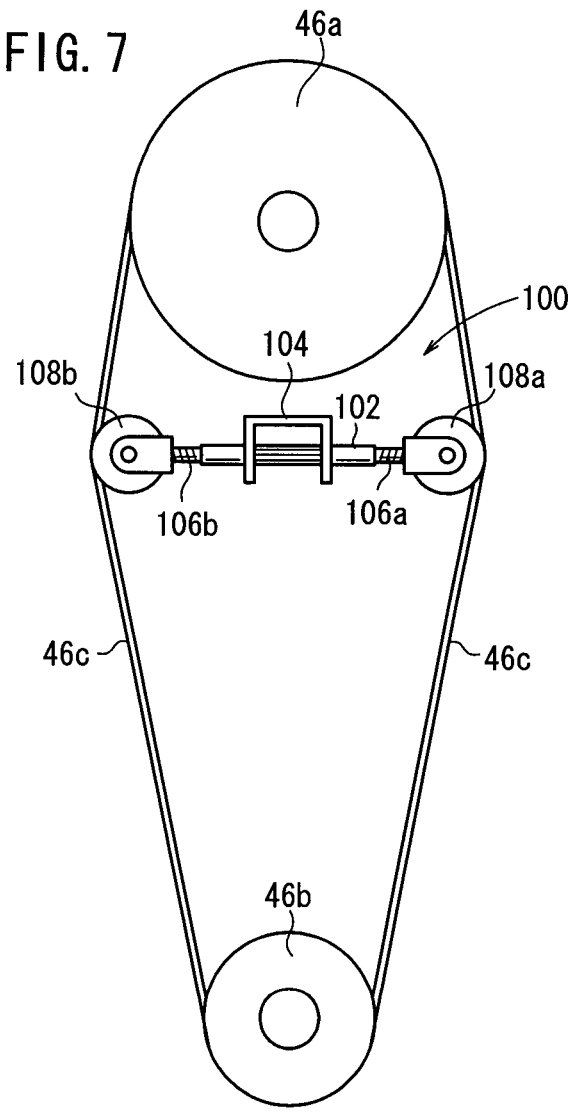
FIG. 7 is a schematic view of a tensioning mechanism.

The pulley mechanism 46 is disposed in a hollow portion inside the rotation arm 32, and tension adjustment of the belt 46c is performed by a tensioning mechanism 100 (see FIG. 7). By means of such a structure, rotation of the spindle motor 38 is transmitted to the processing spindle 36 through the shaft 44 and the pulley mechanism 46.

The processing spindle 36 is accommodated inside a spindle cover 48, which is disposed integrally with the rotation arm 32, and a tool head 50 is provided on an end portion of the processing spindle 36 in the direction of the arrow Z1, in which a tool T is installed. Further, on the end thereof in the direction of the arrow Z2, an unclamping lever 52 is provided, which releases a clamped state of the tool T with respect to the tool head 50 and enables detachment of the tool T. The unclamping lever 52 has a shape that projects slightly outward as viewed from the center of rotation C, and is operated by pressing the unclamping lever 52 in the direction of the center of rotation C by means of an unclamping block 78 to be described subsequently, whereby the tool T can be unclamped. Further, by separating the unclamping block 78, the unclamping lever 52 is restored to its original position by a non-illustrated elastic body, whereby a tool T can be clamped inside the tool head 50.

A fixing device 64, by which a disk 62 made up from a leaf spring or the like is gripped by a screw 60, and which affixes the rotation arm 32 in a predetermined position, is disposed on a back surface side (arrow Z2 side) of the rotation arm 32.

The fixing device 64 is made up from a receiving seat 66 that abuts on the back surface side of the disk 62, and a pressing piece 68 that grips the disk 62 between the pressing piece 68 and the receiving seat 66. The pressing piece 68 is disposed on the end of a rod 72, which is urged in a gripping direction by a disk spring 70. By pressing the rod 72 forwardly against the resistance of the disk spring 70, the gripped state of the disk 62 is released, whereby rotation of the rotation arm 32 is enabled.

In the first embodiment, because the disk 62 is constructed by the leaf spring, by gripping the disk 62, the rotation arm 32 can reliably be prevented from rotating without falling off.

Figure 5:
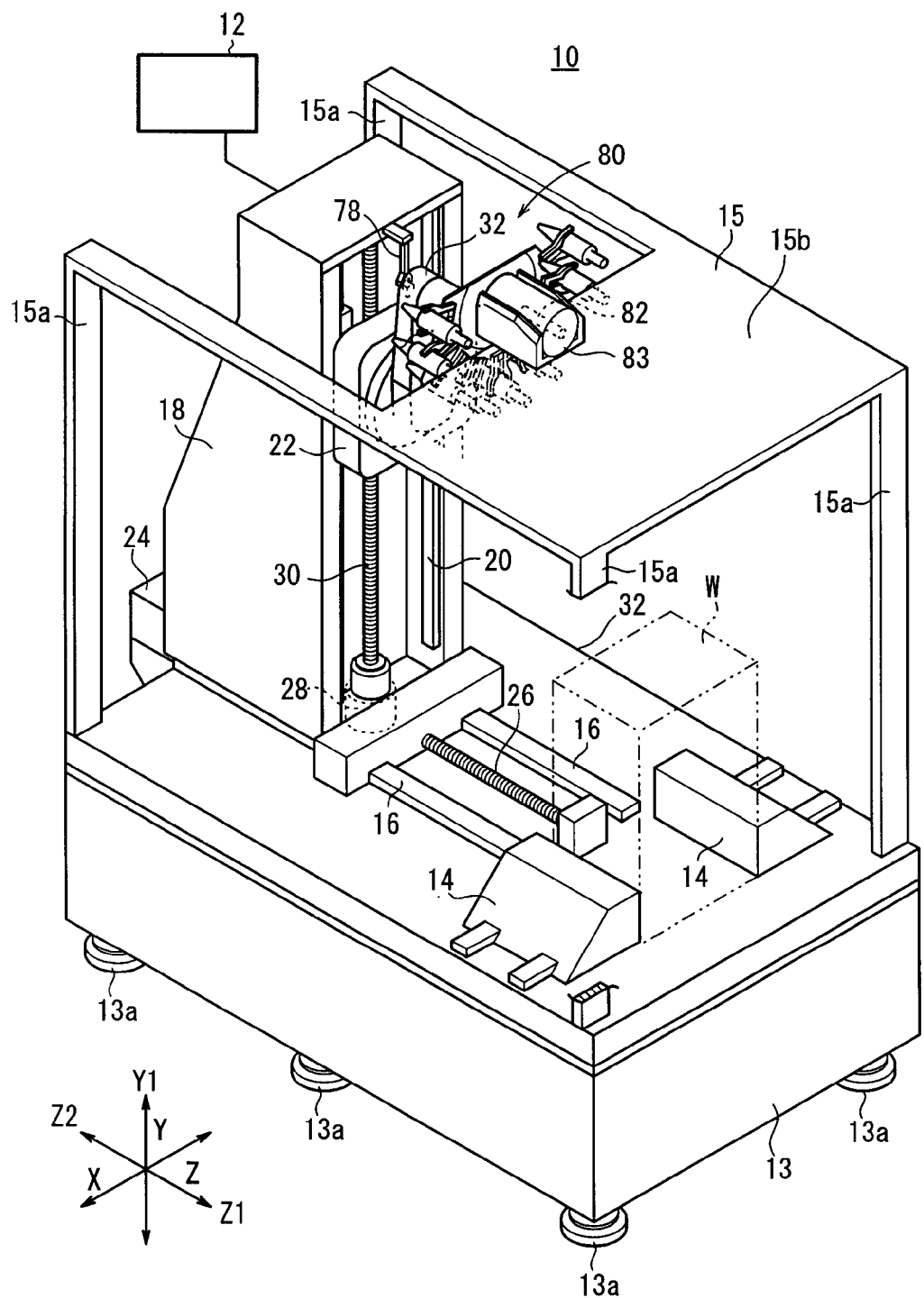
FIG. 5 is an enlarged perspective view of a column, a rotating magazine, and the surrounding vicinity thereof.

As shown in FIG. 5, on a surface on the side of the arrow Z1 on an upper portion of the column 18 on the machine tool 10, an unclamping block 78 is disposed for pressing the aforementioned unclamping lever 52. Accordingly, in a state in which the rotation arm 32 points upwardly, by raising the supporting body 22, the unclamping lever 52 is operated on by the unclamping block 78, whereby the tool T in the tool head 50 can be unclamped.

A rotating magazine 80 storing a plurality of tools T therein, which are capable of attachment and detachment on the processing spindle 36, is disposed on an upper surface of the plate 15b on the frame 15. The rotating magazine 80 includes an axis of rotation 82 that extends in the direction of the arrow Z, a magazine motor 83 for driving the axis of rotation 82, and support arms 84, which are disposed in a radial form over a range of roughly 270° centrally about the axis of rotation 82 as viewed from the front (see FIG. 2). C-shaped grippers for holding the tools T are disposed at ends of the support arms 84. The grippers are formed by elastic bodies, wherein by press-inserting the tools T from openings of the C-shaped grippers, the grippers expand and open elastically, so that the tools T can be press-inserted therein. After being pressed therein, the grippers close, whereby the tools T can be gripped and retained. Further, the retained tools T are capable of being pulled out from the openings of the C-shaped grippers. The number of support arms 84 may be on the order of sixteen, for example.

Normally, a roughly 90° portion of the rotating magazine 80 without support arms 84 is oriented downwardly, and overall the rotating magazine 80 is positioned higher than the plate 15b, so as not to form an obstacle to operations of the column 18 and the supporting body 22. When the tool T of the tool head 50 is to be exchanged, the rotating magazine 80 is rotated, and a predetermined one of the support arms 84 is directed downwardly from the end of the plate 15b (see FIG. 5).

Figure 6:
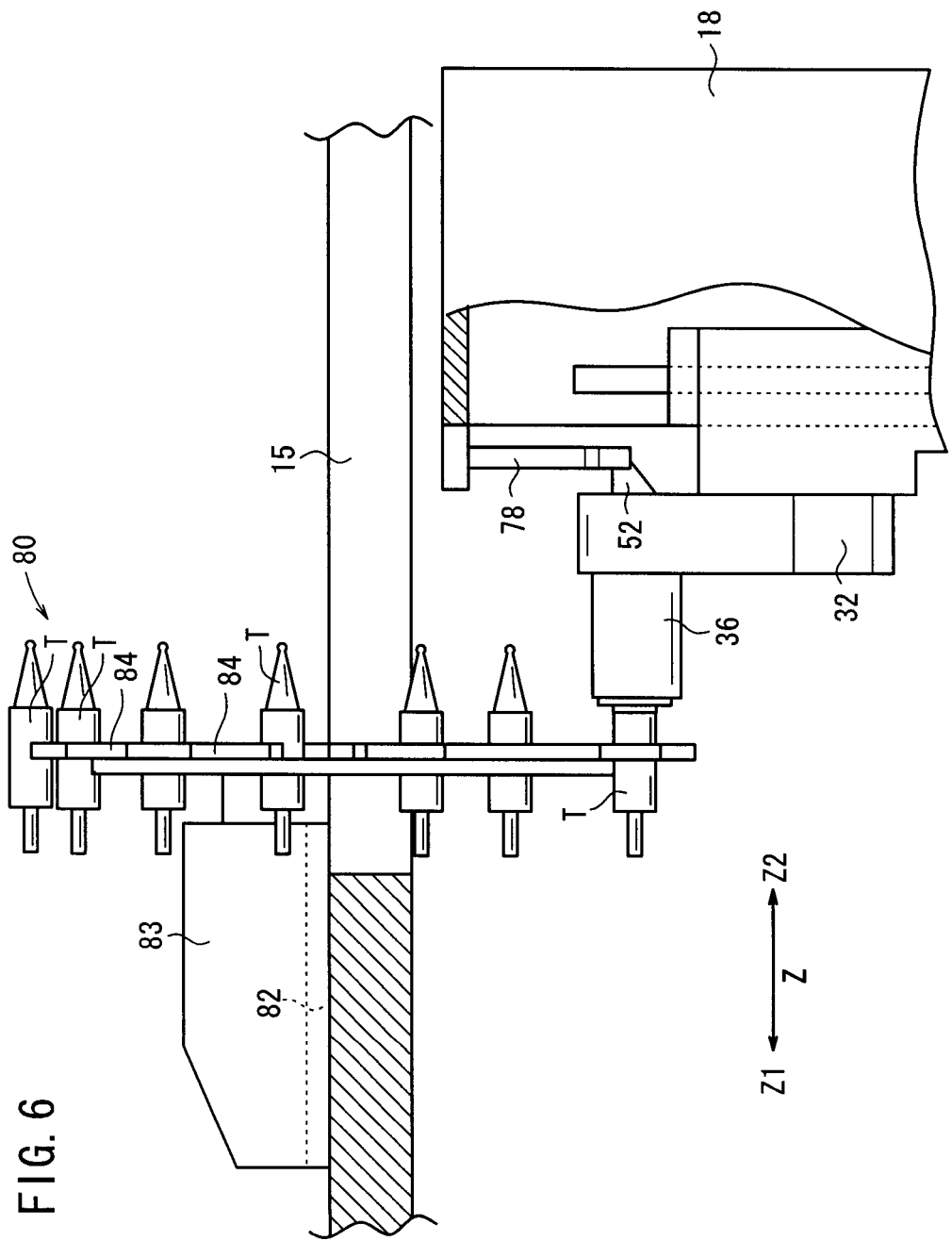
FIG. 6 is a side surface view of a processing spindle, a support arm, and an unclamping block during exchanging of tools.

More specifically, an empty support arm 84, which does not contain a tool T therein, is oriented downwardly, and after the Z-direction position of the column 18 has been adjusted, the supporting body 22 is raised. As a result, as shown in FIG. 6, the tool T is retained by the support arm 84, and together therewith, an operation is performed so that the unclamping lever 52 abuts against the unclamping block 78, whereby the tool T becomes unclamped with respect to the tool head 50. Accordingly, by retracting the column 18 in the direction of the arrow Z2, the tool T is pulled out from the tool head 50.

Next, the rotating magazine 80 is rotated and a support arm 84 containing a tool T that is planned to be used is directed downwardly, whereupon the column 18 is advanced in the direction of the arrow Z1. As a consequence, since the intended tool T is inserted into the tool head 50, by lowering the supporting body 22, the unclamping lever 52 separates from the unclamping block 78 and the tool T can be clamped. Thereafter, the rotating magazine 80 is rotated so that all of the support arms 84 are set in position upwardly of the plate 15b.

In this manner, no mechanism exists intervening between the rotating magazine 80 and the processing spindle 36 for the purpose of receiving and delivering the tool T, and attachment/detachment operations of the tool T can be carried out directly through operations of the column 18, the supporting body 22, and the rotation arm 32. Owing thereto, because a dedicated attachment/detachment mechanism is unnecessary, the structure is simplified and the time required for attachment and detachment of tools is shortened.

As shown in FIG. 7, a tensioning mechanism 100 includes a pole 102 disposed between the drive pulley 46a and the driven pulley 46b, and a bracket 104 for holding rotatably the pole 102. Furthermore, the tensioning mechanism 100 comprises a first rotating support body 106a, which is threaded by a forward screw to one end of a pole 102, a first tension pulley 108a axially supported on the first rotating support body 106a for expanding one part of the belt 46c, a second rotating support body 106b, which is threaded by a reverse screw to another end of the pole 102, and a second tension pulley 108b axially supported on the second rotating support body 106b for expanding another portion of the belt 46c. A knurl (notch) is cut at a location on the pole 102 on which the bracket 104 supports the pole 102.

In accordance with such a tensioning mechanism 100, by rotation of the pole 102 in a forward direction, both the first rotating support body 106a and the second rotating support body 106b are projected outwardly, whereby the tension of the belt 46c can be increased. Further, by rotation of the pole 102 in a reverse direction, both the first rotating support body 106a and the second rotating support body 106b are retracted inwardly, whereby the tension of the belt 46c can be loosened. In this manner, by means of the tensioning mechanism 100, with a single operation, while preserving lateral (left and right) balance, tension adjustment of the belt 46c is enabled, and the laterally directed tension thereof can be stabilized. Accordingly, the pulley mechanism 46 is used from the standpoint of making the rotation arm 32 lightweight, and because the tension adjusting mechanism (tensioning mechanism 100) is provided, the rotation arm 32 can be made light in weight, the lifetime of the belt can be lengthened by stabilizing the tension thereof, and the drive force of the spindle motor 38 can be reliably transmitted to the processing spindle 36.

The Z motor 24, the Y motor 28, the arm motor 34, the spindle motor 38 and the magazine motor 83 are rotated under operations of a non-illustrated controller. Positions of the column 18, the supporting body 22, the rotation arm 32, and the rotating magazine 80 are detected by non-illustrated sensors and are supplied to the controller. While referring to such signals, the controller controls the column 18, the supporting body 22, the rotation arm 32, and the rotating magazine 80 highly precisely so as to acquire predetermined positions.

Figure 8:
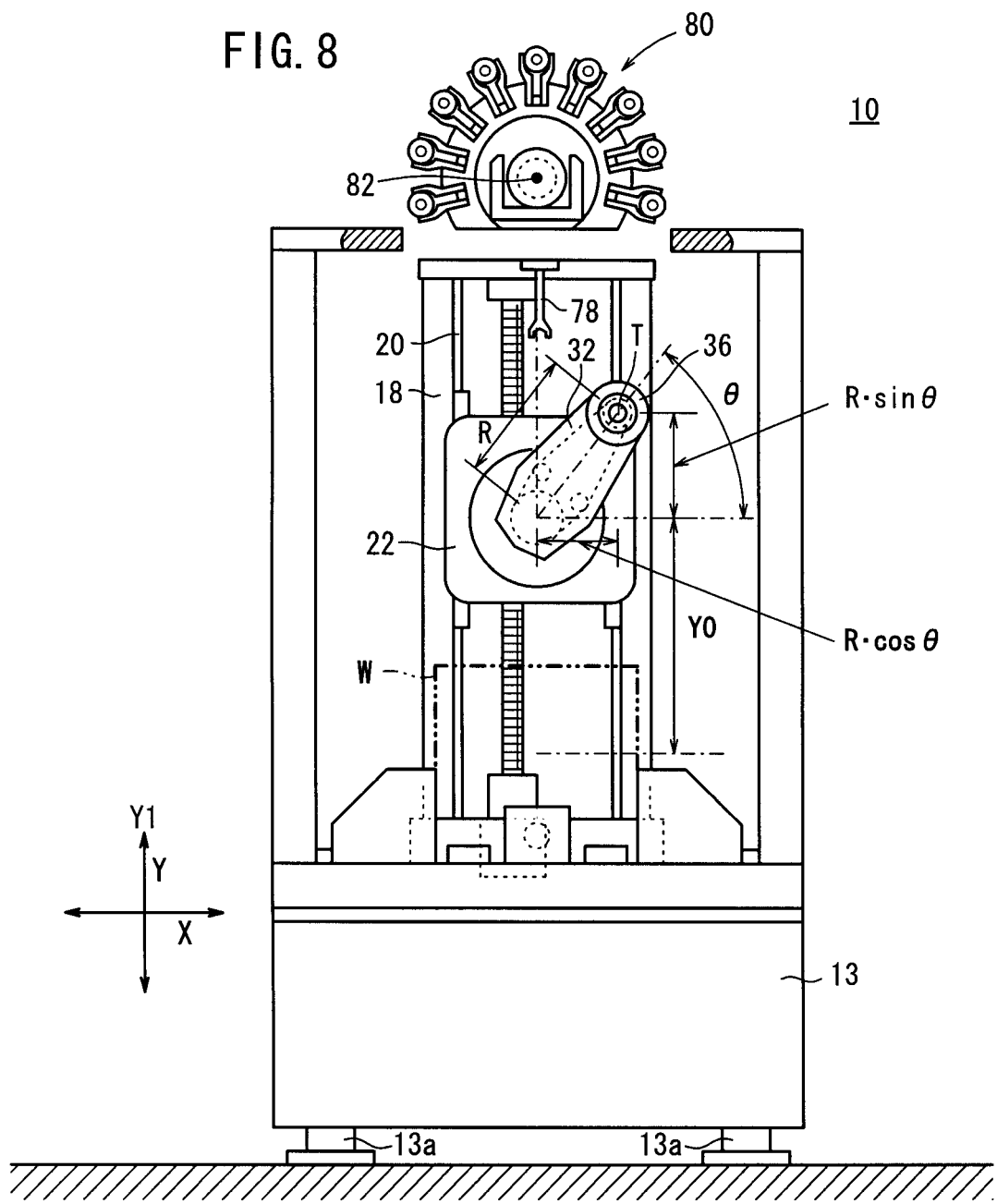
FIG. 8 is a schematic front view of a machine tool for the purpose of displaying coordinates of the processing spindle.

In accordance with the machine tool 10 constructed in the foregoing manner, the horizontal position X of the processing spindle 36 is changed by the inclination of the rotation arm 32 under a rotary action of the arm motor 34, and for example as shown in FIG. 8, is represented by $X=R \cdot \cos \theta$, with respect to an angle $\theta$ from a horizontal orientation of 0°. Further, the vertical position Y of the processing spindle 36 is changed by the inclination of the rotation arm 32 and the height Y0 of the supporting body 22, and is represented by $Y=Y0+R \cdot \sin \theta$. Accordingly, by movements of the rotation arm 32 and the supporting body 22, the processing spindle 36 can be arranged at a desired position with respect to a workpiece W affixed to the fixing bases 14, and after the processing spindle 36 has been positioned, while the processing spindle 36 is rotated by the spindle motor 38, by advancing the column 18 in the direction of the arrow Z1, the tool T is made to abut against the workpiece W, whereby cutting processes such as drilling, boring, tapping, etc., along with grinding processes such as honing and the like, can be performed.

Further, in accordance with a machine tool 10 according to the first embodiment, the components that move in the vertical plane are the supporting body 22, which moves slidably in the vertical direction, and the two axes of the rotation arm 32, and because there are no axes that move in a lateral direction, the machine tool 10 has a narrow and extremely compact structure, and space efficiency can be improved. Because the frontal width of the machine tool 10 is small, transportation of workpieces to other adjacent machine tools is facilitated, while operability of the machine tool 10 is enhanced.

Further, the supporting body 22 moves slidably in a vertical direction, and a moment that causes lateral shaking about the foundation is not generated. Furthermore, because the rotation arm 32 is lightweight, even when rotated, the stability thereof is not lost or adversely affected. Accordingly, the machine tool 10 can be constructed so as to be lightweight, yet high stability is obtained.

Because the machine tool 10 is highly stable, a structure in which the machine tool is high in the direction of the arrow Y1 is possible, and the movement range of the supporting body 22 can be set more widely. Specifically, a preferable range for the height Y0 of the supporting body 22 shall be explained taking as a reference the installation surface width D of the machine tool 10 as viewed from the front, and a distance R (see FIG. 4) from the center of rotation C to the processing spindle 36. Herein, the installation surface width D of the machine tool 10 as viewed from the front, as shown in FIG. 2, for a case in which leveling legs 13a are provided, is defined as the width D1 from the axial center of the leftmost leveling leg 13a to the axial center of the rightmost leveling leg 13a, and in the case that the leveling legs 13a are not provided, is defined as the maximum width D2 by which the machine platen 13 is grounded on the floor.

Initially, taking the installation surface width D when $0.3D \leqq R \leqq 0.5D$ as a reference, the height Y0 of the supporting body 22 may be set at Y0=0.66D to 10.0D. Further, taking the distance R when R>0.5D as a reference, the height Y0 may be set at Y0=1.7R to 20.0R. When the height Y0 is set within these ranges, the area within which processing can be performed is suitably enlarged. Setting of the upper limit value is made because, when the workpiece W has an excessively tall shape, fixing thereof by the fixing bases 14 is troublesome, and the workpiece W tends to become warped or bent.

Further, with the machine tool 10, because the axis of rotation 82 of the rotating magazine 80 and the center of rotation C of the rotation arm 32 are arranged on the same vertical plane, when tools T are stored in the rotating magazine 80, or when the tools T are installed onto the processing spindle 36, since the rotation arm 32 is always oriented vertically upward (i.e., at a 0° angle), it can be moved stably in the Y direction, and therefore the machine tool 10 can be constructed with a narrow width. At this time, assuming that the rotation arm 32 remains within a range of ±7° about the vertical direction, the rotation arm 32 can be moved stably, and it is also preferable if the axis of rotation 82 of the rotating magazine 80 lies within this range.

In the aforementioned example, the spindle motor 38 and the arm motor 34 are arranged coaxially. However, even if not coaxial, if both axes of rotation are arranged on the same vertical plane, the machine tool 10 can be constructed with a narrow width.

Figure 9:
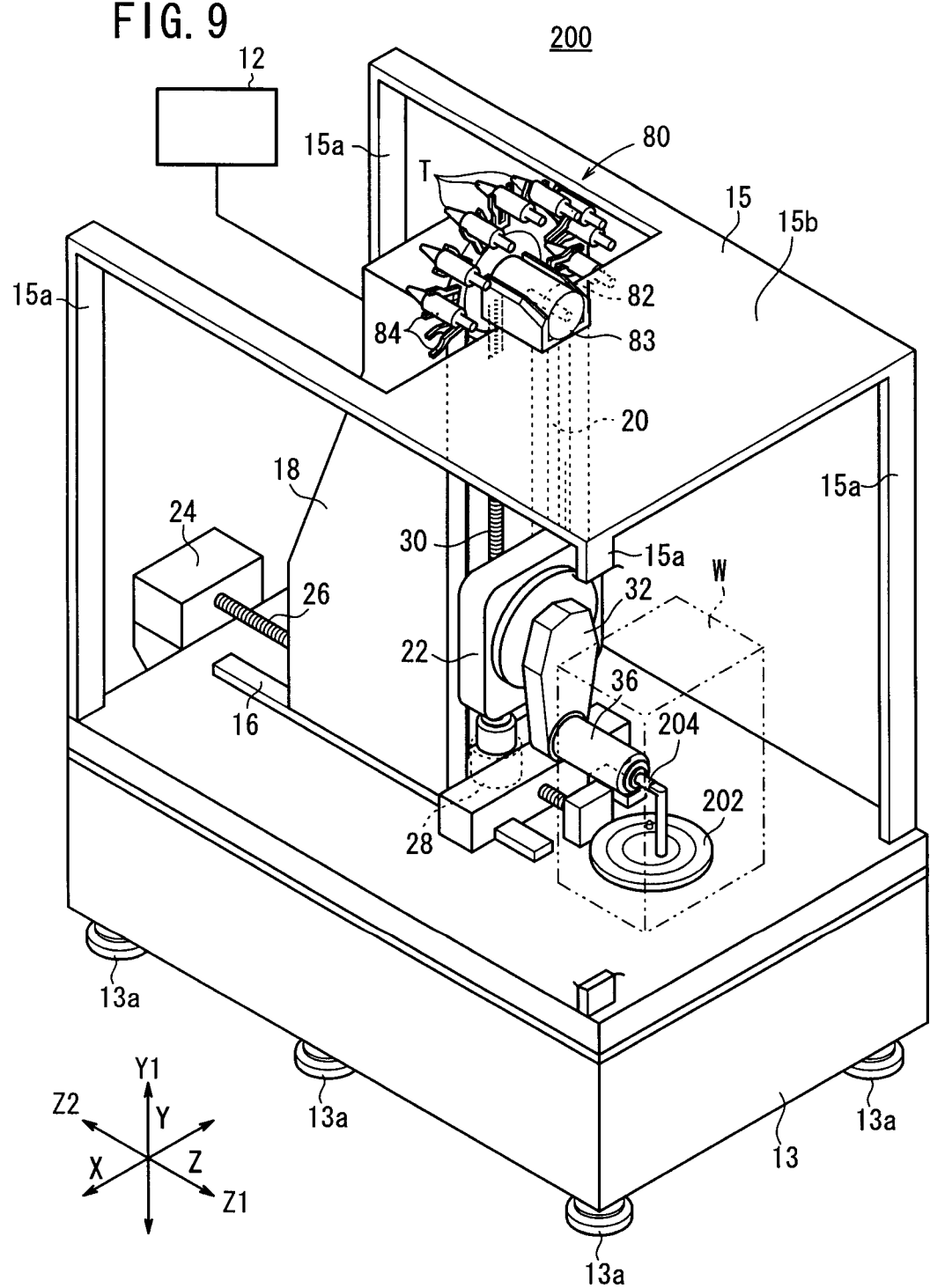
FIG. 9 is a perspective view of a machine tool according to a modified example.

Next, a machine tool 200 according to a modified example of the machine tool 10 shall be explained with reference to FIGS. 9 through 16. As shown in FIG. 9, in the machine tool 200, the fixing bases 14 in the machine tool 10 are replaced by a table 202, wherein operations are performed on the table 202 by means of a moving tool (fixing part moving member) 204, which is installed onto the processing spindle 36. Portions apart from the table 202 in the machine tool 200 are constructed in the same manner as in the machine tool 10, and thus such features are designated by the same reference numerals and detailed explanations thereof are omitted.

Figure 10:
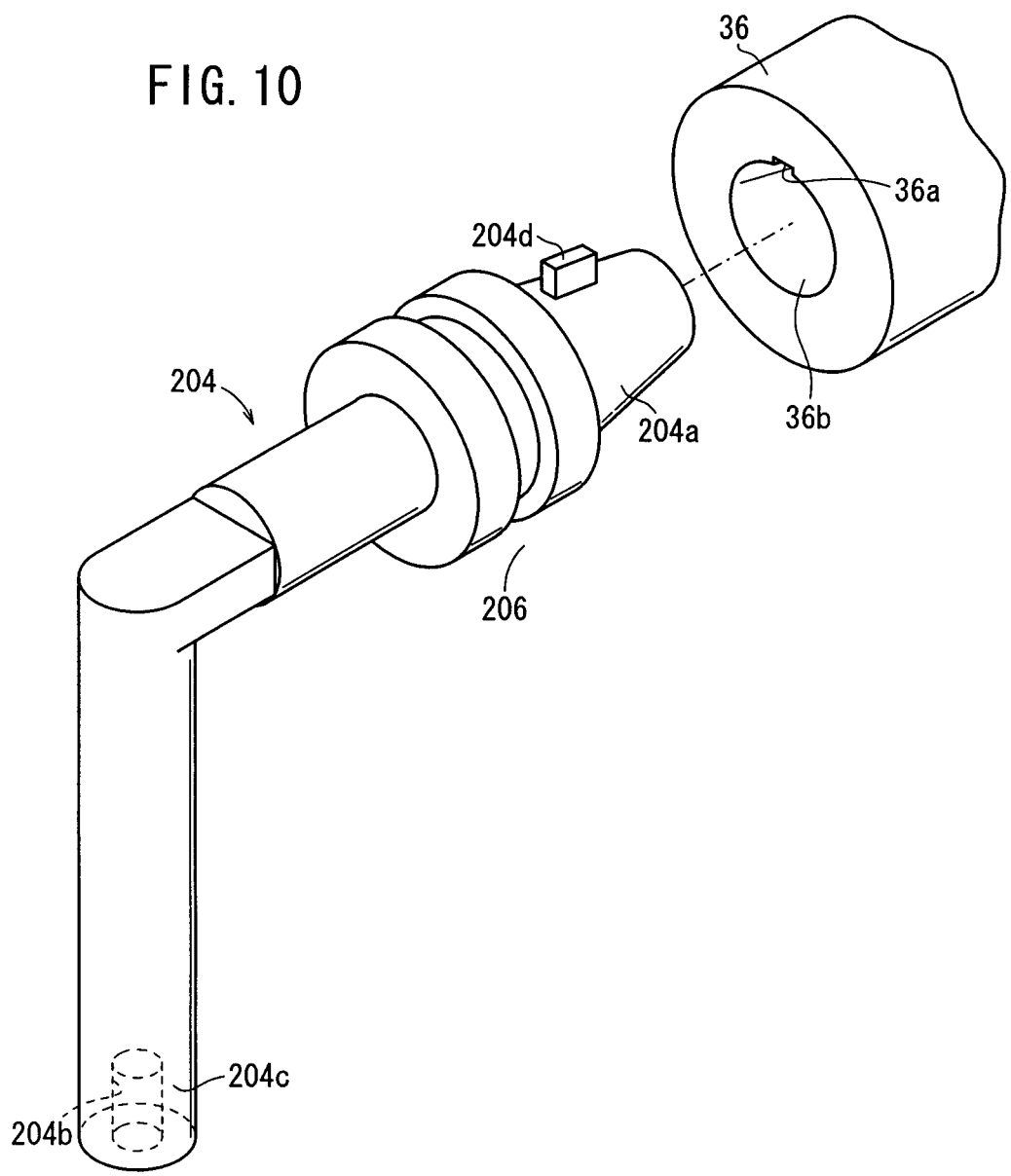
FIG. 10 is a perspective view of a moving tool.

As shown in FIG. 10, the moving tool 204 is constructed so as to be capable of detachably mounting in an installation hole 36b of the processing spindle 36 through a mounting portion 204a, and is equipped with an engagement portion 204c in which a hole 204b is formed that engages with knock pins (fixing parts) 262, 264 of the table 202, as shall be described subsequently. The engagement portion 204c of the moving tool 204 is inserted into and incorporated integrally within a tool holder 206, wherein the engagement portion 204c and the tool holder 206 are positioned by a non-illustrated positioning member. The tool holder 206 is of a commercialized, general purpose structure.

Further, a key 204d is provided on the mounting portion 204a of the tool holder 206, so that when the moving tool 204 is attached to the processing spindle 36, the hole 204b is positioned to point (downwardly) in the direction of the knock pins 262. That is, through engagement of the key 204d in a key groove 36a of the processing spindle 36, the engagement portion 204c is directed downwardly.

Figure 11:
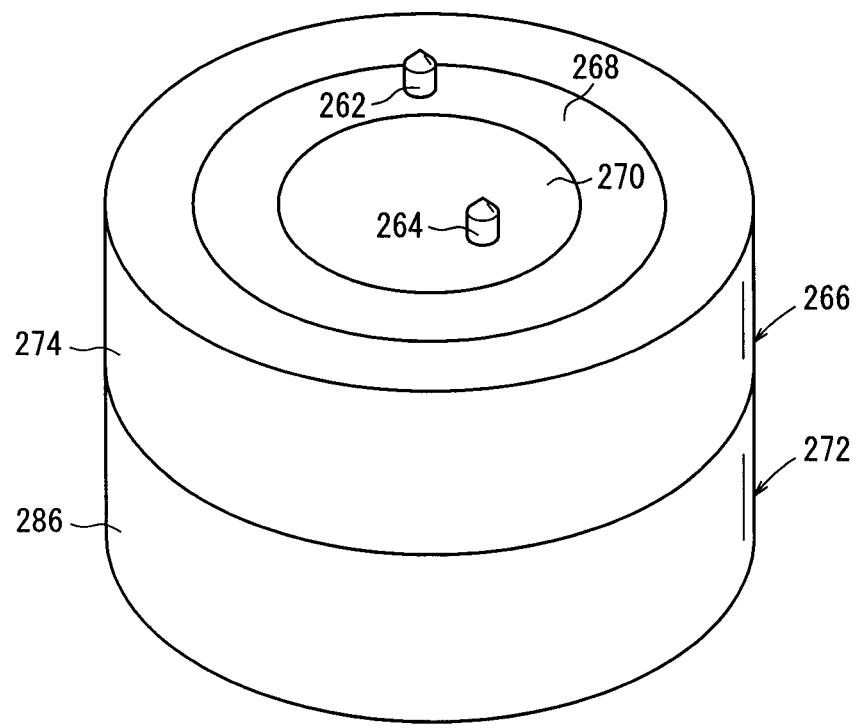
FIG. 11 is a perspective view of a table.
Figure 12:
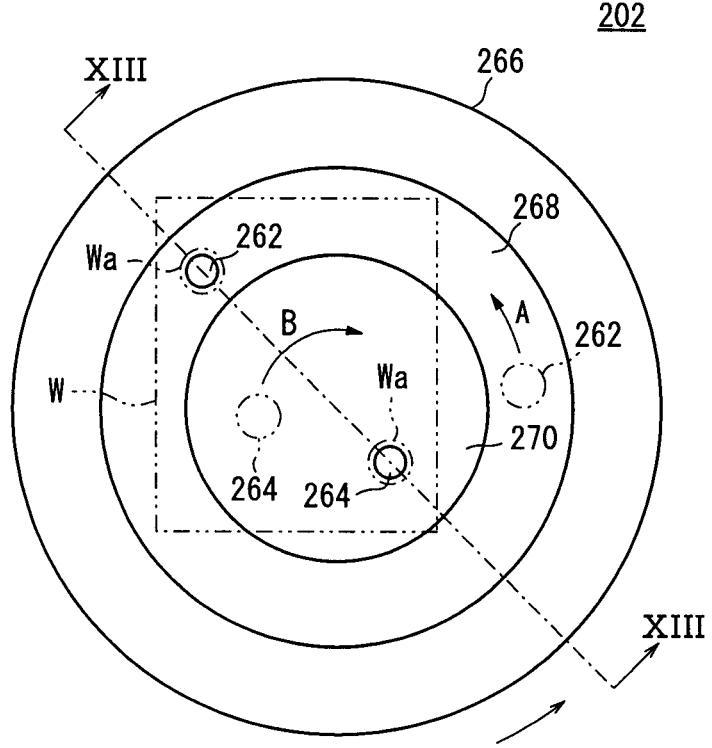
FIG. 12 is a plan view of the table.

As shown in FIG. 11 and FIG. 12, the table 202 comprises a rotating portion 266 on which two knock pins 262, 264 are disposed, serving as fixing parts for being inserted into two holes (positioning reference members) Wa provided as positioning members in the workpiece W, for thereby positioning the workpiece W, and a braking portion 272 assembled underneath the rotating portion 266 for braking rotational movements of an outer side rotation member 268 and an inner side rotation member 270, to be described later, of the rotating portion 266.

Figure 13:
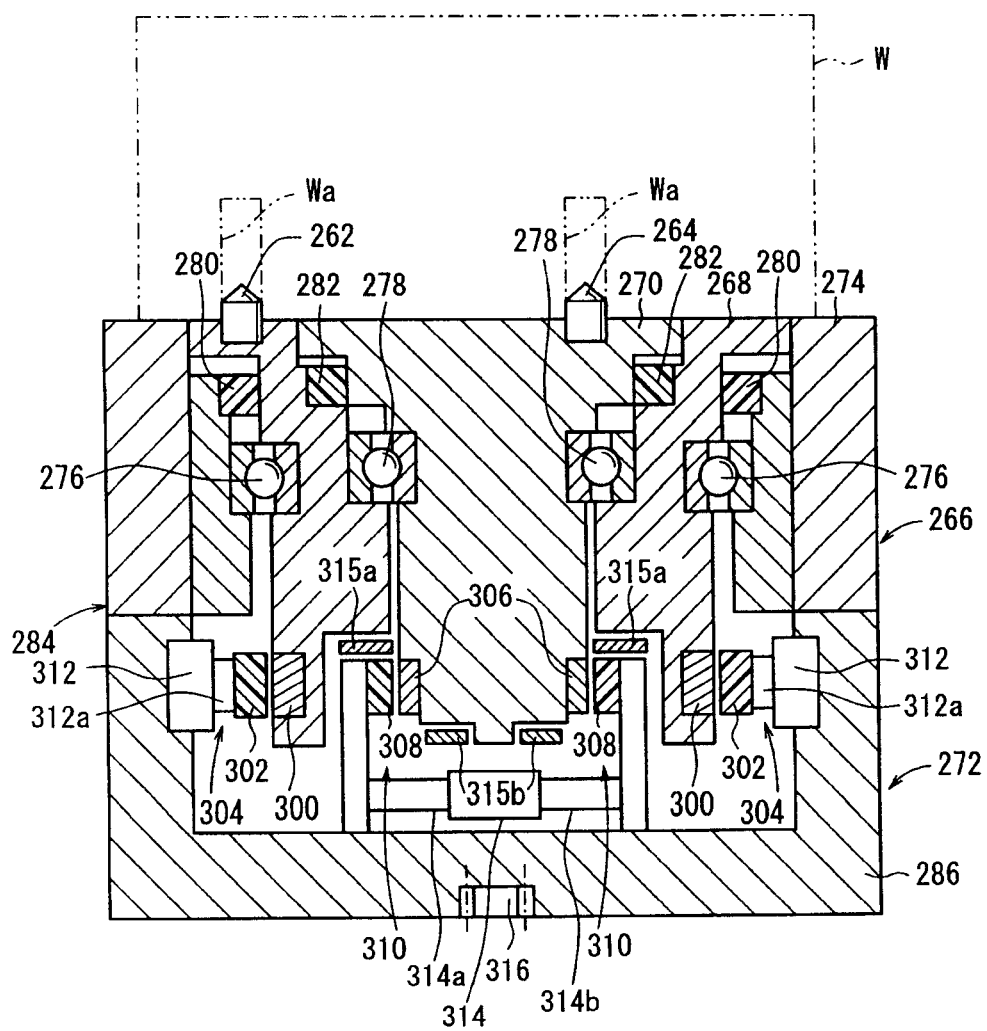
FIG. 13 is a side surface cross sectional view taken along line XIII-XIII in FIG. 12.

As shown in FIG. 13, the rotating portion 266 comprises a cylindrically shaped frame 274 disposed on an outermost side, the outer side rotation member 268 (first rotation member), which is axially supported rotationally by a bearing 276 coaxially on an inner side of the frame 274, and from which the knock pin 262 (first fixing part) projects on an upper surface (workpiece W mounting surface) thereof, and the inner side rotation member 270 (second rotation member), which is axially supported rotationally by a bearing 278 coaxially on an inner side of the outer side rotation member 268, and from which the knock pin 264 (second fixing part) projects on an upper surface (workpiece W mounting surface) thereof.

Respective seals 280, 282 are disposed upwardly of the bearings 276, 278. The seals 280, 282 are provided for the purpose of preventing cutting chips, cutting oil, etc. from the workpiece W, on one end surface of the table 202, on which the workpiece W is affixed by the knock pins 262, 264 onto the frame 274, the outer side rotation member 268 and the inner side rotation member 270, from entering from gaps between the frame 274 and the outer side rotation member 268, or between the outer side rotation member 268 and the inner side rotation member 270, and thereby causing defects in the bearings 276, 278.

The knock pins 262, 264 are detachable with respect to each of the outer side rotation member 268 and the inner side rotation member 270. Owing thereto, corresponding to the size and shape of the holes Wa in the workpiece W, various types of knock pins 262, 264 can be utilized.

Figure 14:
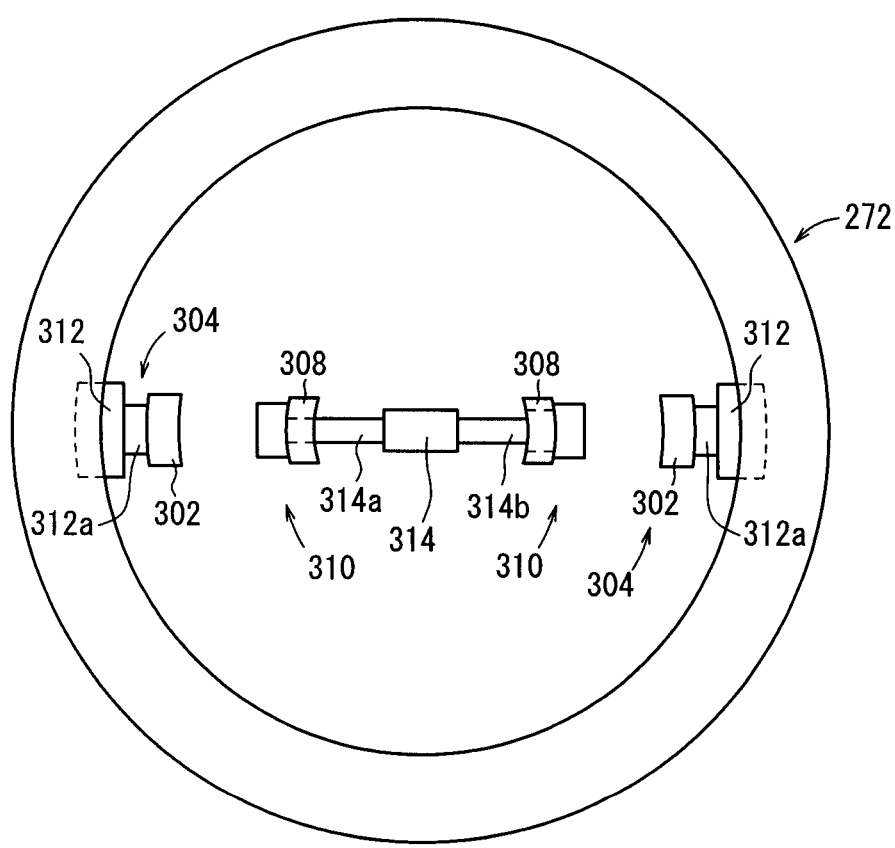
FIG. 14 is a partially omitted plan view of braking members in the table.

On the other hand, the braking portion 272 includes a base 286 having a bottomed cylindrical shape, which is engaged detachably with the aforementioned frame 274 by an engagement portion 284 thereof. Further, as shown in FIGS. 13 and 14, the braking portion 272 comprises a pair of first brakes 304 (brake), which cause the outer side rotation member 268 to be fixed and/or halted by pressing pads 302 against an annularly shaped rotor 300 of the outer side rotation member 268 and through friction caused thereby, and a pair of second brakes 310 (brake), which cause the inner side rotation member 270 to be fixed and/or halted by pressing pads 308 against an annularly shaped rotor 306 of the inner side rotation member 270 and through friction caused thereby.

The first brakes 304 press the pads 302 against the rotor 300, and thus stop or affix rotation of the outer side rotation member 268 by a pressing action in accordance with expansion/retraction of the rods 312a of the cylinder mechanisms 312 under an action of a given controller. Further, the second brakes 310 press the pads 308 against the rotor 306, and thus stop or affix rotation of the inner side rotation member 270 by a pressing action in accordance with expansion/retraction of the rods 314a, 314b of the cylinder mechanisms 314 under an action of the controller.

More specifically, although it shall be described later in greater detail, under an action of the controller, the knock pin 262 is moved to a desired position as a result of the knock pin 262 being moved rotationally via the outer side rotation member 268 by the moving tool 204, and is fixed in place by the first brake 304. Similarly, the knock pin 264 is moved to a desired position as a result of the knock pin 264 being moved rotationally via the inner side rotation member 270 by the moving tool 204, and is fixed in place by the second brake 310.

Owing thereto, with the table 202, under actions of the controller, when the positions of the holes Wa in the workpiece W, or the workpiece W itself, is to be positioned at a desired posture, the knock pins 262, 264 can easily be moved to desired positions by the moving tool 204, which is assembled onto the processing spindle 36 that is movable in X-axis, Y-axis and Z-axis directions, as well as being rotatable. Accordingly, it is possible for various types of workpieces to be positioned easily at desired postures.

Further, by moving the knock pins 262, 264 using the spindle head unit, positioning of the workpiece W can be carried out with high precision and reliability. Furthermore, because the table 202 is operated passively by the moving tool 204, a drive source for the purpose of driving the knock pins 262, 264 can be dispensed with, whereby the structure is simplified and made lighter in weight.

Moreover, in the foregoing manner, the table 202 is constructed such that the rotating portion 266 and the braking portion 272 are attachable and detachable through an engagement portion 284. Owing thereto, the rotating portion 266 and the braking portion 272 can be separated, and a simple and lightweight rotating portion 266 without carrying the braking component may be used as a pallet that positions and fixes the workpiece W. A plurality of such rotating portions 266 serving as pallets may be prepared, whereby workpieces can be exchanged by exchanging as necessary the pallets with respect to the braking portion 272. In this case, by means of a non-illustrated locking mechanism, the outer side rotation member 268 and the inner side rotation member 270 may be locked to disable relative rotation therebetween.

Further, as shown in FIG. 14, the first brake 304 and the second brake 310 have rotor 300, 306 surfaces, which are in parallel together in the direction of the rotation axis of the table 202. Because the pads 302, 308 of the first brake 304 and the second brake 310 each abut respectively against the rotor 300, 306 from radial directions, when not acted on by the cylinder mechanisms 312, 314 of the first brake 304 and the second brake 310, the braking portion 272 can easily be removed from the rotating portion 266 without interference.

Further, in the table 202, in a center bottom portion of the base 286, an engagement hole 316 is formed. The engagement hole 316 is rotatably engaged with a non-illustrated table drive motor. By rotating the table 202 through the table drive motor, in a state wherein the workpiece W is positioned on the table 202, the posture of the workpiece W can easily be changed.

Next, a control method, for a case in which processing of the workpiece W is carried out by the machine tool 200 basically constructed in the foregoing manner, shall be explained.

First, the moving tool 204 is set in the processing spindle 36. In this case, the moving tool 204 is set in the processing spindle 36 via the key 204d (see FIG. 16), so that the engagement portion 204c (engagement hole 204b) thereof is oriented downward. Further, the spindle motor 38 is rotated such that the engagement portion 204c (engagement hole 204b) is maintained in the downward oriented state depending on the direction of the processing spindle 36 when the rotation arm 32 is rotated.

Under operation of the controller, by driving the Z motor 24, the Y motor 28 and the arm motor 34 in the processing spindle 36, the processing spindle 36, in which the moving tool 204 has been set, is moved in X-axis, Y-axis, and Z-axis directions. In addition, the moving tool 204 is stopped while in a state of engagement (two-dot chain line in FIG. 15) through the engagement portion 204c with the knock pin 262, which is in the position (starting point) shown by the two-dot chain line in FIG. 15 (see FIG. 16). The position (starting point) of the knock pin 262 can be determined by an encoder 315a.

Figure 15:
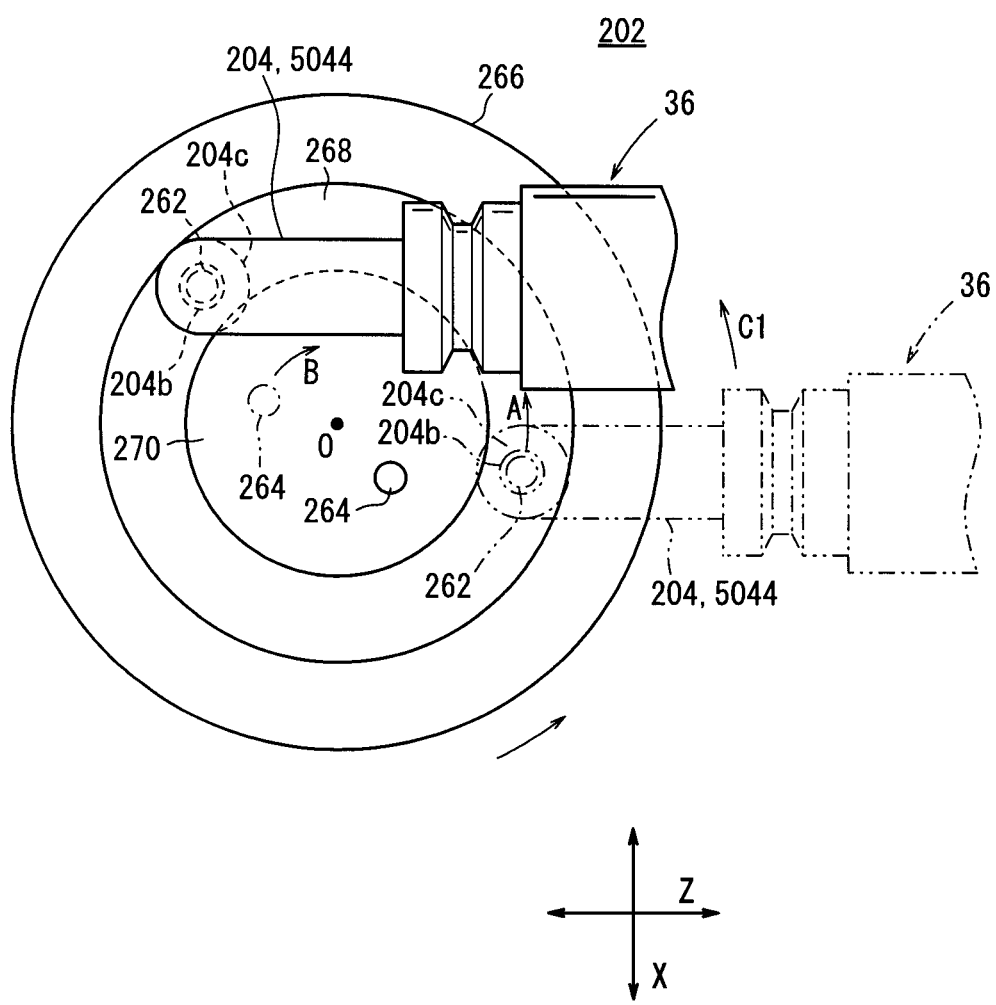
FIG. 15 is a plan view for the purpose of describing rotational movement aspects of a knock pin disposed on the table using a moving tool.
Figure 16:
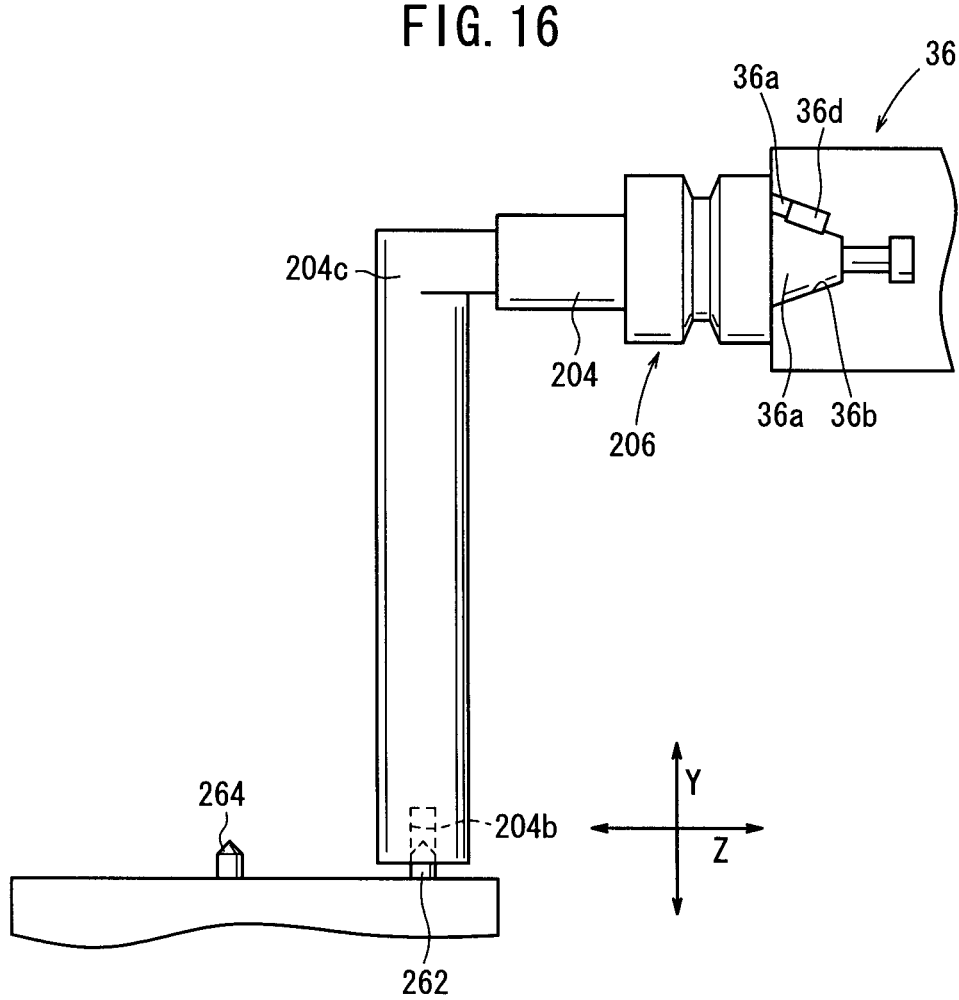
FIG. 16 is a side surface view for describing a condition in which the moving tool engages with the knock pin.

Next, as shown in FIGS. 15 and 16, by means of the processing spindle 36 and while keeping the condition in which the moving tool 204 is engaged with the knock pin 262, the moving tool 204 is moved in the direction of the arrow C1 (X-axis and Z-axis directions) along an arcuate path about the center point O of the table 202, and is stopped at the position shown by the solid line in FIG. 15. Owing thereto, the knock pin 262 is moved rotatably in the direction of the arrow A (X-axis and Z-axis directions) by the moving tool 204, and is moved to the position (end point) shown by the dotted lines in FIG. 15. After such movement, the outer side rotation member 268 is stopped (fixed) reliably by the first brake 304. Also, detection of the aforementioned end point can be performed by the encoder 315a.

Similar to the above-described case for the knock pin 262, the knock pin 264 also is moved rotationally in the direction of the arrow B (X-axis and Z-axis directions) by actions of the moving tool 204 from a starting point, i.e., the position shown by the two-dot chain line in FIG. 15, detected by the encoder 315b, and is moved to the position (end point) shown by the solid line. After such movement, the inner side rotation member 270 is stopped (fixed) reliably by the second brake 310. Also, detection of the aforementioned end point can be performed by the encoder 315b.

As a result, the positions (end points) of the knock pins 262, 264 shown by the solid lines, that is, the distance (position) between the center of the knock pin 262 and the center of the knock pin 264, is set at a distance (position) at which the workpiece W can be positioned in a desired posture. In other words, so that the workpiece W can be positioned at a desired posture, the positions of the knock pins 262, 264 corresponding to positions of the holes Wa become the aforementioned end points.

Next, the workpiece W is positioned on the knock pins 262, 264 through the holes Wa, whereby the workpiece W is set on the table 202 at a desired posture for processing.

Next, by a predetermined means, the moving tool 204 is replaced by a given tool T and processing is carried out on the workpiece W. At this time, because the outer side rotation member 268 and the inner side rotation member 270 are each reliably locked in position by the first brake 304 and the second brake 310, during processing on the workpiece W, the occurrence of shifting of the knock pins 262, 264 due to loads such as cutting resistance or the like can be prevented. Further, the upper surface of the workpiece W may also be fixed by a predetermined pressing and fixing means.

Thereafter, as necessary, while the positioned state of the workpiece W on the table 202 is maintained, the table 202 is rotated by the table drive motor, and the workpiece W is moved into a posture at which processing can be carried out at a next processing location, and in the same manner as above, predetermined processing is performed on the workpiece W.

In the foregoing manner, in accordance with the machine tool 200, using the moving tool 204, the knock pins 262, 264 can be directly and easily moved to positions corresponding to the holes Wa of the workpiece W, and to suitable positions for positioning the workpiece W at a desired posture. Owing thereto, processing can be carried out with respect to the workpiece W, under a condition in which workpieces having various workpiece shapes may be positioned easily at desired postures. Further, it is unnecessary to provide separately a moving means for the knock pins 262, 264, so that the machine tool 200 can be constructed in a compact manner.

Further, since the controlled movements of the aforementioned moving tool 204 can be controlled by the processing spindle 36 of the machine tool 200, positioning of the knock pins 262, 264 can be carried out highly precisely through an NC (numerically controlled) axis.

Below, embodiments of the machine tool according to the present invention shall be presented and explained with reference to FIGS. 17 through 27.

Figure 17:
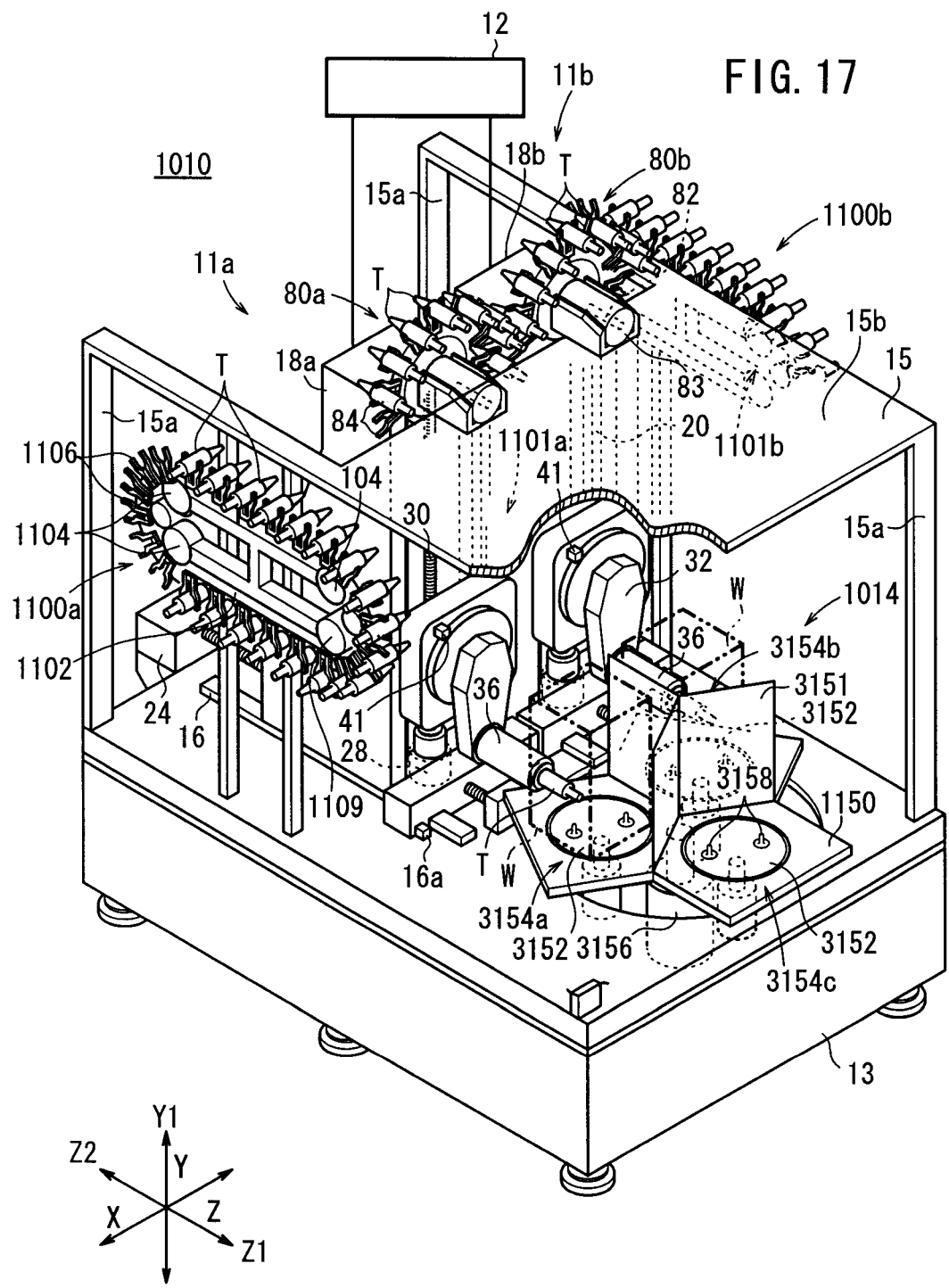
FIG. 17 is a perspective, and partially sectional, view of a machine tool according to a second embodiment.
Figure 18:
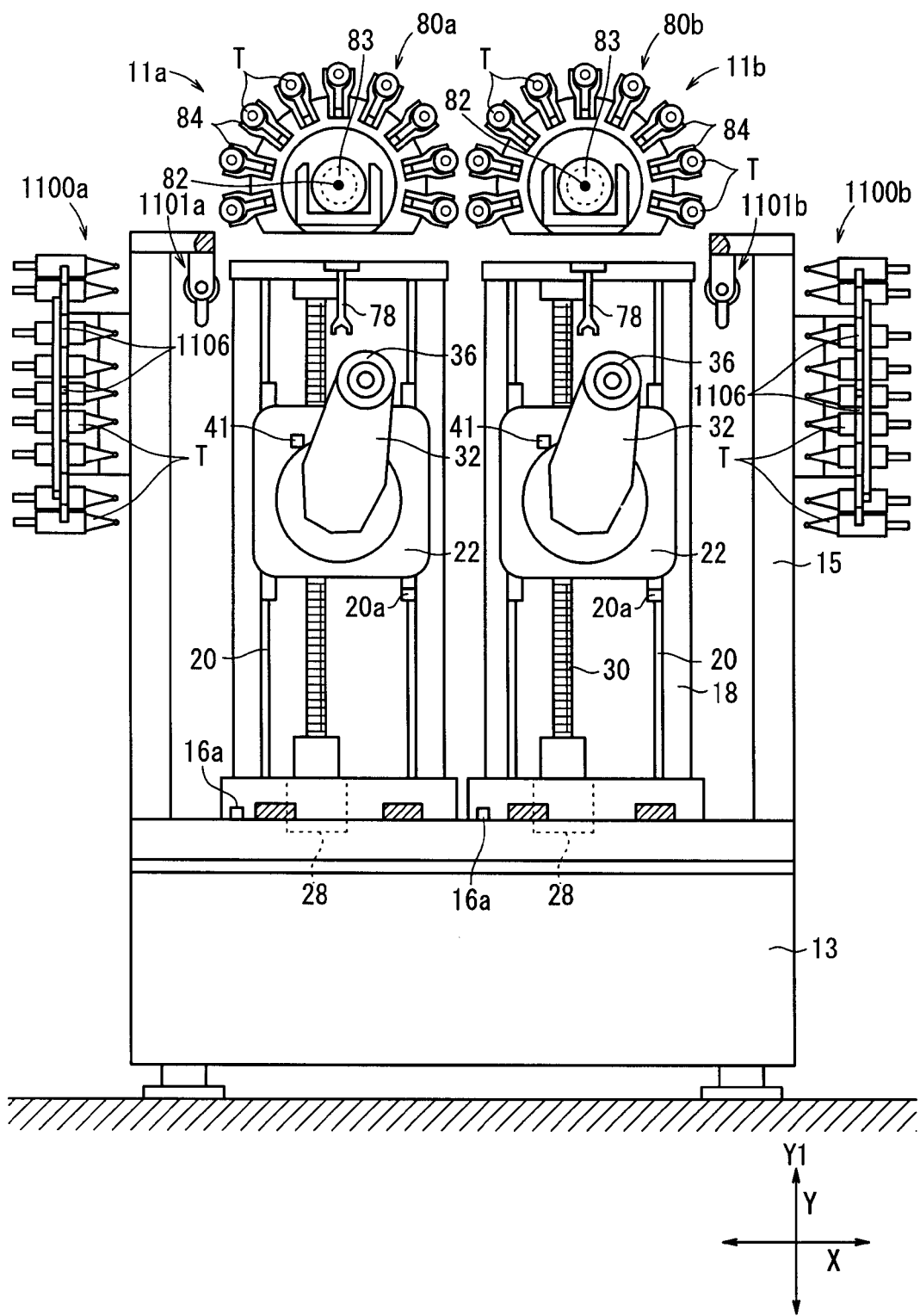
FIG. 18 is a front view of the machine tool according to the second embodiment.
Figure 19:
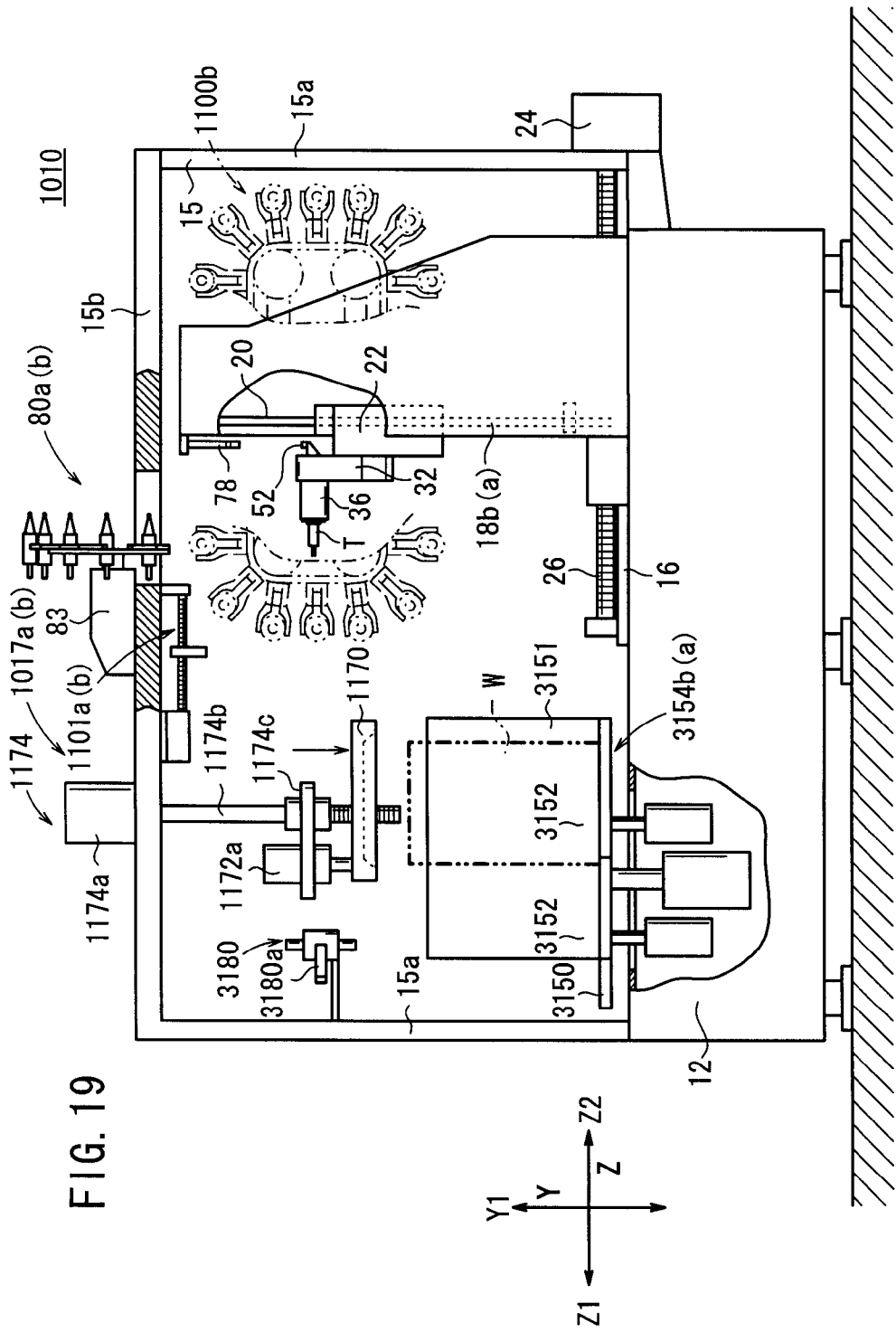
FIG. 19 is a side surface view of the machine tool according to the second embodiment.

FIGS. 17 to 19 are perspective, front and side surface views of a machine tool 1010 according to the second embodiment. As shown in FIGS. 17 to 19, the machine tool 1010 enables processes such as drilling, boring, honing and the like to be carried out with respect to the workpiece W. The machine tool 1010 is constructed with a narrow width as viewed from the front (see FIG. 18).

The machine tool 1010 includes a left side first machine tool 11a and a right side second machine tool 11b as viewed from the front, together with a controller 12 for integrally and cooperatively controlling the first machine tool 11a and the second machine tool 11b. The first machine tool 11a and the second machine tool 11b are disposed adjacent to one another in parallel, and commonly use a machine platen 13, a workpiece moving device 1014 and a frame 15. It is a matter of course, however, that the machine platen 13, the workpiece moving device 1014 and the frame 15 may be used in a dedicated manner by the first machine tool 11a or by the second machine tool 11b. The first machine tool 11a and the second machine tool 11b are of the same structure, and in the following, the first machine tool 11a shall be described as representative of both.

The first machine tool 11a is constructed on the machine platen 13, which is affixed to the floor. The machine platen 13 is narrow in the X direction and has a low form in the Y direction. The workpiece moving device 1014 and the frame 15 are assembled onto the machine platen 13. The workpiece moving device 1014 is disposed in the vicinity of the front side (in the direction of the arrow Z1) of the upper surface on the machine platen 13, and by the workpiece moving device 1014, the workpiece W is affixed such that the workpiece surface to be processed is directed rearwardly (in the direction of the arrow Z2). Upwardly of the workpiece moving device 1014, there are disposed workpiece pressing and fixing devices 1017a, 1017b (see FIG. 19).

So that the supporting body 22, the rotation arm 32, etc. can be seen, the workpiece pressing and fixing devices 1017a, 1017b have been omitted from illustration in FIGS. 17, 18, 20 and 25.

Detailed explanations of the workpiece moving device 1014 and the workpiece pressing and fixing devices 1017a, 1017b shall be described later on.

The frame 15 serves to support thereon rotating magazines (automatic tool exchange mechanisms, main stocker) 80a, 80b, sub-stockers 1100a, 1100b, and tool length detection devices 1101a, 1101b, which shall be described below, and includes four supporting posts 15a, which extend upwardly from both ends in the direction of the arrow Z of the machine platen 13, and a plate 15b, which is supported via the supporting posts 15a.

The first machine tool 11a includes a pair of Z rails 16 disposed on the upper surface of the machine platen 13 and extending in the Z direction, a column 18 that slides in the Z direction while being guided by the Z rails 16, a pair of Y rails 20 that extend in the Y direction on the front surface of the column 18, and a supporting body 22 that slides in the Y direction while being guided by the Y rails 20. The position in the Z direction of the column 18 on the Z rails 16 is detected by a Z position sensor 16a, whereas the position in the Y direction of the supporting body 22 on the Y rails 20 is detected by a Y position sensor 20a, the results of which are supplied respectively to the controller 12.

In the case that a ball screw mechanism is used as the Z direction moving means for the column 18, the function of the Z position sensor is possessed by an encoder equipped normally within the Z motor 24, which detects a rotation angle of the ball screw mechanism from a standard position.

On the other hand, in the case that a linear motor mechanism is used as the Z direction moving means for the column 18, the Z position sensor comprises a linear scale on the side of the normally fixed Z rails 16, while a detector head is provided on the side of the movable column 18, for detecting a position as a displacement from a standard position. The position in the Y direction of the supporting body 22 on the Y rails 20 is detected by the Y position sensor 20a.

In the case that a ball screw mechanism is used for the Y direction movement means of the supporting body 22, the Y position sensor, the mechanism of the Y position sensor is possessed by an encoder equipped normally within the Y motor 28, which detects a rotation angle of the ball screw mechanism from a standard position.

On the other hand, in the case that a linear motor mechanism is used as the Y direction moving means for the supporting body 22, the Y position sensor comprises a linear scale on the side of the normally fixed Y rails 20, while a detector head is provided on the side of the movable supporting body 22, for detecting a position as a displacement from a standard position. Position signals detected respectively by the position sensors 16a, 20a are transmitted to the controller 12.

Figure 20:
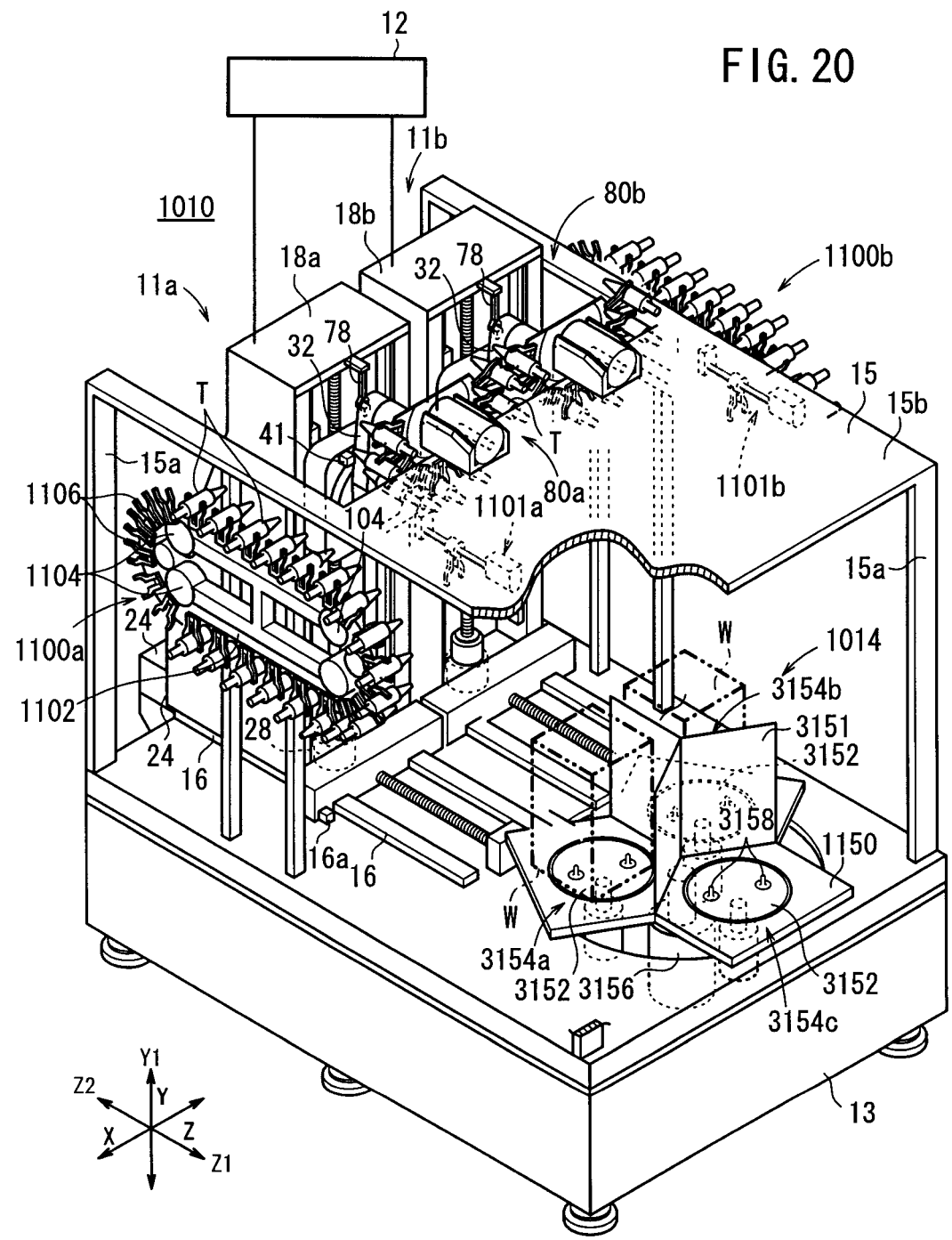
FIG. 20 is a perspective, and partially sectional, view of a processing spindle, a support arm, and an unclamping block during exchanging of tools.

As shown in FIG. 20, a rotating magazine 80a storing a plurality of tools T therein, which are attachable/detachable on the processing spindle 36, is disposed corresponding to the first machine tool 11a, slightly to the left of an upper surface of the plate 15b on the frame 15. Further, a rotating magazine 80b having the same structure as the rotating magazine 80a is disposed corresponding to the second machine tool 11b, slightly to the right of the upper surface of the plate 15b on the frame 15. The rotating magazine 80a shall be described below as exemplary.

The rotating magazines 80a and 80b are of the same structure as the previously described rotating magazine 80, and thus detailed explanations thereof shall be omitted.

As made clear from FIG. 18, the rotating magazine 80a is disposed on an upper portion of the first machine tool 11a, and is capable of storing multiple tools T therein without enlarging the installation area. Further, when the axis of rotation of the rotating magazine 80a is positioned in the same vertical plane with the central axis of rotation of the rotation arm 32, a force vector, which is generated accompanying raising and lowering of the rotation arm 32, points in the direction of the rotating magazine 80a, and a moment is not generated thereby. This feature shall be studied by the models shown in FIGS. 21A and 21B. A mass point M1 in FIGS. 21A and 21B indicates the center of gravity of the rotating magazine 80a, the mass point M2 indicates the center of gravity of the supporting body 22, and a friction damper D connecting the mass points M1 and M2 represents an equivalent mechanism to the connecting portions of the rails 20 and the frame 15, etc., between the rotating magazine 80a and the supporting body 22. Although the mass point M2 varies by the angle of the rotation arm 32, because the mass of the rotation arm 32 is small compared to the mass of the supporting body 22, the range of variation is small and thus has been omitted from this model.

Figure 21A:
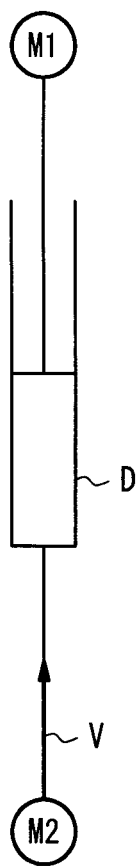
FIG. 21A is a model diagram of a mechanism in which a central axis of rotation of a rotation arm and an axis of rotation of a rotating magazine are arranged on the same vertical plane.

As shown in FIG. 21A, when the mass point M1 and the mass point M2 are disposed in the same vertical plane, from the fact that the mass point M2 indicates the supporting body 22, it moves in a vertical direction along the rails 20, and the vector V indicated by such movement points toward the mass point M1. Stated otherwise, the vector V generates a force solely for expanding and contracting the friction damper D, no moment is generated thereby, and a force that would tend to rotate the model is not generated.

Figure 21B:
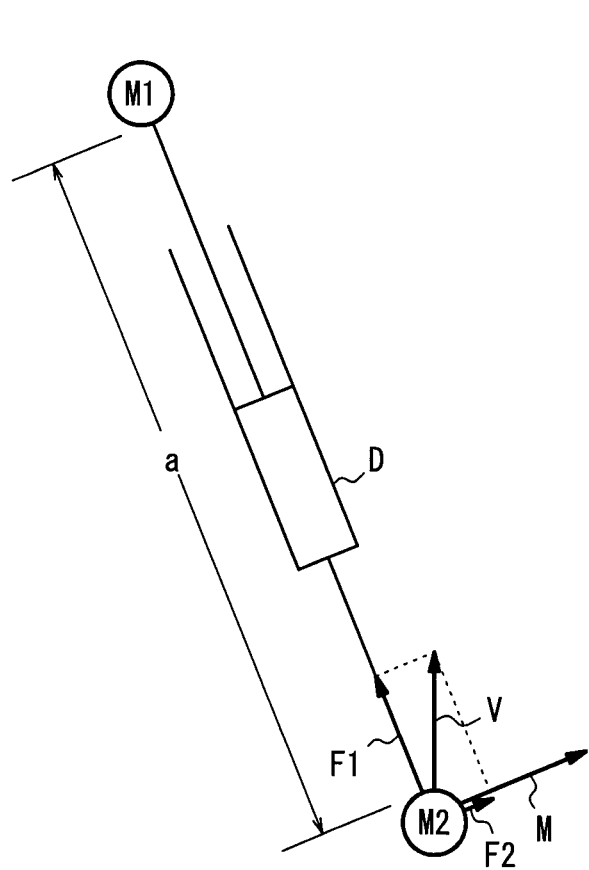
FIG. 21B is a model diagram of a mechanism in which a central axis of rotation of the rotation arm and an axis of rotation of the rotating magazine are arranged in positions, which are not on the same vertical plane.

In contrast thereto, as shown in FIG. 21B, when the mass point M1 and the mass point M2 are not disposed in the same vertical plane, since the vector V that indicates movement of the mass point M2 does not change from being oriented vertically, a force F1 for expanding and contracting the friction damper D, together with a moment $M = F2 \cdot a$, which causes the model to rotate, are generated. The force F2 is a component force of the force indicated by the vector V, and is directed perpendicularly to the extending direction of the friction damper D, whereas the parameter a represents the length of the friction damper D at that time.

In other words, from these models, it is seen that when the center axis of rotation of the rotation arm 32 and the axis of rotation 82 of the rotating magazine 80a do not lie within the same vertical plane, a moment M that tends to rotate the first machine tool 11a is generated and vibrating of the first machine tool 11a occurs. However, when the center axis of rotation of the rotation arm 32 and the axis of rotation 82 of the rotating magazine 80a are in the same vertical plane, such a moment and consequent vibrations are not generated, and thus the stability of the machine tool is high.

Next, explanations shall be given concerning the sub-stockers 1100a and 1100b. As shown in FIG. 17, on the left side surface of the frame 15, a sub-stocker 1100a is disposed, which stores therein a plurality of tools T that are attachable/detachable on the processing spindle 36 corresponding to the first machine tool 11a. Similarly, on the right side surface of the frame 15, a sub-stocker 1100b corresponding to the second machine tool 11b and having a mechanism that is laterally symmetrical to the sub-stocker 1100a is provided. The sub-stocker 1100a and the sub-stocker 1100b are laterally symmetrical and thus have good balance. Below, explanations shall be made of the sub-stocker 1100a as exemplary.

The sub-stocker 1100a includes a circulatory rotation means 1102 made up of a chain or a timing belt or the like, guide rings 1104 made up of pulleys or sprockets or the like that support the circulatory rotation means 1102 at four corners, a plurality (e.g., 40) of support arms 1106 disposed on the circulatory rotation means 1102, a tool transferring mechanism 1108 (see FIG. 22), which attaches and detaches the tools T held by the support arms 1106 with respect to the processing spindle 36, and a motor (indexing mechanism) 1109, which intermittently drives the guide rings 1104 and positions any one of the support arms 1106 at the tool transferring mechanism 1108. The sub-stocker 1100a has an elongate shape along a side wall in the Z direction as viewed from the side (see FIG. 19). Also, the sub-stocker 1100a has a narrow width in the X direction as viewed from the front (see FIG. 18), and the width in the X direction is substantially equal to the length of supported tools T. The support arms 1106 have the same structure as the aforementioned support arms 1084, and hold tools T in such a direction that the tools T protrude in the X arrow direction.

Figure 22:
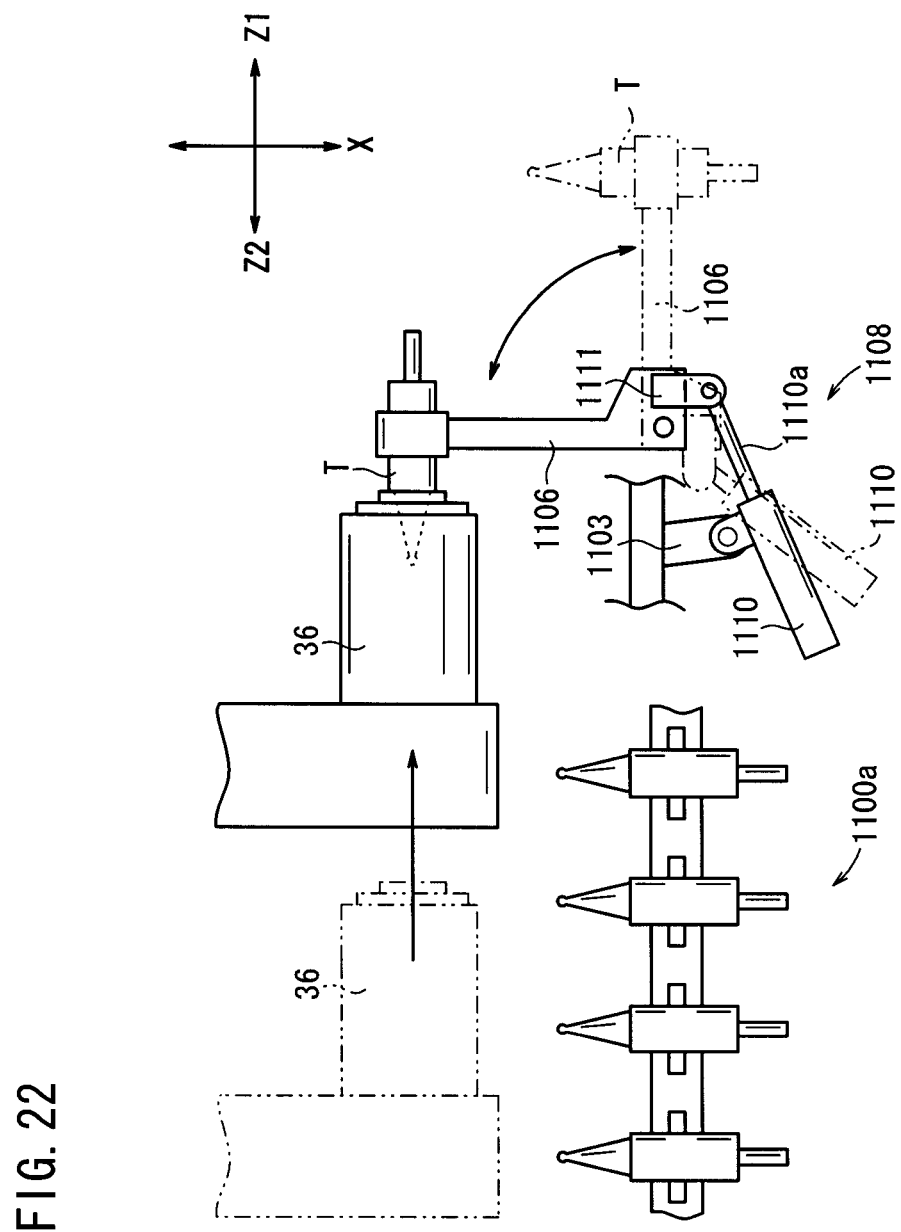
FIG. 22 is a schematic plan view of a tool receiving and transferring mechanism.

As shown in FIG. 22, the tool transferring mechanism 1108 is disposed in the vicinity of an end portion in the Z1 arrow direction of the sub-stocker 1100a, and includes a cylinder 1110, which is swingably supported on a bracket 1103 on a mount (unnumbered), and a chuck 1111, which is disposed at an end of a rod 1110a of the cylinder 1110. On the tool transferring mechanism 1108, a portion of the support arm 1106 disposed at an end in the Z1 arrow direction of the sub-stocker 1100a is gripped by the chuck 1111, wherein by expanding/contracting the rod 1110a, the support arm 1106 and the tool T can be rotated by 90°. As a result thereof, the support arm 1106 is directed in the direction of the arrow X, whereby the tool T becomes oriented in the direction of the arrow Z. While in this condition, by advancing the processing spindle 36 in the Z1 arrow direction, the tool T can be installed. Further, by a reverse action, the tool T can be pulled out from the processing spindle 36 and can be returned into the support arm 1106.

By means of the sub-stocker 1100a including the tool transferring mechanism 1108, because the longitudinal tool axis direction is provided along one direction, a plurality of tools T can suitably be stored. Further, since by a simple tool transferring mechanism, the tool axial direction can be changed and oriented in the Z1 arrow direction, a greater number of tools can be handled, thereby enhancing freedom in the installation positioning of the sub-stocker 1100a.

Although the rotating magazine 80a and the sub-stocker 1100a can be used to store tools together, they can also be used selectively depending on the intended use. For example, the tools T needed for one week's operations may be stored in the sub-stocker 1100a, whereas other tools T, which are needed for operations on one day during the week, may be stored in the rotating magazine 80a. In this case, transferring of tools T between the rotating magazine 80a and the sub-stocker 1100a can be carried out through the tool transferring mechanism 1108 and the processing spindle 36 and, for example, such transferring can be completed automatically during evenings when operations are not being performed.

Next, explanations shall be given concerning the tool length detection devices 1101a and 1101b. The tool length detection device 1101a corresponding to the first machine tool 11a and which detects a length of the tool T installed in the processing spindle 36 is disposed on a left side lower surface of the plate 15b. The tool length detection device 1101b corresponding to the second machine tool 11b and having the same structure as the tool length detection device 1101a is disposed on a right side lower surface of the plate 15b. Below, explanations shall be made of the tool length detection device 1101a as exemplary.

Figure 23:
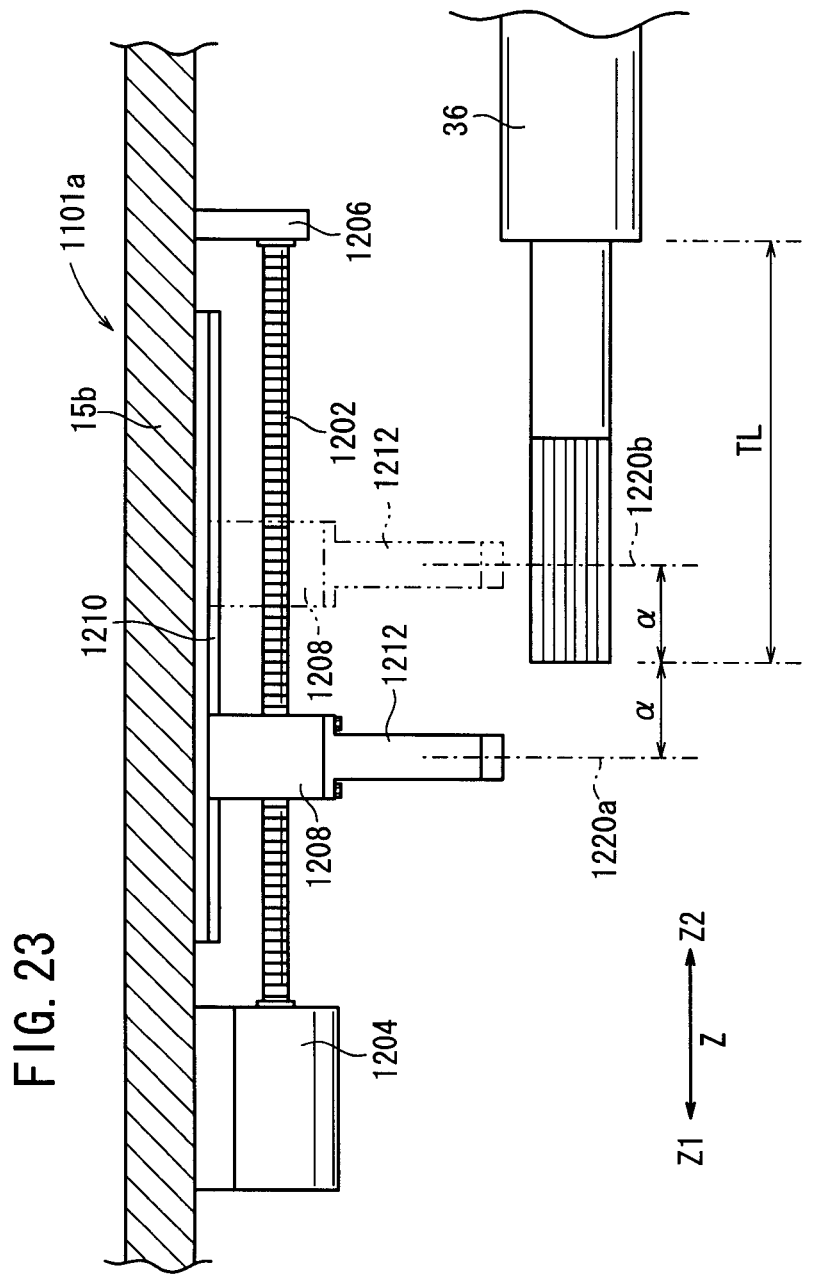
FIG. 23 is a side surface view of a blade tool length detection mechanism.

As shown in FIG. 23, the tool length detection device 1101a includes a ball screw 1202 extending in the Z direction, a motor 1204 connected to an end of the ball screw 1202, a bearing body 1206 disposed on the other end of the ball screw 1202, a nut 1208 which is threaded on the ball screw 1202 and which reciprocates in the Z direction by rotation of the motor 1204, a rail 1210 that guides the nut 1208 along the Z direction, and a non-contact sensor 1212, which is connected to the nut 1208 and oriented downwardly. A non-illustrated linear displacement sensor is disposed on the rail 1210, which detects the Z direction position of the non-contact sensor 1212 and supplies information thereof to the controller 12.

When the column 18, the supporting body 22 and the rotation arm 32 of the first machine tool 11a are moved to a predetermined reference measurement position, the non-contact sensor 1212 can be arranged at a position in an upper vicinity of the tool T installed in the processing spindle 36. The reference measurement position may be set at positions in which, for example, the end of the processing spindle 36 matches with the Z direction position of an end surface of the bearing body 1206, the supporting body 22 is positioned maximally upward, and the rotation arm 32 is tilted 45° to the left as viewed from the front. Further, the non-contact sensor 1212 lies outside of the movement range of the rotation arm 32, and there is no fear of interference thereof with the rotation arm 32, the processing spindle 36, or the tool T.

The controller 12, while referring to signals from the linear displacement sensor, can move the non-contact sensor 1212 to a predetermined position, and at such a position, detects whether the tool T is present or not directly underneath the non-contact sensor 1212.

Further, in the controller 12, a standard length TL of the tool T installed in the processing spindle 36 corresponding to the process flow is registered, such that when the non-contact sensor 1212 does not detect the tool T at a position 1220a moved a minute displacement α in the Z1 direction beyond the standard length TL, and moreover, does detect the tool at a position 1220b moved the minute displacement α in the Z2 direction from the standard length TL, it can be confirmed that the tool T is of a normal length. In the case that the non-contact sensor 1212 detects the tool at the position 1220a, or cannot detect the tool T at the position 1220b, it is judged that a different tool has been installed by mistake, or that the tool T has been damaged.

As a means for detecting the length of the tool T, under operations of the tool length detection device 1101a, measurements may be carried out in real time, while the non-contact sensor 1212 is moving in the Z direction over a range of +/−α with respect to the standard tool length TL, so as to investigate more precisely the length of the tool T. Further, in order to detect the length TL of the tool T by a single non-contact sensor 1212, since it is sufficient for the non-contact sensor 1212 and the tool T to be moved relatively in the Z direction, the non-contact sensor 1212 may be fixed onto a lower surface of the plate 15b, and the column 18 may be moved under actions of the Z motor 24 and the ball screw mechanism 26. By moving the column 18 in the Z direction, the processing spindle 36 and the tool T are moved integrally in the Z direction, thus effecting relative movement with respect to the non-contact sensor 1212, whereby the length TL of the tool T can be detected.

Figure 24:
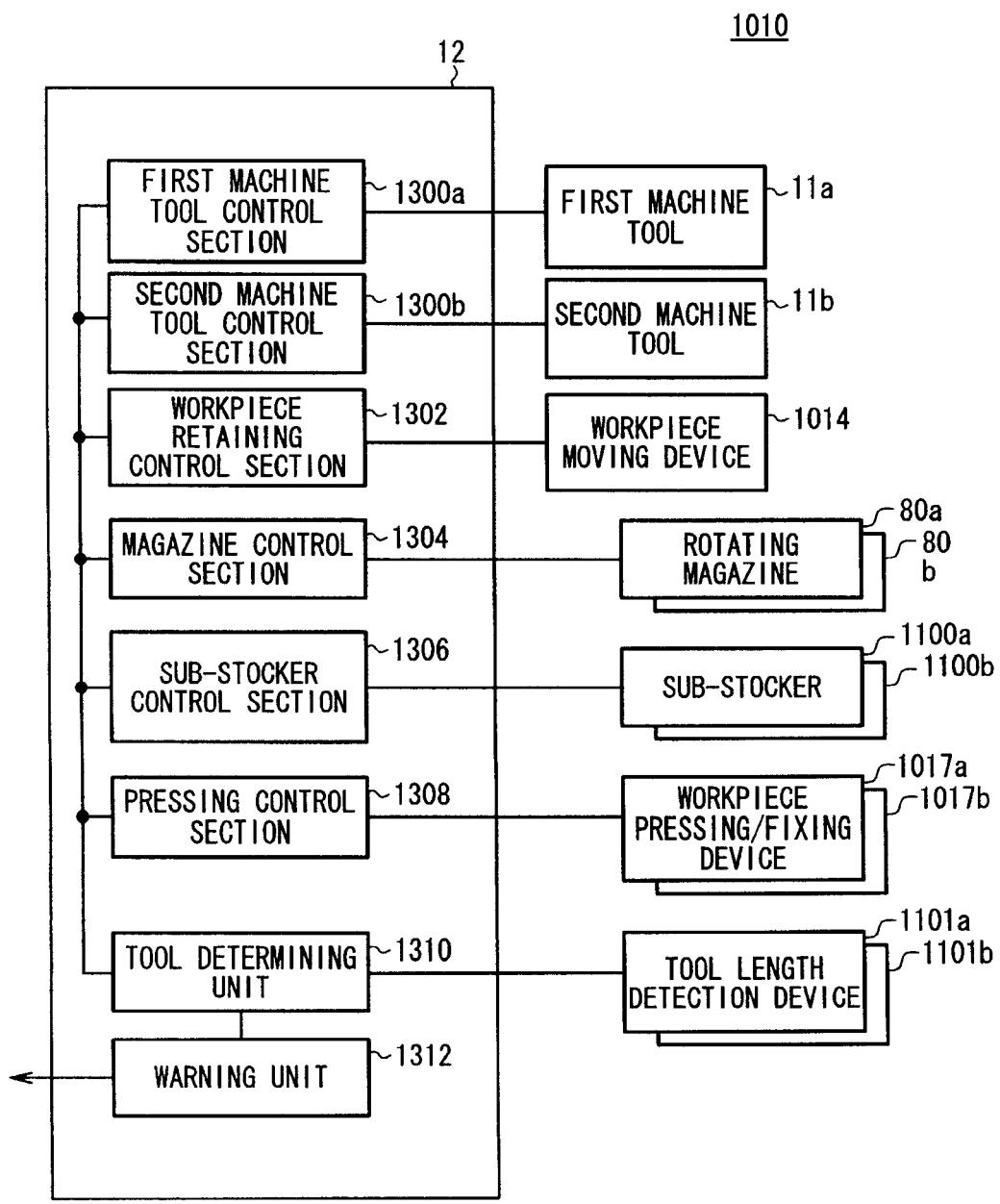
FIG. 24 is a block configuration view of a controller.

As shown in FIG. 24, the controller 12 includes a first machine tool control section 1300a and a second machine tool control section 1300b for controlling the first machine tool 11a and the second machine tool 11b, a workpiece retaining control section 1302 for controlling the workpiece moving device 1014, a magazine control section 1304 for controlling the rotating magazines 80a and 80b, a sub-stocker control section 1306 for controlling the sub-stockers 1100a and 1100b, a pressing control section 1308 for controlling the workpiece pressing and fixing devices 1017a and 1017b, a tool determining unit 1310 for controlling the tool length detection devices 1101a and 1101b and determining whether the tool T is proper or not, and a warning unit 1312 for outputting a predetermined warning when it is detected by the tool determining unit 1310 that the tool T is abnormal.

Figure 25:
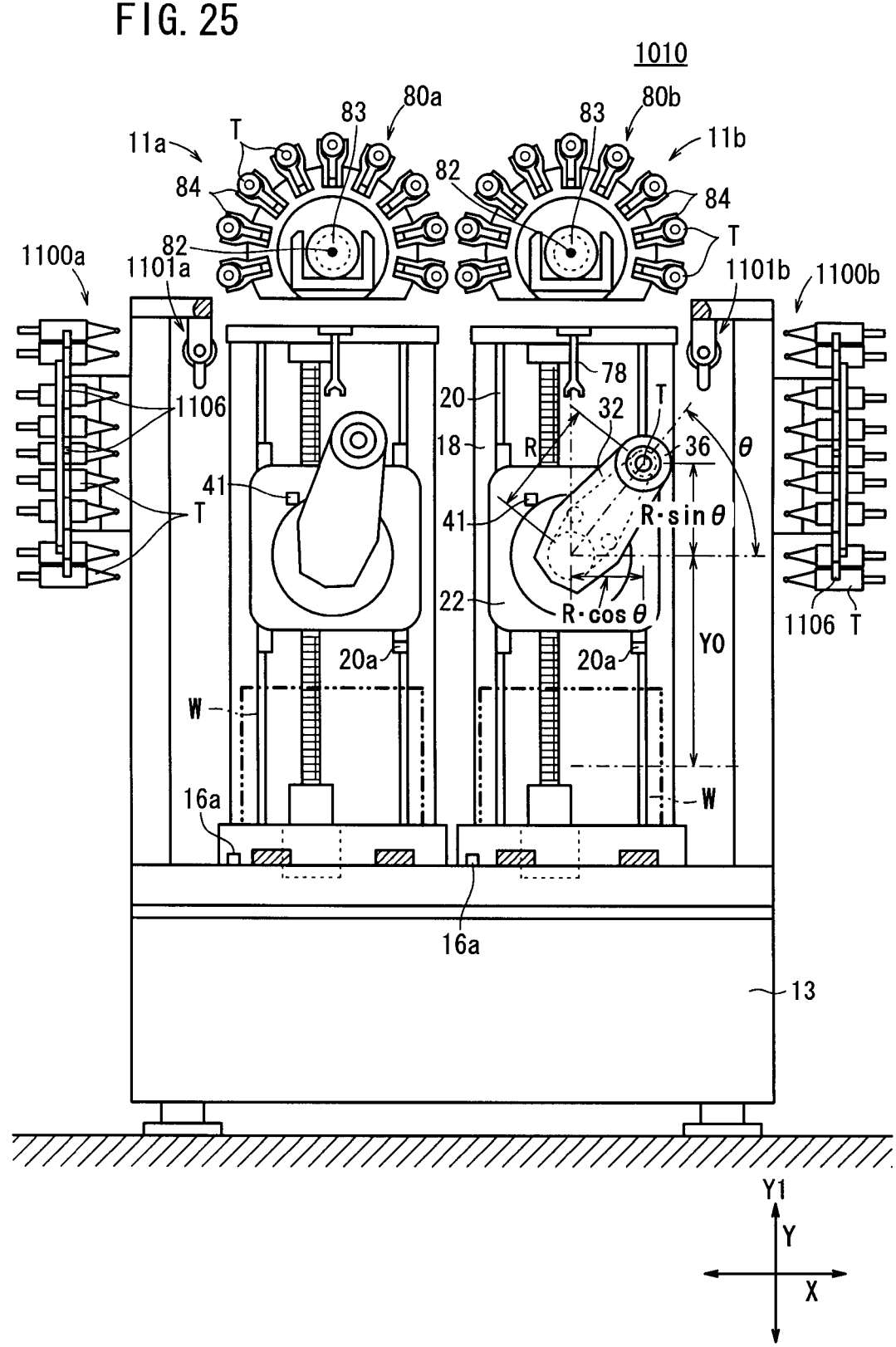
FIG. 25 is a schematic front view of a machine tool for the purpose of displaying coordinates of the processing spindle.

In accordance with the first machine tool 11a constructed in the foregoing manner, similar to the machine tool 10 (see FIG. 8), the horizontal position X of the processing spindle 36 is changed by the inclination of the rotation arm 32 under a rotary action of the arm motor 34, and, for example, as shown in FIG. 25, is represented by X=R·cos θ, with respect to an angle θ from a horizontal orientation of 0°. Further, the vertical position Y of the processing spindle 36 is changed by the inclination of the rotation arm 32 and the height Y0 of the supporting body 22, and is represented by Y=Y0+R·sin θ.

Explanations of the first machine tool 11a have been given as exemplary, however, because the second machine tool 11b has the same structure as that of the first machine tool 11a, detailed explanations thereof have been omitted.

Figure 26:
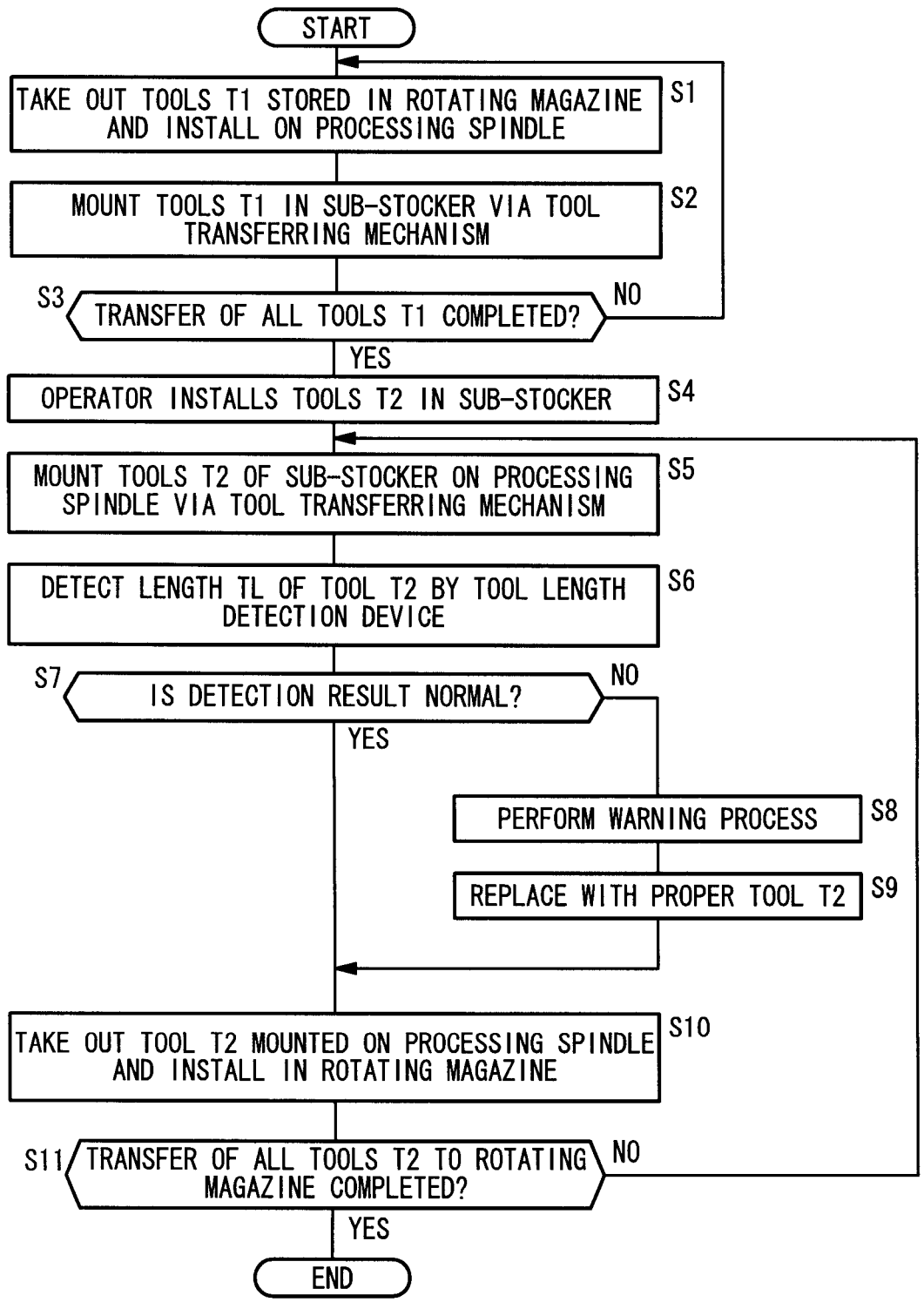
FIG. 26 is a flowchart showing the sequence of a control method according to the second embodiment.

Next, explanations shall be given of a control method carried out using the machine tool 1010 constructed in the foregoing manner, with reference to FIG. 26, in which, when a tool T that was supplied to the processing spindle 36 from the sub-stocker 1100a is moved to the rotating magazine 80a, the length TL of the tool T is detected by the tool length detection device 1101a, and a predetermined warning is output at a time when the tool length TL differs from a registered length.

This sequence is performed as a preparation for the purpose of carrying out processing on a separate second workpiece W2, after processing has been performed continuously on a predetermined number of first workpieces W1, or for a given time, and may be performed, for example, immediately before a noon recess or before evening operations.

Accordingly, even in the case that an operator is not present during noon recess times or during the evening, the system remains online, and daily operation efficiency of the system can be improved.

Further, concerning the tool service life, the support arms 1106 of the sub-stocker are subjected to numbering, so that tools T for which a predetermined processing number has been completed can be moved to the sub-stocker, while spare tools are automatically supplied to the rotating magazine. The support arms 1084 of the rotating magazine also are subjected to numbering, and a memory corresponding to the number or a code thereof is provided in the magazine control section 1304 and the sub-stocker control section 1306, wherein inherent numbers of the tools T stored in the respective support arms, and the cumulative number of processes performed or a cumulative usage time of each of the tools T, are stored in the memory. When the cumulative number of processes or the cumulative usage time exceeds a predetermined number of processes or a predetermined usage time, a spare tool is supplied to the rotating magazine from the sub-stocker 1100a via the processing spindle 36. The tool for which the cumulative number of processes or the cumulative usage time has exceeded the predetermined number of processes or a predetermined usage time, undergoes operations reverse to those just stated, and is returned to the sub-stocker 1100a from the rotating magazine via the processing spindle 36. In the sub-stocker 1100a, lamps (not shown) corresponding to the support arms 1106 are provided, such that when a predetermined number of processes, or the processing time, is exceeded, a lamp corresponding to the returned tool T is illuminated, for example, in red or yellow, whereby the operator is made to recognize that replacement of the tool T is required.

Further, as discussed previously, if other tools having the same specifications are provided, when the tool length TL is abnormal, another tool having the same specifications and which is stored in the rotating magazine or in the sub-stocker 1100a can be installed and operated again, so that stoppage of the system is prevented.

The sequence described below is explained taking the first machine tool 11a as an example, and the sequence is the same for the second machine tool 11b as well.

First, in step S1 in FIG. 26, at this point, each of tools T stored in the rotating magazine 80a is taken out and installed on the processing spindle 36 (see FIG. 6). Herein, the tools T installed in the processing spindle 36 have been used for performing, up till the present time, processing on a first workpiece W1, and such tools are not used subsequently for performing work on a second workpiece W2. Hereinafter, these tools shall be referred to as tools T1.

In step S2, the column 18, the supporting body 22 and the rotation arm 32 are moved to a predetermined exchanging position, and each of the tools T1 is mounted in each of predetermined support arms 1106 of the sub-stocker 1100a via the tool transferring mechanism 1108. As a result, predetermined tools T1 that have been stored in the rotating magazine 80a are moved to the sub-stocker 1100a.

In step S3, it is confirmed whether or not transferring of all of the intended number of tools T1 to the sub-stocker 1100a has been completed. When the intended number of tools T1 have all been transferred, the sequence proceeds to step S4, and if not yet completed, the sequence returns to step S1.

Figure 27:
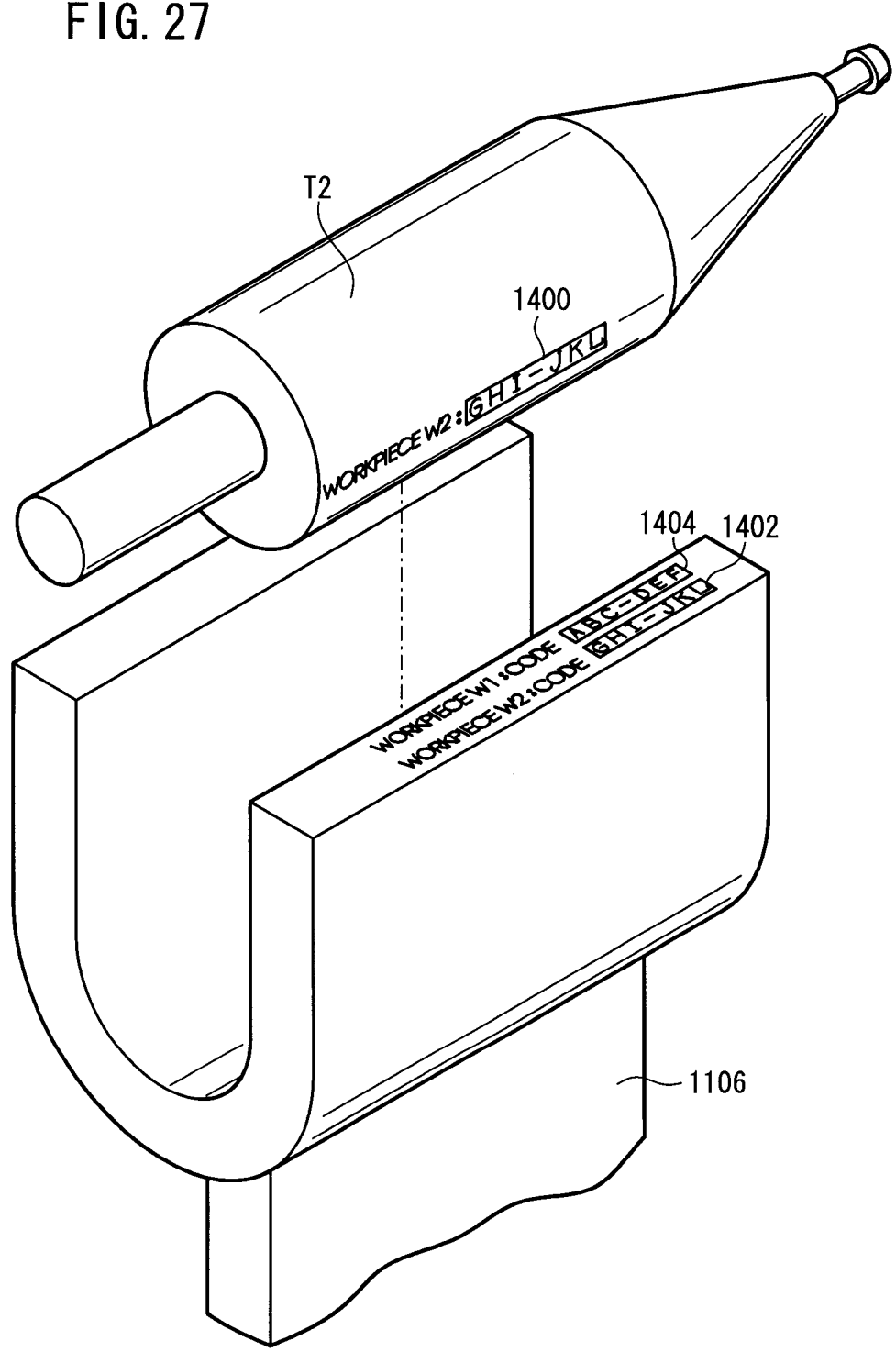
FIG. 27 is a perspective view showing an aspect in which a tool is installed on a support arm.

In step S4, tools (hereinafter referred to as tools T2), which are used for processing on a subsequent second workpiece W2, are mounted in predetermined support arms 1106 on the sub-stocker 1100a. Such a mounting process is performed by an operator, wherein, as shown in FIG. 27, matching of codes 1400 displayed on the tools T2 with identifying codes 1402 displayed on the support arms 1106 is confirmed, and the tools T2 are mounted. The codes 1402 are provided for identifying the tools so that the tools are installed in correct positions on the rotating magazine 80a prior to carrying out processing on the second workpiece W2.

The support arms 1106 for mounting of the tools T2 are in an open condition without having tools T1 therein, or at that time, the installed tools T1 are exchanged and replaced upon mounting of the tools T2. In the case that the corresponding support arms 1106 also correspond to the tools T1, codes 1404 used for identifying the first workpiece W1 also are inscribed thereon.

Further, the mounting process of the tools T2 in step S4 may be carried out simultaneously and in parallel, while the first machine tool 11a carries out processing with respect to the first workpiece W1 prior to the aforementioned step S1.

After all of the tools T2 have been mounted on the sub-stocker 1100a, the operator performs a predetermined input operation with respect to the controller 12, and the controller 12 proceeds to step S5 based on such input.

In step S5, the column 18, the supporting body 22 and the rotation arm 32 are moved to a predetermined exchanging position, and the tools T2 stored in the support arms 1106 of the sub-stocker 1100a are installed on the processing spindle 36 via the tool transferring mechanism 1108.

In step S6, the column 18, the supporting body 22 and the rotation arm 32 are moved to the aforementioned standard measurement position, and the length TL of the tool T2 is detected by the tool length detection device 1101a. At this time, since the plurality of tools T2 have different lengths respectively, in the tool length detection device 1101a, lengths TL of the tools T2 are recorded and supplied as standard values in the tool determining unit 1310, and as shown in FIG. 23, the non-contact sensor 1212 is moved in the Z1 and Z2 directions by the minute distance α and detection is carried out.

In step S7, the tool determining unit 1310 performs a determination as to whether the detection result by the tool length detection device 1101a is normal or abnormal. That is, when the tool T2 is detected by the non-contact sensor 1212 at the position 1220a (see FIG. 23), and yet the tool T2 is not detected at the position 1220b, the tool T2 is judged to be normal, and the tool is judge to be abnormal at times apart therefrom. If the tool T2 is normal, the sequence proceeds to step S10, and if abnormal, the sequence proceeds to step S8.

In step S8, the tool determining unit 1310 carries out a warning process through the warning unit 1312. Specifically, in such a case, since there is a concern that the tool T2 may be improperly installed or defective, a process is performed in order that confirmations, as well as a reminder to exchange the tool, are made with respect to the operator. For the warning process, for example, sound output, image output, lamp illumination and reporting to an external computer or the like, may be given as examples. Further, at this time, the first machine tool 11a is stopped temporarily. In addition, in order to avoid such temporary stoppage and to improve operation efficiency, the method for supplying a spare tool discussed above may also be performed.

In step S9, confirmation of the tool T2 is performed by the operator who has acknowledged the warning, and in the case that a mistaken mounting or defect has occurred, replacement thereof with a correct tool T2 is carried out. After confirmation/replacement of the tool T2, the operator performs a predetermined input operation on the controller 12, and based on the input, the controller 12 then proceeds to step S10.

In step S10, the tool T2 installed on the processing spindle 36 is mounted in a predetermined support arm 1084 on the rotating magazine 80a. Owing thereto, based on the codes 1400 and 1402, a predetermined tool T2 that was mounted in the sub-stocker 1100a is mounted onto a corresponding support arm 1084 on the rotating magazine 80a.

In step S11, it is confirmed whether or not an intended number of tools T2 have all been transferred to the rotating magazine 80a. When the intended number of tools T2 have been transferred, the process shown in FIG. 26 is completed and processing of the second workpiece W2 is carried out, or if all of the tools T2 have not yet been transferred, the sequence returns to step S5.

Thereafter, upon processing of the second workpiece W2, in the same manner as the processing performed on the first workpiece W1, corresponding to the processing location and process sequence, a corresponding tool T2 from the rotating magazine 80a is installed on the processing spindle 36, and the column 18, the supporting body 22 and the rotation arm 32 are moved in conformity with the processing location, and processing is carried out by rotating the tool T2 through rotation of the spindle motor 38, while the column 18 is moved additionally in the Z1 direction.

In this manner, with the control method used by the machine tool 1010, when tools T2 are moved from the sub-stocker 1100a to the rotating magazine 80a, the tool length TL is confirmed automatically by the non-contact sensor 1212, whereby prior to carrying out processing, an abnormality such as mistaken installation or breakage, etc., can be detected. Accordingly, carrying out of processing with respect to the second workpiece W2 by a mistaken tool, or a condition in which processing cannot be carried out, can be prevented.

Further, by means of the control method, before processing on the second workpiece W2 is initiated, since the tool lengths TL concerning all of the tools T2 necessary for processing are detected and it can be confirmed that they are normal, when processing is initiated and during processing of the second workpiece W2, stoppage of processing due to abnormal tools T2 is unnecessary, and operation efficiency and productivity of the first machine tool 11a can be improved.

Figure 28:
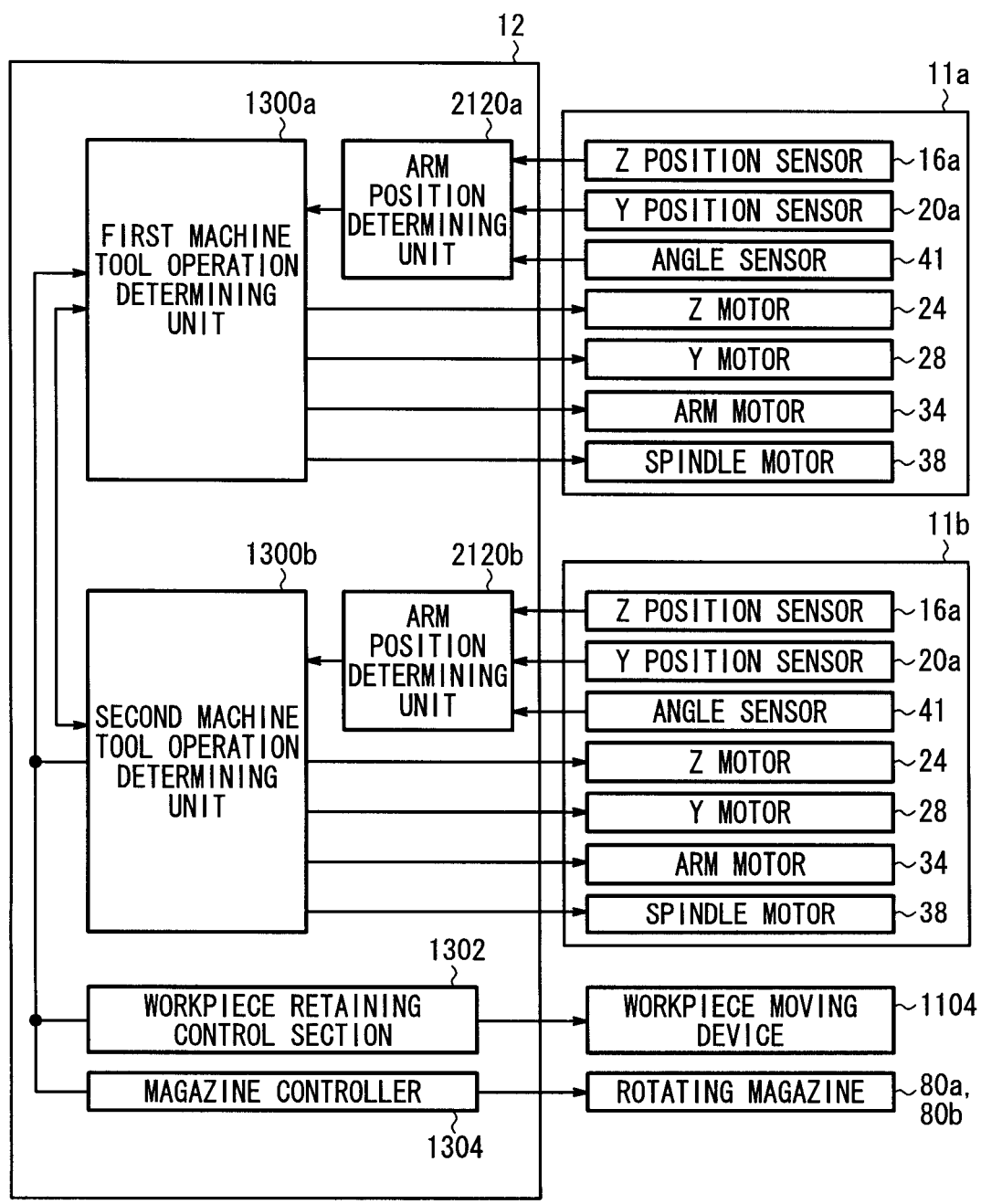
FIG. 28 is a block configuration view of a controller.

The structure of the controller 12 shown in FIG. 24 shall be explained again from a different viewpoint, with reference to FIG. 28.

As shown in FIG. 28, the controller 12 includes an arm position determining unit 2120a and an arm position determining unit 2120b, which determine positions of the rotation arm 32a and the rotation arm 32b based on signals from Z position sensors 16a, Y position sensors 20a and the angle sensors 41, and a first machine tool control section 1300a and a second machine tool control section 1300b for controlling operations of the first machine tool 11a and the second machine tool 11b. Position information of the rotation arm 32a determined by the arm position determining unit 2120a is transmitted to the first machine tool control section 1300a, whereas position information of the rotation arm 32b determined by the arm position determining unit 2120b is transmitted to the second machine tool control section 1300b. The first machine tool control section 1300a and the second machine tool control section 1300b control driving of the Z motors 24, the Y motors 28, the arm motors 34 and the spindle motors 38 of the corresponding first machine tool 11a and second machine tool 11b.

The arrows in FIG. 28 extend from the second machine tool control section 1300b to the Z motor 24, the Y motor 28, the arm motor 34 and the spindle motor 38. That is, signals are output from the first machine tool control section 1300a to control the Z motor 24, the Y motor 28, the arm motor 34 and the spindle motor 38. As the control method, known types of current controls, voltage controls, frequency controls, etc., may be utilized. As a matter of course, at this time, the currents, voltages, frequencies, etc., of each of the motors 24, 28, 34 and 38 may be subjected to feedback control. That is, the signals obtained from each of the motors 24, 28, 34 and 38 reach the first machine tool control section 1300a, whereupon control of driving of the motors 24, 28, 34 and 38 may be carried out reflecting the values of such signals.

The first machine tool control section 1300a, the second machine tool control section 1300b, the workpiece retaining control section 1302, and the magazine control section 1304 are mutually interconnected and carry out operations cooperatively. In particular, in the case that the displacements in the Z direction of the rotation arms 32a and 32b are equal to each other, the first machine tool control section 1300a and the second machine tool control section 1300b operate such that when one of the rotation arms is moved, the position of the other rotation arm is confirmed, and when mutual interference therebetween is generated, movement of the one arm is halted, or an operation that is one sequence ahead is performed first.

Next, operations to prevent interference between the rotation arm 32a and the rotation arm 32b by actions of the controller 12 shall be explained with reference to FIGS. 29 through 34.

Figure 29:
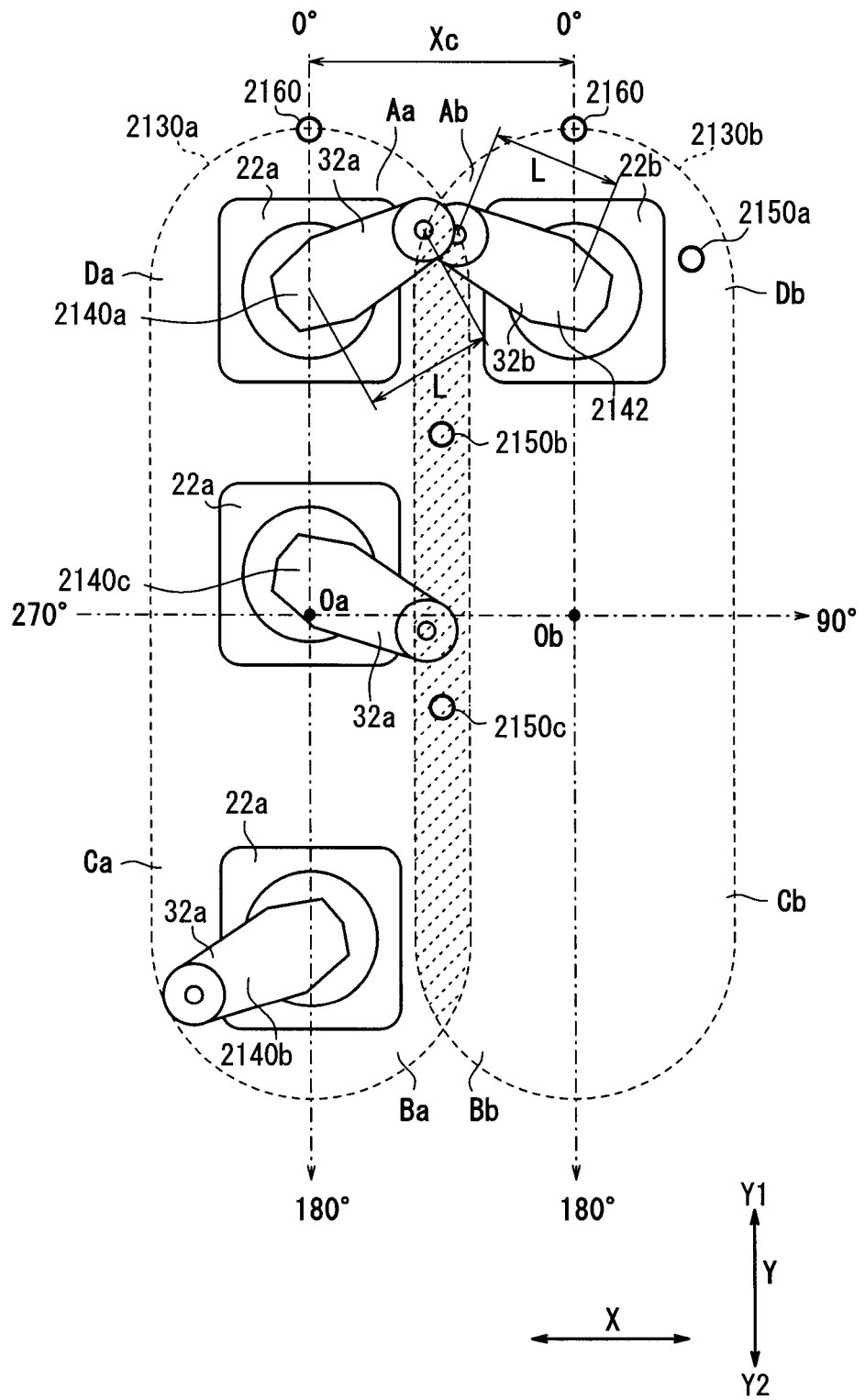
FIG. 29 is a schematic view showing movement ranges of each of left and right rotation arms as viewed from the front.

As shown in FIG. 29, as viewed frontally from the Z direction, concerning the movement range 2130a of the rotation arm 32a and the movement range 2130b of the rotation arm 32b, an overlapping portion thereof is shown by hatching, and in the event that the Z direction displacements of the first and second rotation arms 32a and 32b are equal to each other, mutual interference between the rotation arms at this portion will be generated. Such interference is generated in the case that the horizontal distance Xc between the center of rotation C of the first machine tool 11a and the center of rotation C of the second machine tool 11b is shorter than the combined length 2L of the rotation arms 32a and 32b (the lengths of the arms may also differ from each other). When, as shown in FIG. 29, the rotation arm 32a is at the position indicated by reference numeral 2140a and the rotation arm 32b is at the position indicated by reference numeral 2142, it can be seen that ends of the rotation arms interfere with each other within the hatched region. Consequently, in the controller 12, mutual interference between the rotation arm 32a and the rotation arm 32b is prevented in the following manner.

Figure 30:
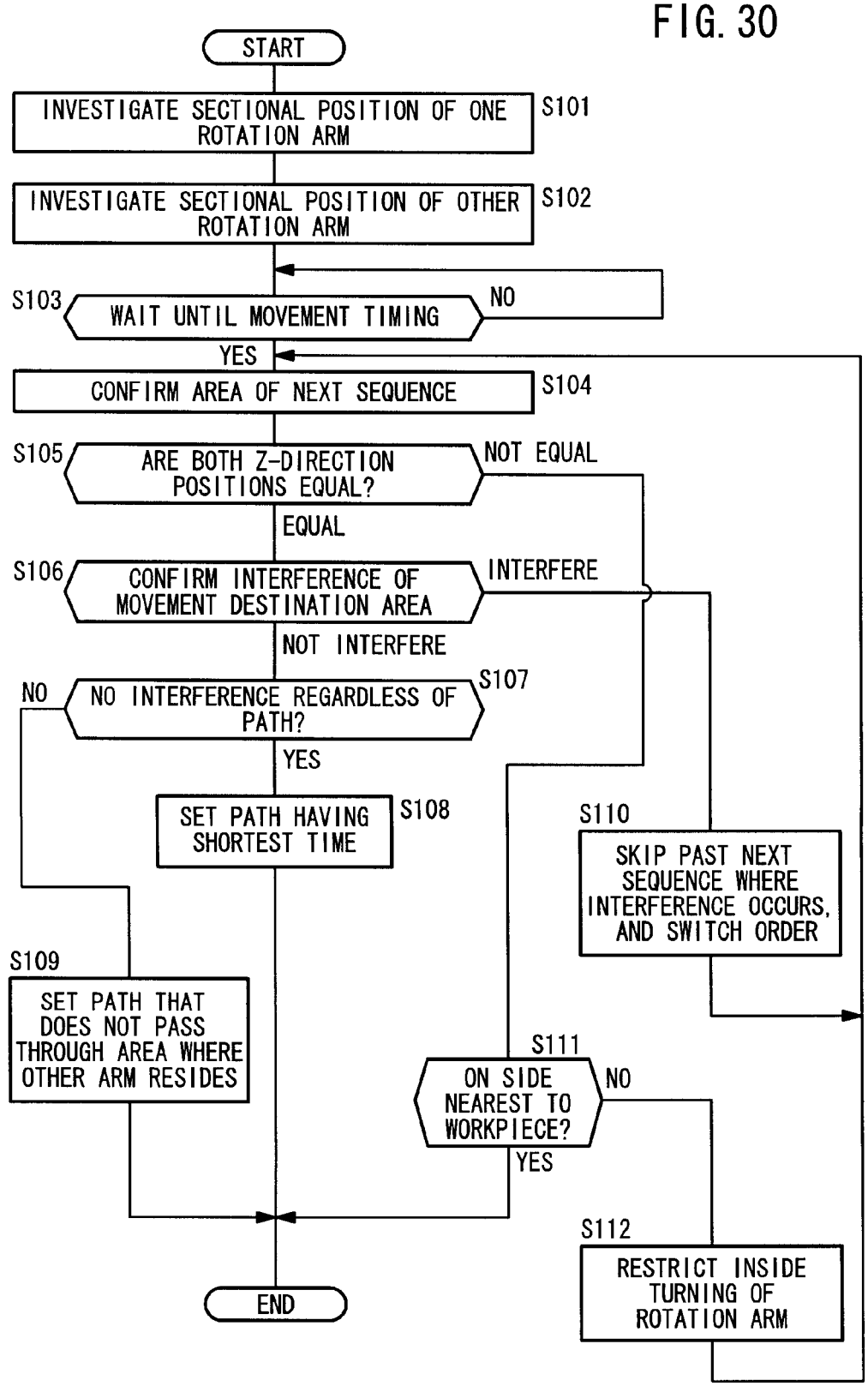
FIG. 30 is a flowchart showing a portion of a sequence of operations of the machine tool according to the second embodiment.

First, in step S101 in FIG. 30, the sectional position of the rotation arm 32a is investigated. More specifically, as shown in FIG. 29, taking as a reference the center point Oa of the movement range in the Y direction of the supporting body 22, the movement range 2130a of the left side rotation arm 32a is set up beforehand into respective areas, including an area Aa rotated clockwise from 0° to 90° taking the top upper side as being 0°, an area Ba from 90° to 180°, an area Ca from 180° to 270°, and an area Da from 270° to 360° (=0°). Based on data obtained from the arm position determining unit 2120a, it is determined in which of these areas the rotation arm 32a resides.

For example, in the case that the supporting body 22a is higher than the center point Oa (toward the side of the arrow Y1), if the angle of the rotation arm 32a covers a range of 0° to 90°, the area Aa is set, and if the angle of the rotation arm 32a covers a range of 270° to 360°, the area Da is set. Further, in the case that the supporting body 22a is lower than the center point Oa (toward the side of the arrow Y2), if the angle of the rotation arm 32a covers a range of 90° to 180°, the area Ba is set, and if the angle of the rotation arm 32a covers a range of 180° to 270°, the area Ca is set. Stated otherwise, as shown in FIG. 29, at the position shown by reference numeral 2140a, the area Aa results, whereas at the position shown by reference numeral 2140b, the area Ca results.

The position of the rotation arm 32a is not required to be set within a single area only. For example, at the position indicated by the reference numeral 2140c, when the supporting body 22a is slightly upward of the center point Oa, and the rotation arm 32a is on the order of 120°, the processing spindle 36 of the rotation arm 32a resides within the area Ba, however, a portion of the rotation arm 32a also resides within the area Aa. In such a case, the position of the rotation arm 32a is set as being in both area Aa and area Ba.

In step S102, the sectional position of the rotation arm 32b is investigated. More specifically, as shown in FIG. 29, taking as a reference the center point Ob of the movement range in the Y direction of the supporting body 22, the movement range 2130b of the right side rotation arm 32b is set up beforehand into respective areas, including an area Db rotated clockwise from 0° to 90° taking the top upper side as being 0°, an area Cb from 90° to 180°, an area Bb from 180° to 270°, and an area Ab from 270° to 360° (=0°). Based on data obtained from the arm position determining unit 2120b, it is determined in which of these areas the rotation arm 32b resides. As is made clear in FIG. 29, the areas of the movement range 2130a and the areas of the movement range 2130b are left/right symmetric. Further, generation of interference between the rotation arm 32a and the rotation arm 32b occurs between areas Aa and Ab, or between areas Ba and Bb. Setting of the areas of the rotation arm 32b is handled in the same manner as setting of the areas of the rotation arm 32a in step S101, and thus detailed explanations thereof are omitted.

In step S103, the system waits for a timing at which movement of the rotation arm 32a or the rotation arm 32b is performed. A plurality of processes are carried out by the rotation arm 32a and the rotation arm 32b with respect to the workpiece W, and when one of these processes is completed, a process at another position, or a process using a different tool at the same position, is carried out.

For example, a process performed by the rotation arm 32b on the workpiece W by means of the following sequences is considered.

1st Sequence: process for boring a first hole 2150a, 2nd Sequence: process for boring a second hole 2150b, 3rd Sequence: process for boring a third hole 2150c, 4th Sequence: exchange tools, 5th Sequence: process for honing the first hole 2150a, 6th Sequence: process for honing the second hole 2150*b*, and 7th Sequence: process for honing the third hole 2150*c* (for the positions of the holes, refer to FIG. 29).

Further, concerning the rotation arm 32*a* as well, processing is carried out based on a plurality of sequences, and in step S103, the system waits until a timing at which at least one of the rotation arms 32*a*, 32*b* moves on to a next sequence.

In step S104, the area of the processing position carried out by the next sequence is confirmed. For example, in the case that the rotation arm 32*b* moves from the first sequence to the second sequence, the position of the second hole 2150*b* is confirmed, and it is confirmed, as made clear from FIG. 29, that the rotation arm 32*b* resides in area Ab.

Further, in the event that an exchange of tools is performed, as in the fourth sequence, a tool exchanging position 2160 (e.g., the 0° position at the apex in the Y1 direction) is deemed to be the processing position, which may be handled as the area Db.

Figure 31:
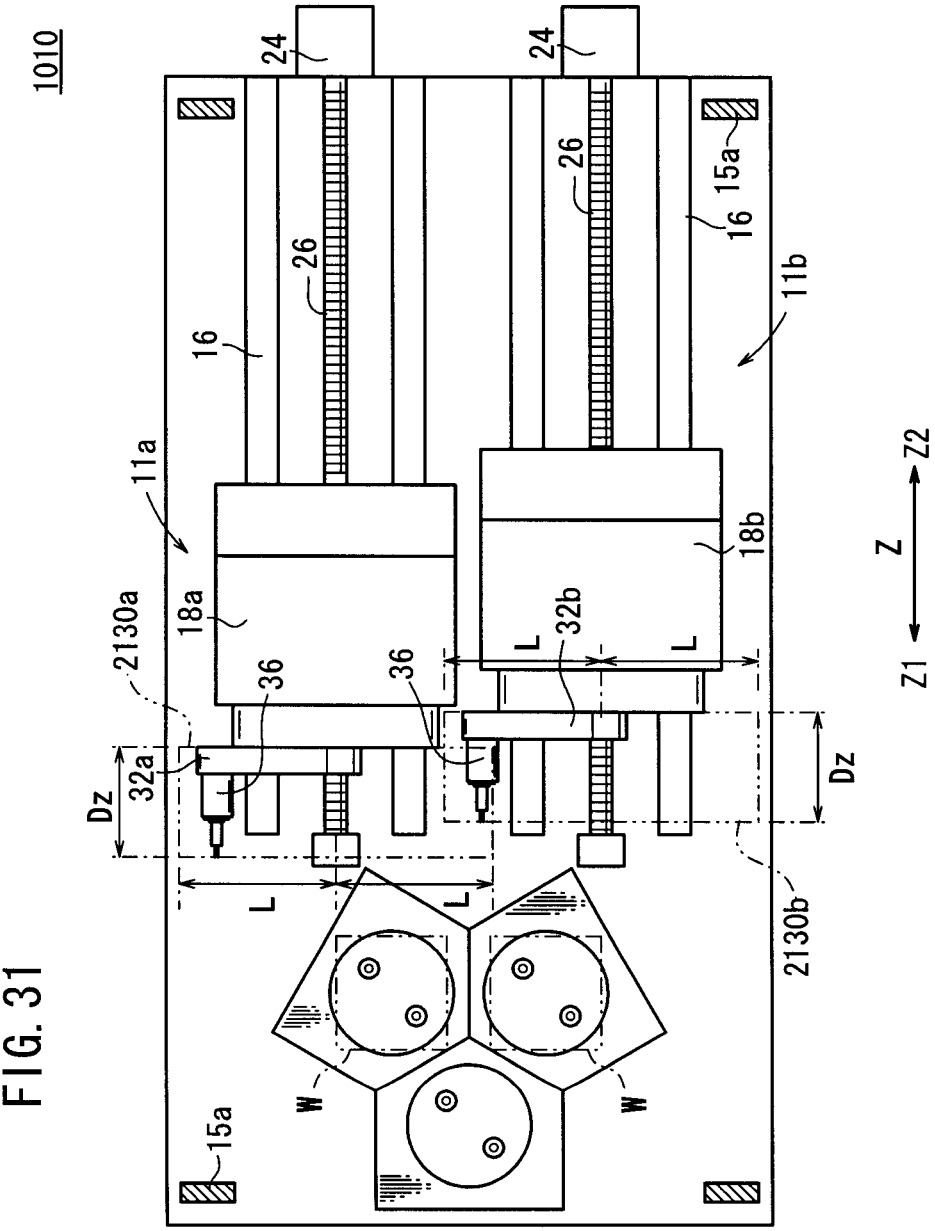
FIG. 31 is a schematic plan view showing a case in which ranges of the respective thicknesses of left and right rotation arms and the corresponding processing spindles are overlapped.

In step S105, the controller 12 compares the Z direction position of the rotation arm 32*a* with the Z direction position of the rotation arm 32*b*, and in the case that both rotation arms 32*a*, 32*b* have the same Z direction position, the sequence proceeds to step S106, whereas if they are different, the sequence moves to step S111. In this case, equal positioning in the Z direction implies not only that the positions match one another strictly, but for example, as shown in FIG. 31, also includes a case in which respective ranges of the total thickness Dz of the rotation arm 32 and the processing spindle 36 are overlapped by the first machine tool 11*a* and the second machine tool 11*b*.

In step S106, interference confirmation of the rotation arm 32*a* and the rotation arm 32*b* is carried out. Such interference confirmation is performed by comparing the area of the movement destination of one of the rotation arms that is moved, with a present area of the other rotation arm for which operations are continuing. In the case that both areas are the areas Aa and Ab, or in the case that both areas are the areas Ba and Bb, it is determined that interference is generated, and the sequence proceeds to step S110. In other cases, the sequence proceeds to step S107.

For example, as shown in FIG. 29, in the case that the rotation arm 32*a* resides within the area Aa at the position of the reference numeral 2140*a*, when the rotation arm 32*b* moves from the first sequence to the second sequence, since processing is intended to be carried out on the second hole 2150*b*, the rotation arm 32*b* is moved into area Ab, and since interference will be generated thereby, the process sequence proceeds to step S110.

In step S107, the current area of the other rotation arm for which operations are continuing is confirmed. In the case that this area is Ca, Cb, Da or Db, such a case indicates that, whatever route is passed through, interference will not be generated, and thus the process sequence proceeds to step S108. On the other hand, in the event that the current area of the other rotation arm is Aa, Ab, Ba or Bb, then based on how the undergoing operation path progresses, interference may be generated, and thus the process sequence proceeds to step S109.

Figure 32:
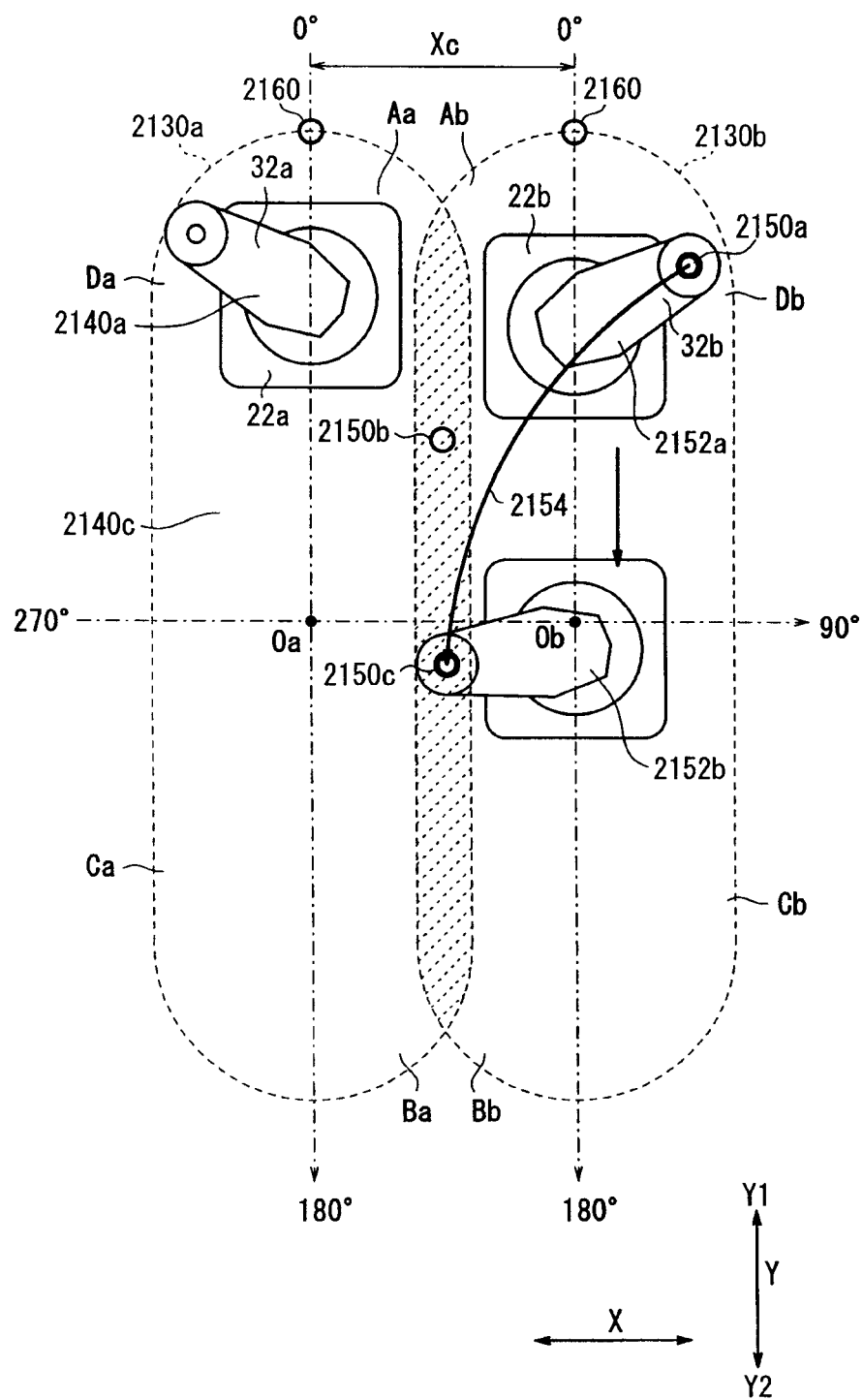
FIG. 32 is a schematic view showing an operation range of the left and right rotation arms as viewed from the front, and an operation process in which one of the rotation arms moves while rotating in a counterclockwise direction.

In step S108, the current position of the one rotation arm performing operations is compared with the movement destination position, and the path having the shortest time is set and movement thereof is carried out. For example, as shown in FIG. 32, for a case in which the rotation arm 32 resides within the area Da, and when it is intended to move the rotation arm 32*b* from the first hole 2150*a* in area Db to the third hole 2150*c* in area Bb, and considering the movement speed in the Y direction of the supporting body 22*b* and the rotation speed of the rotation arm 32*b*, the path that enables the destination to be reached in the shortest time is set and movement is carried out. In this case, the supporting body 22*b* may be moved downwardly from the position shown by reference numeral 2152*a*, together with rotating the rotation arm 32*b* counterclockwise, so as to be moved to the position shown by reference numeral 2152*b*. As a result, the rotation arm 32*b* traverses the path shown by the arrow 2154.

Figure 33:
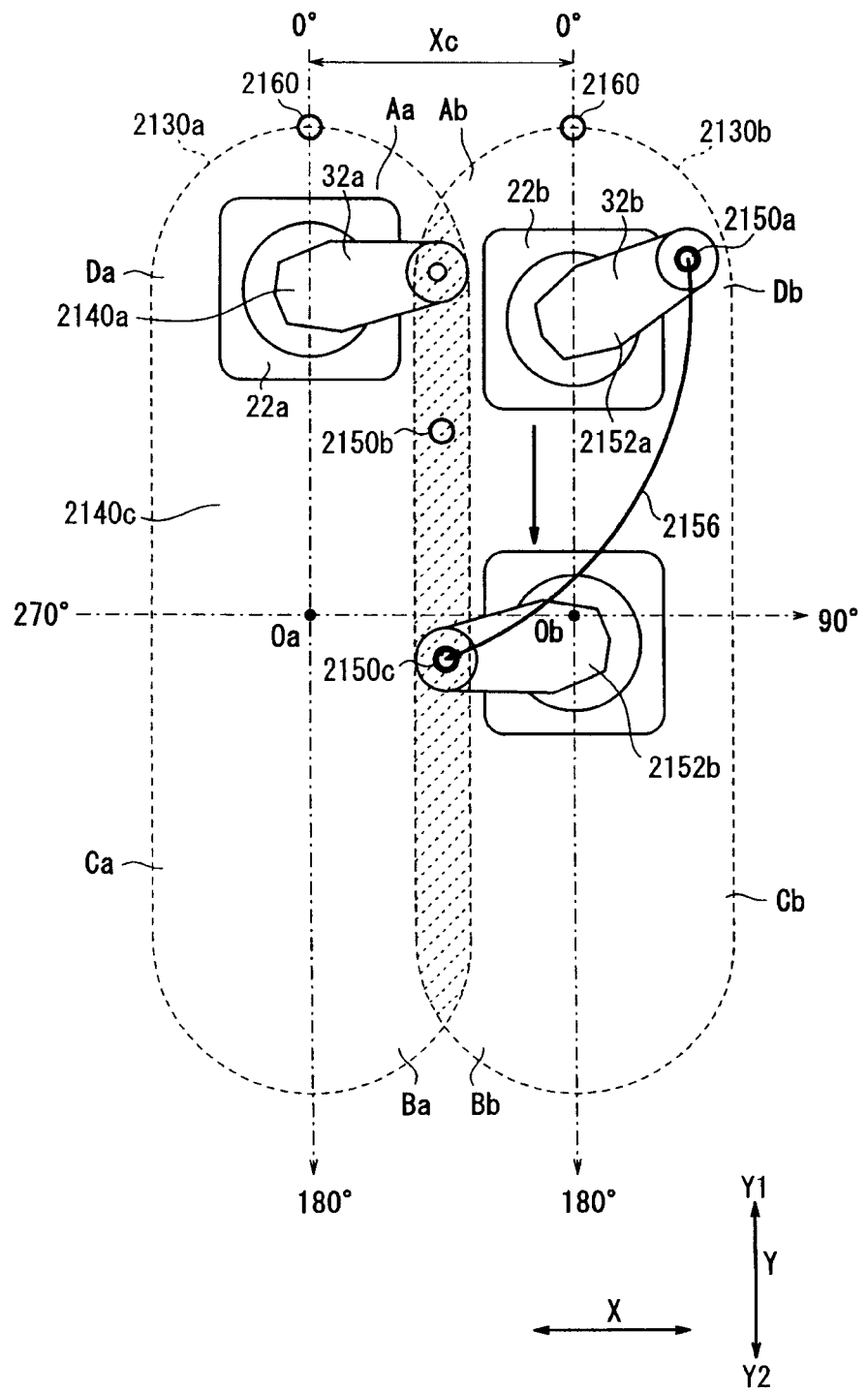
FIG. 33 is a schematic view showing an operation range of the left and right rotation arms as viewed from the front, and an operation process in which one of the rotation arms moves while rotating in a clockwise direction.

On the other hand, in step S109 (in the event that interference occurs during movement), the current position of the one rotation arm performing operations is compared with the movement destination position, and a path is set so that the other rotation arm to undergo movement does not pass through the area where the one rotation arm resides, and movement thereof then is carried out. For example, as shown in FIG. 33, for a case in which the rotation arm 32*a* resides within area Aa, when it is intended to move the rotation arm 32*b* from the first hole 2150*a* in area Db to the third hole 2150*c* in area Bb, the supporting body 22*b* may be moved downwardly from the position shown by reference numeral 2152*a*, together with rotating the rotation arm 32*b* clockwise, to be moved to the position shown by reference numeral 2152*b*. As a result, the rotation arm 32*b* traverses the path shown by the arrow 2156.

Setting of the path so that the area where the other arm resides is not traversed can be determined, for example, in the following manner. That is, in the case that the rotation arm 32*b* is intended to be moved, in the event that the movement origin and the movement destination are within the same area, the path having the shortest time can be set without reservation. In the case that the rotation arm 32*b* is moved into a different area, the rotation arm 32*b* may be rotated in a direction so as not to pass through the 270° position (i.e., the angle ingressing maximally toward the other rotation arm). In other words, in the case of movement from the first hole 2150*a* to the second hole 2150*b*, the rotation arm 32*b* is rotated clockwise, and in the opposite case, is rotated counterclockwise. Further, concerning movement of the rotation arm 32*a*, in the case of being moved to a different area, the rotation arm 32*a* may be rotated in a direction so as not to pass through the 90° position.

Further, in step S110 (i.e., in the case that interference occurs at the movement destination), the next sequence where interference occurs is skipped, and a sequence one step ahead is carried out first. Then, step S104 is returned to, whereupon a further interference check is performed. In this case, the sequence that was intended to be carried out next is switched to the next time. For example, in the case it is judged that interference occurs when moving from the first sequence to the second sequence, the operation goes to the third sequence, and the flow order is changed so that the second sequence is performed after the third sequence.

Further, even in the case that the second sequence is performed after the third sequence, when interference will occur at the movement destination of the second sequence, the second sequence skips the tool exchanging fourth sequence and is inserted after the fifth sequence. At this time, because a tool used for honing is installed in the fifth sequence, between the fifth sequence and the introduced second sequence, a sub-sequence may be provided for returning the tool used for boring, and between the introduced second sequence and the sixth sequence, a sub-sequence may be provided for exchanging the tool with the tool used for honing.

Furthermore, for the purpose of reducing the number of tool exchanges, the second sequence boring process may be introduced after the sixth sequence, which is the last of a succession of honing processes.

Still further, in the case that interference occurs at the movement destination, movement of the rotation arm on the side intended to be moved may be halted, so as to wait until the other rotation arm has moved into another area.

Further, in step S111 (in the case that the Z direction positions differ), it is confirmed whether the rotation arm 32 to be moved is on the side nearest to the workpiece W or not. Since there is no fear of interference in the case that movement of the rotation arm 32 on the side nearest to the workpiece W (i.e., the side advancing in the direction of the arrow Z1) is performed, movement thereof is unrestricted.

On the other hand, the rotation arm 32 on the side farthest from the workpiece W (i.e., the side retracted in the direction of the arrow Z2), may interfere with respect to the column 18 or the supporting body 22 of the other machine tool, and therefore inwardly directed operations thereof are restricted (step S112).

Figure 34:
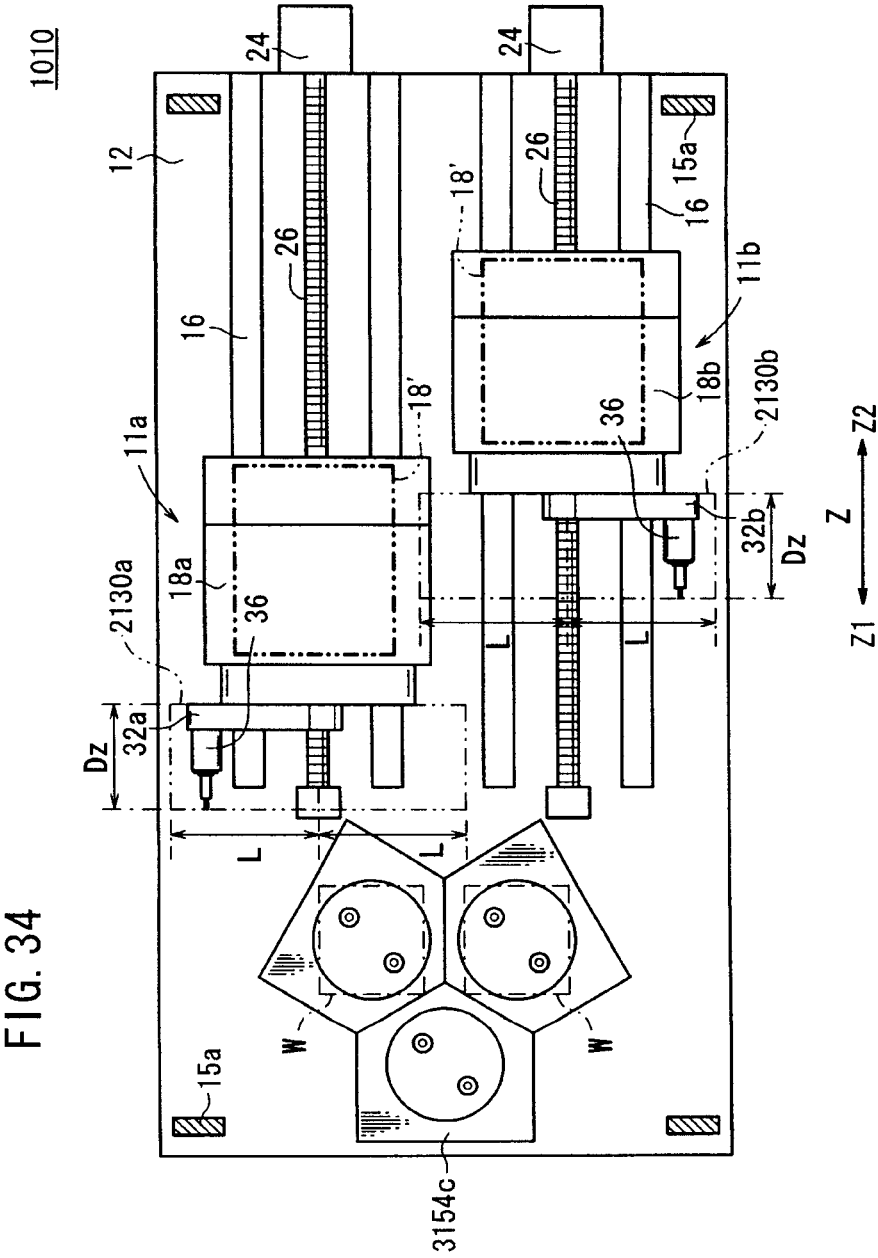
FIG. 34 is a schematic plan view showing a case in which ranges of the respective thicknesses of left and right rotation arms and the corresponding processing spindles are not overlapped.

For example, as shown in FIG. 34, when the rotation arm 32a is on the side nearer to the workpiece W than the rotation arm 32b, the movement range 2130a of the rotation arm 32a does not overlap with the movement range 2130b of the rotation arm 32b, and it is understood there is no fear of the rotation arm 32a experiencing interference. In contrast thereto, since the movement range 2130b of the rotation arm 32b overlaps with the column 18a and the supporting body 22a, there is a fear of interference, and hence it is understood that limiting movement of the rotation arm 32b is necessary.

Herein, as for the limiting of such movement, in the case that the next sequence occurs within areas Aa, Ba, Ab or Bb, similar to the aforementioned process in step S110, a change in order is performed so that the sequence takes place after the next sequence, whereupon step S104 is returned to, and a further interference check is carried out. Further, it may also be waited until the rotation arm on the side intended for movement is advanced farther in the direction of the arrow Z1 than the other rotation arm.

Furthermore, in the event that the rotation arm advanced farther than the other rotation arm in the Z1 arrow direction, on which movement of the rotation arm is unlimited, is retracted in the Z2 arrow direction, in the rotation arm is moved to the outside area, so as to avoid interference with the column 18 and the supporting body 22 of the other side.

For the rotation arm 32 on the side farthest from the workpiece W, the column 18 and the supporting body 22 of the other side may be sufficiently narrow in the direction of the arrow X, and when interference is not generated (e.g., in the case of being narrow, as with the column 18' of FIG. 34), restriction of movement is unnecessary. In this case, in the aforementioned step S105, in the case that both of the Z direction positions are equal, a predetermined restriction of movements is performed, and if the Z direction positions are non-equal, movement on both sides is unlimited.

In the foregoing manner, according to the machine tool 1010, the first machine tool 11a and the second machine tool 11b are controlled integrally and cooperatively, such that while the positions of the rotation arms 32a and 32b are confirmed, in the case that mutual interference therebetween is generated, movement of one of the rotation arms is halted, or a sequence operation one step ahead is carried out first, such that the interference can be avoided. Further, the installation area can be made smaller, while the machine tool 1010 is constructed compactly, thereby enabling an improvement in space efficiency. In addition, the controller 12 divides the movement ranges 2130a, 2130b of the rotation arms 32 into a plurality of areas, and because the arm positions and the presence or absence of interference are determined for each area unit, processing by the controller 12 is simplified.

Figure 35:
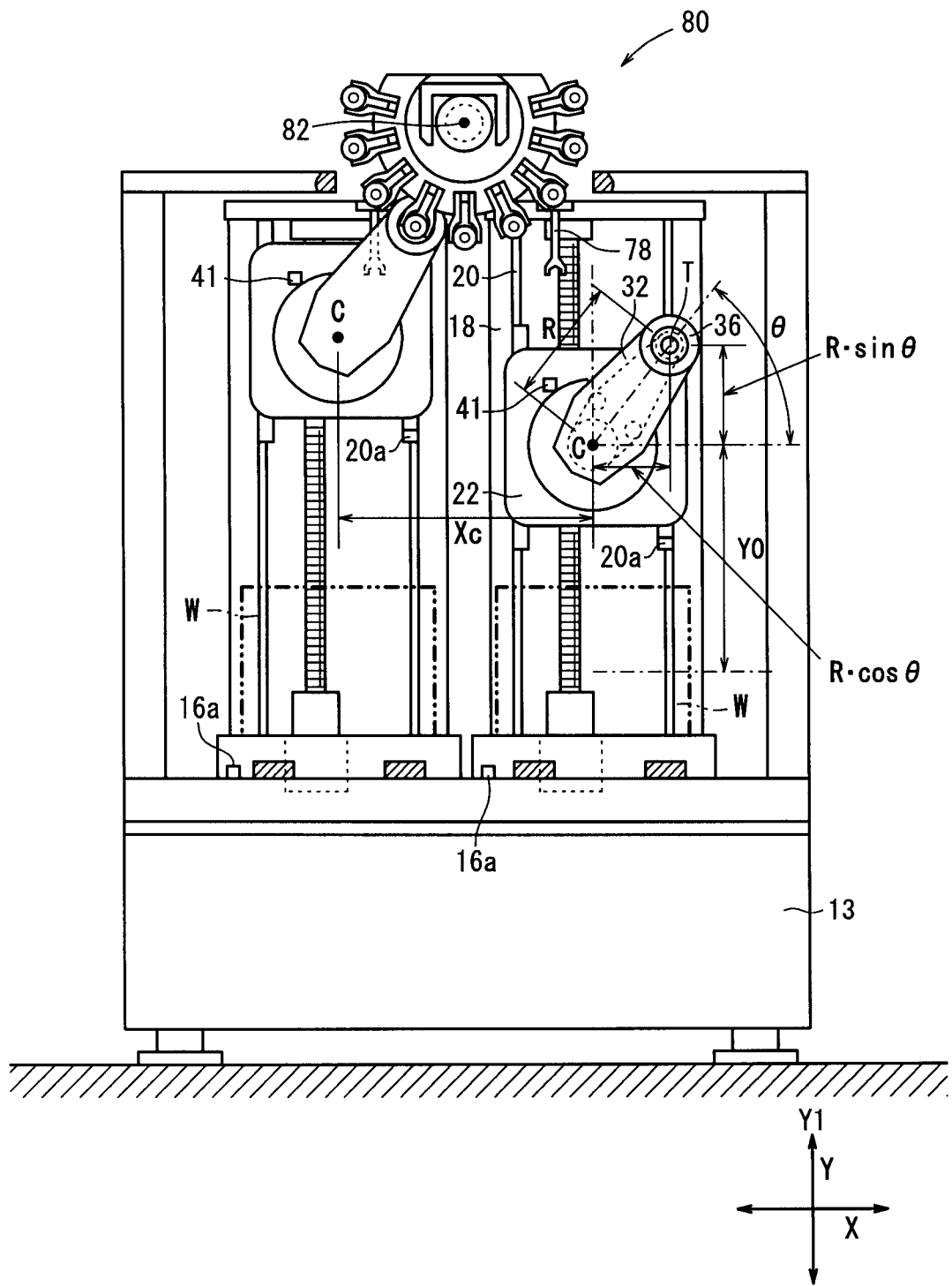
FIG. 35 is a front view of a machine tool in which a single rotating magazine is disposed between a first machine tool and a second machine tool.

In the above example, explanations have been made assuming that the first machine tool 11a and the second machine tool 11b both are equipped with dedicated rotating magazines 80a, 80b. However, for example, as shown in FIG. 35, as viewed frontally from the Z direction, the axis of rotation 82 of a single rotating magazine 80 may be disposed so as to be positioned within a range of a distance Xc, in the horizontal width direction between the center of rotation C of the first machine tool 11a and the center of rotation C of the second machine tool 11b. Owing thereto, the rotating magazine 80 can be arranged with good balance, and a single rotating magazine 80 can be used in consort by both the first machine tool 11a and the second machine tool 11b.

Furthermore, in the above example, an explanation has been given where both the first machine tool 11a and the second machine tool 11b perform processing on separate individual workpieces W. However, as viewed from the front (see FIG. 25), a single large workpiece W may be subject to processing, which extends across the movement range 2130a as well as the movement range 2130b.

Below, another embodiment of a machine tool according to the present invention is presented, and shall be explained with reference to FIGS. 17 through 41.

Next, explanations shall be made concerning a workpiece moving device 1014 of the machine tool 1010.

As shown in FIGS. 17 through 19, the workpiece moving device 1014, while being rotated intermittently in 120° steps, affixes two respective workpieces W so as to confront the first machine tool 11a and the second machine tool 11b, and is rotated so that surfaces to be processed are directed rearward (i.e., in the direction of the arrow Z2). The workpiece moving device 1014 is positioned in the vicinity of a frontal side (a side in the Z1 arrow direction), on an upper surface of the machine platen 13. By rotation of the workpiece moving device 1014, the workpieces W are installed at a position 3154c on the Z1 arrow side, and by intermittent rotation thereof in a plan view clockwise direction, after processing by the first machine tool 11a and the second machine tool 11b, the workpieces W are returned to the position 3154c and discharged.

Figure 36:
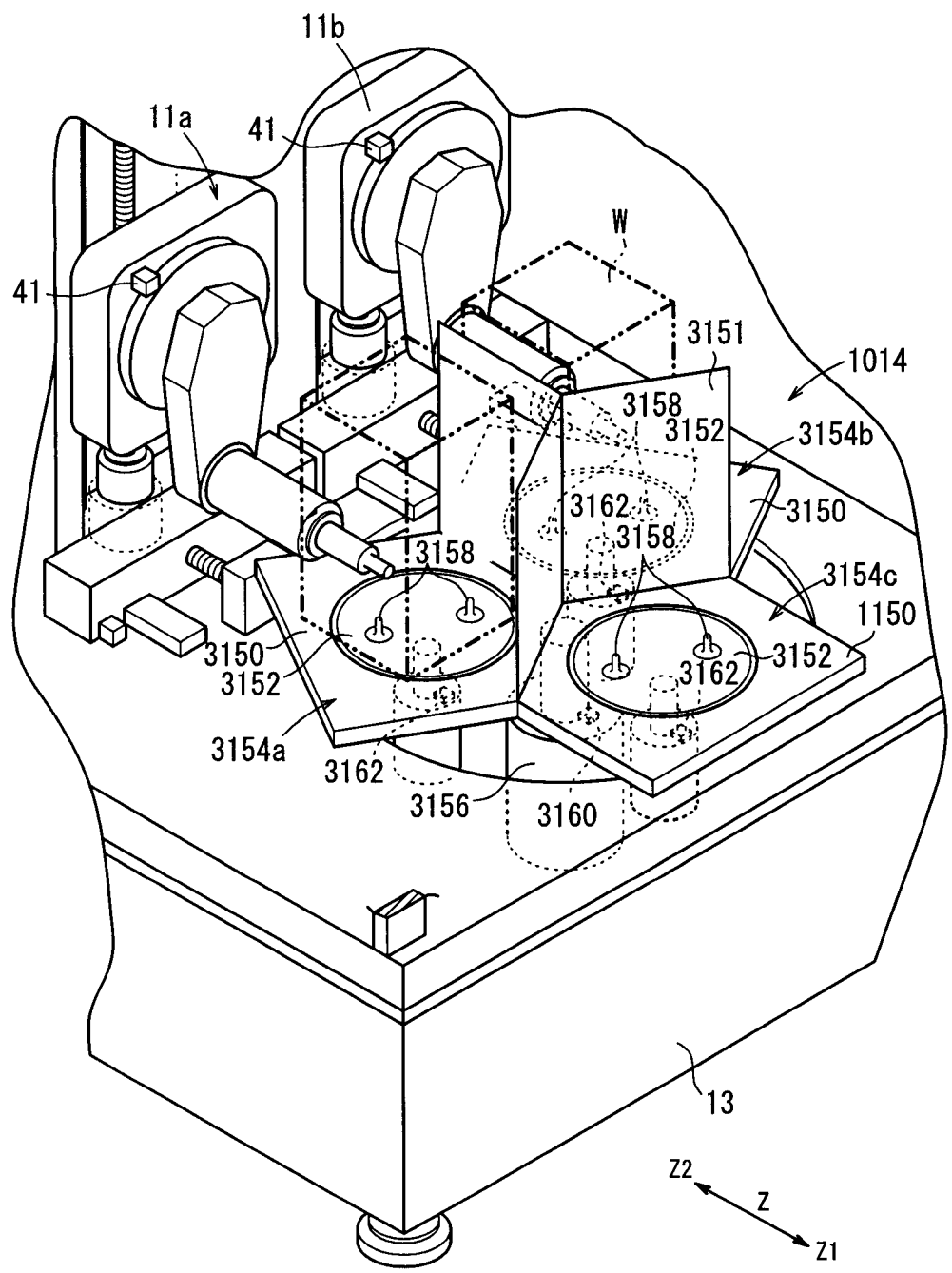
FIG. 36 is an enlarged cutaway perspective view of a workpiece moving device.

As shown in FIG. 36, the workpiece moving device 1014 includes a turntable 1150 capable of rotating in a horizontal plane, three auxiliary rotation mechanisms 3152, which are rotatable in a horizontal plane so as to turn and set processing surfaces of the workpieces W to confront the processing spindles 36, and a main rotating mechanism 3156, which rotates the turntable 1150 intermittently, so that one from among the auxiliary rotating mechanisms 3152 is placed in a first retaining position 3154a facing the processing spindle 36 of the first machine tool 11a, and another one from among the auxiliary rotating mechanisms 3152 is placed in a second retaining position 3154b facing the processing spindle 36 of the second machine tool 11b. The turntable 1150 is of a shape in which rectangular plates extend radially outwardly therefrom in three directions, and upwardly extending partitions 3151 are provided between the rectangular plates.

In the main rotating mechanism 3156, while the turntable 1150 is rotated intermittently in a plan view clockwise direction in 120° steps, two workpieces W are affixed with respect to the first machine tool 11a and the second machine tool 11b. A main angle sensor 3160 is provided on the main rotating mechanism 3156 for detecting an angle of the turntable 1150 and supplying the same to the controller 12.

The three auxiliary rotating mechanisms 3152 each respectively have pins 3158 thereon serving as retaining tools for positioning the workpieces W, and are arranged at equal intervals (120°) on the turntable 1150. The auxiliary rotating mechanisms 3152, when at the first retaining position 3154a and the second retaining position 3154b, are rotationally operated so that surfaces to be processed of the workpieces W are made to point rearwardly (in the direction of the arrow Z2). Auxiliary angle sensors 3162 are provided on the auxiliary rotating mechanisms 3152, for detecting rotation angles thereof and supplying the same to the controller 12. Further, in the auxiliary rotating mechanism 3152, when at the third retaining position 3154c facing in the direction of the arrow Z1, the workpiece W can be released from the pins 3158, whereby the processed workpiece W is discharged, while another yet to be processed workpiece W is installed thereon.

Figure 37:
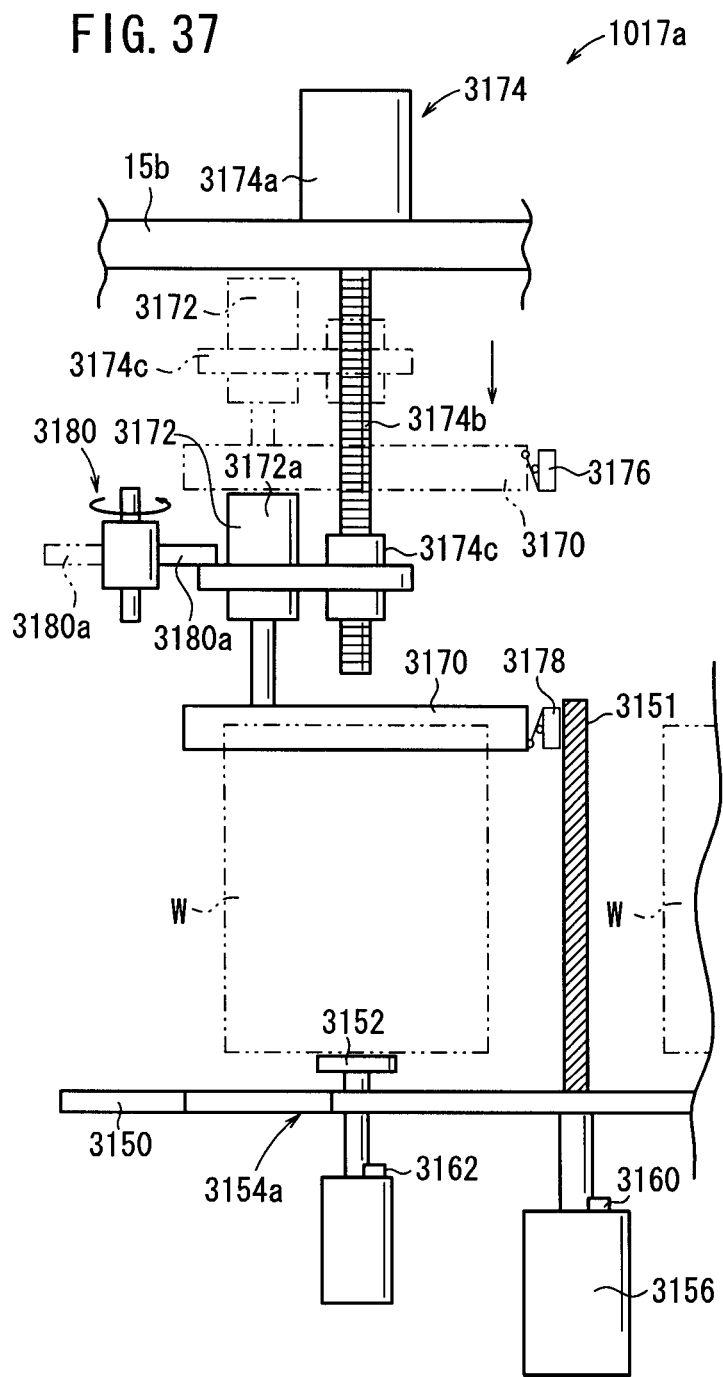
FIG. 37 is an outline structural view of a workpiece pressing and fixing device.

Next, explanations shall be presented with reference to FIG. 37, concerning the workpiece pressing and fixing devices 1017a and 1017b. The workpiece pressing and fixing device 1017a includes a fixing plate 3170, which is raised and lowered, so as to press and fix the workpiece W from above during processing thereof, the workpiece W being disposed in the first retaining position 3154a of the workpiece moving device 1014. The workpiece pressing and fixing device 1017b has the same structure as that of the workpiece pressing and fixing device 1017a, and is disposed corresponding to the second retaining position 3154b. Below, the workpiece pressing and fixing device 1017a shall be described as exemplary.

As shown in FIG. 37, the workpiece pressing and fixing device 1017a raises and lowers the fixing plate 3170, so as to press and affix the workpiece W from above during processing thereof, the workpiece W being disposed in the first retaining position 3154a of the workpiece moving device 1014.

The workpiece pressing and fixing device 1017a includes the fixing plate 3170, which abuts against and presses an upper surface of the workpiece W, a cylinder 3172 that raises and lowers the fixing plate 3170 in a short stroke with a large force, a ball screw mechanism 3174 that raises and lowers the cylinder 3172 quickly over a long stroke, an upper limit switch 3176 that detects an upper limit position of the fixing plate 3170, a lower limit switch 3178 that detects a lower limit position, and a lock mechanism 3180 that fixes and releases a tube 3172a of the cylinder 3172.

The ball screw mechanism 3174 includes a servo motor 3174a, a ball screw 3174b rotated by the servo motor 3174a, and a nut member 3174c, which is threaded and raised and lowered on the ball screw 3174b. The nut member 3174c is affixed to the tube 3172a of the cylinder 3172. The lock mechanism 3180, for example, may be equipped with an arm 3180a that rotates horizontally, such that when the fixing plate 3170 is lowered and operates the lower limit switch 3178, the arm 3180a is rotated and moved to a position for holding a part of the cylinder 3172.

With the workpiece pressing and fixing device 1017a, as shown by the imaginary lines, the fixing plate 3170 is in an upwardly raised condition in an initial state, and after workpieces W have been installed and positioned in the first retaining position 3154a and/or the second retaining position 3154b, the cylinder 3172 and the fixing plate 3170 are lowered under operation of the ball screw mechanism 3174, and when it is detected that the fixing plate 3170 has operated the lower limit switch 3178, lowering of the fixing plate 3170 is halted. At this time, the load on the servo motor 3174a is on the order of the weight of the cylinder 3172 and the fixing plate 3170, so that high speed operation with a small current is enabled.

Next, the cylinder 3172 is affixed by the lock mechanism 3180 and energization of the servo motor 3174a is terminated.

Furthermore, under operations of the cylinder 3172, the fixing place 3170 is lowered and abuts and presses against the workpiece W. At this time, the cylinder 3172 is already lowered sufficiently, so that a small stroke is sufficient to lower the fixing plate 3170. Further, the cylinder 3172 is large scaled and generates a sufficiently large force, so that the workpiece W can reliably be pressed and fixed in place. Thereafter, processing of the workpiece W, while retained in a fixed state by the fixing plate 3170, is carried out by the first machine tool 11a and the second machine tool 11b.

Following the completion of processing, the lock mechanism 3180 is operated and the cylinder 3172 is released. Furthermore, the cylinder 3172 is raised by the ball screw mechanism 3174 together with raising the fixing plate 3170 under operation of the cylinder 3172. Raising of the fixing plate 3170 is stopped when it is detected that the fixing plate 3170 has operated the upper limit switch 3176.

With such a workpiece pressing and fixing device 1017a (and 1017b), quick delivery of the fixing plate 3170 is carried out sufficiently by the servo motor 3174a, whereby the cycle time can be shortened. Notwithstanding, the fixing plate 3170 can be pressed with sufficient strength by the cylinder 3172. Because the servo motor 3174a is not used for pressing the workpiece W, fear of seizure is eliminated, and a small scale is adequate. Since the cylinder 3172 is utilized over a short stroke, a short size is sufficient therefor.

Figure 38:
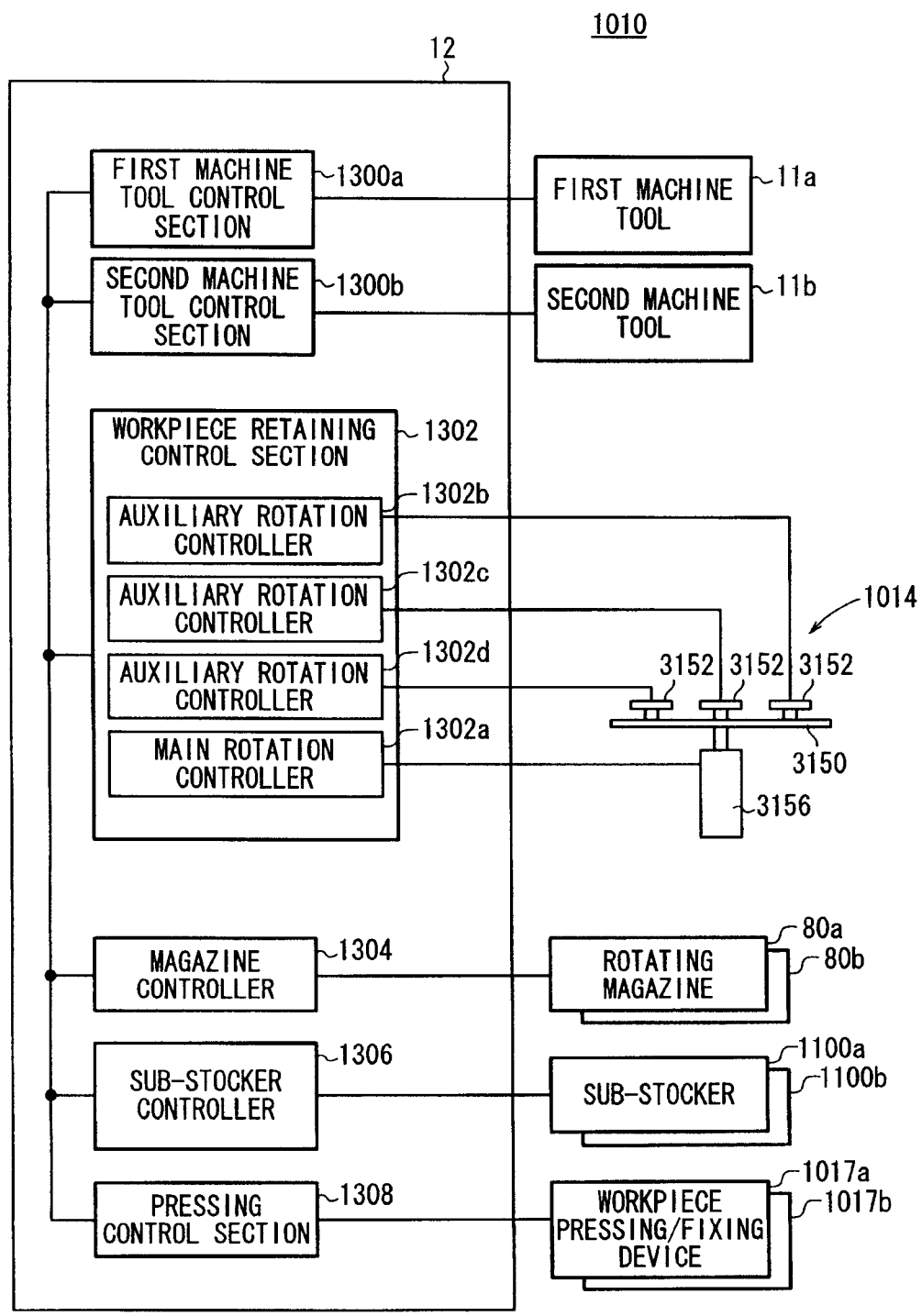
FIG. 38 is a block configuration of a controller.

As shown in FIG. 38, the controller 12 in the machine tool 1010 includes a first machine tool control section 1300a and a second machine tool control section 1300b for controlling the first machine tool 11a and the second machine tool 11b, a workpiece retaining control section 1302 for controlling the workpiece moving device 1014, a magazine control section 1304 for controlling the rotating magazines 80a and 80b, a sub-stocker control section 1306 for controlling the sub-stockers 1100a and 1100b, and a pressing control section 1308 for controlling the workpiece pressing and fixing devices 1017a and 1017b. The workpiece retaining control section 1302 includes a main rotation controller 1302a for controlling the main rotating mechanism 3156, and auxiliary rotation controllers 1302b to 1302d for controlling the three auxiliary rotating mechanisms 3152.

The first machine tool control section 1300a, the second machine tool control section 1300b, the workpiece retaining control section 1302, the magazine control section 1304, the sub-stocker control section 1306, and the pressing control section 1308 are mutually interconnected while transfer of information is carried out therebetween, such that the respective control sections can interact cooperatively.

Processing of workpieces W is performed by the machine tool 1010 in the following manner.

First, a workpiece W for which processing has been completed in the third position of the workpiece moving device 1014 is taken out and removed, while an unprocessed workpiece W is loaded thereon. At this time, by positioning with the pins 3158, the workpiece W assumes a standard orientation.

Next, through operation of the controller 12, the workpiece moving device 1014 is rotated 120° in a clockwise direction as viewed in plan, and the unprocessed workpiece W is moved to the first retaining position 3154a. At this time, the workpiece W that had been residing until then in the first retaining position 3154a is moved to the second retaining position 3154b. A first stage of processing has already been completed on the workpiece W moved to the second retaining position 3154b. Further, the workpiece W that had been residing until then in the second retaining position 3154b is moved to the third retaining position 3154c. The workpiece that is moved to the third retaining position 3154c has undergone and completed all of the processing steps (two steps) performed in the machine tool 1010.

Further, in the auxiliary rotating mechanisms 3152 of the first retaining position 3154a and the second retaining position 3154b, the turntables 1150 thereof are rotated, so as to orient the surfaces to be processed of the workpieces W in the directions of the processing spindles 36 of the first machine tool 11a and the second machine tool 11b.

Furthermore, after the upper surfaces of the workpieces have been pressed and affixed through actions of the workpiece pressing and fixing devices 1017a, 1017b, first and second stage processes are carried out on the workpieces W by the first machine tool 11a and the second machine tool 11b.

Thereafter, pressing of the workpieces W by the workpiece pressing and fixing devices 1017a, 1017b is released, and the workpiece moving device 1014 is rotated 120° in a clockwise direction as viewed in plan.

In this manner, in the workpiece moving device 1014, movements of the workpieces W can be performed by repeating simple and intermittent motions. Further, because the first retaining position 3154a and the second retaining position 3154b can be arranged in positions confronting the first machine tool 11a and the second machine tool 11b, the outer diameter of the turntable 1150 can be set with a narrow width, without protruding significantly from both lateral ends of the first machine tool 11a and the second machine tool 11b. Furthermore, since the main rotating mechanism 3156 is disposed beneath the turntable 1150, the workpiece moving device 1014 can be set with a narrow profile.

As described above, in accordance with the machine tool 1010, the turntable 1150 is rotated intermittently by the main rotating mechanism 3156, and the workpieces W are set in a predetermined orientation by the auxiliary rotating mechanisms 3152. Thus, with a simple configuration, the efficiency with which workpieces are transported between the machine tools can be improved.

Further, in the workpiece moving device 1014, by means of simple rotational movements, the workpieces W can be transported between the first machine tool 11a and the second machine tool 11b, and positioning for processing can be carried out, whereby the cycle time can be shortened, yet the transporting procedure is simple.

Because the columns 18 of the first machine tool 11a and the second machine tool 11b are disposed in parallel, the horizontal width of the machine tool 1010 can be set narrowly.

Figure 39:
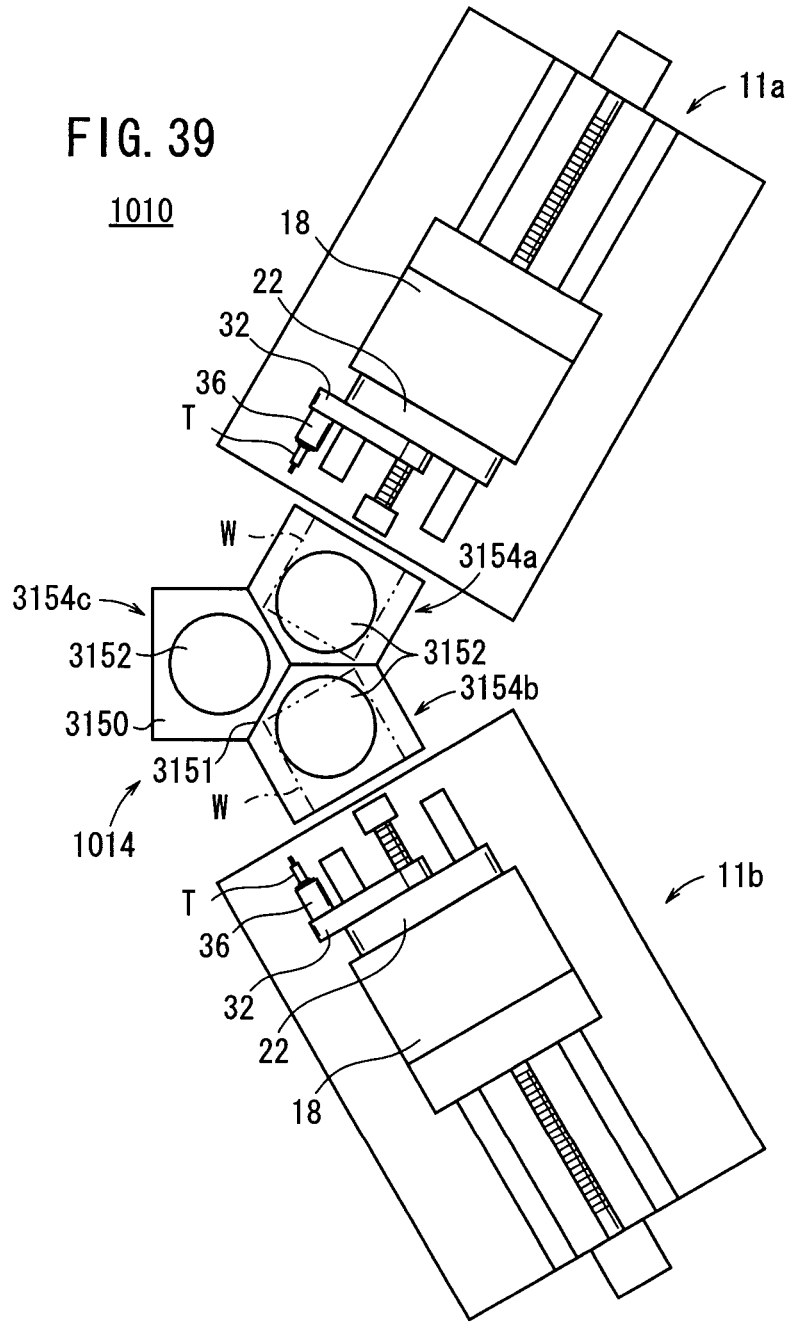
FIG. 39 is a schematic plan view of a machine tool in which two machine tools are disposed in a radial pattern.

It is not required that the first machine tool 11a and the second machine tool 11b necessarily be disposed adjacently in parallel. For example, as shown in FIG. 39, the workpiece moving device 1014 may be set so as to extend with a radial form about the center thereof. In this case, assuming that processing is performed by the first machine tool 11a and the second machine tool 11b on the same surface with respect to the workpiece W, the surfaces to be processed of the workpieces W can be oriented outwardly, whereby the auxiliary rotating mechanisms 3152 become unnecessary, and the arrangement is simple.

Figure 40:
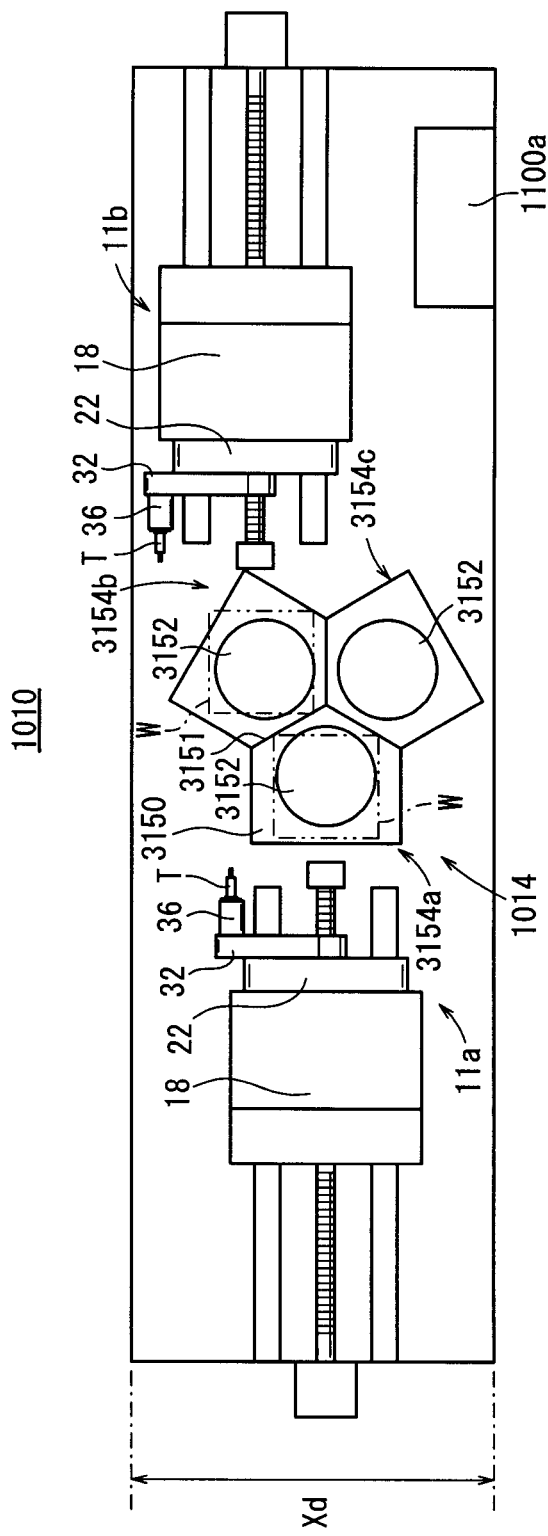
FIG. 40 is a schematic plan view of a machine tool, in which two machine tools are disposed in a parallel and offset manner, in a reverse orientation.

Further, as shown in FIG. 40, the first machine tool 11a and the second machine tool 11b may be arranged in opposite orientations, in parallel and offset from each other. In this case, by positioning the sub-stocker 1100a inwardly, the width Xd of the machine tool 1010 becomes suitably narrower.

Figure 41:
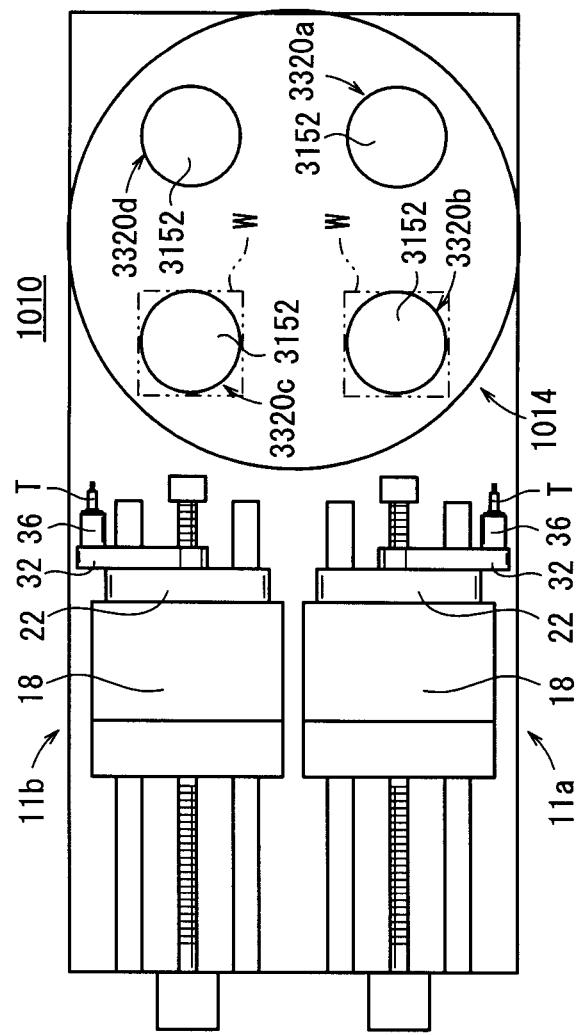
FIG. 41 is a schematic plan view of a machine tool in which a workpiece moving device, equipped with four auxiliary rotation mechanisms, is provided.

Furthermore, as shown in FIG. 41, four auxiliary rotating mechanisms 3152 may be provided at equal intervals (90°) on the workpiece moving device 1014. In this case, processing of workpieces W can be performed at the second retaining position 3320b and the third retaining position 3320c, which face toward the first machine tool 11a and the second machine tool 11b, installation of an unprocessed workpiece W can be performed at the first retaining position 3320a, and discharging of a workpiece W for which processing thereof is completed can be performed at the fourth retaining position 3320d. In other words, installation and discharging of workpieces W can be carried out simultaneously and in parallel, thereby enhancing efficiency.

Below, an embodiment concerning a workpiece positioning table according to the present invention, and the relationship thereof with a machine tool on which the workpiece positioning table is mounted, shall be presented and described in detail with reference to the accompanying drawings.

Figure 42:
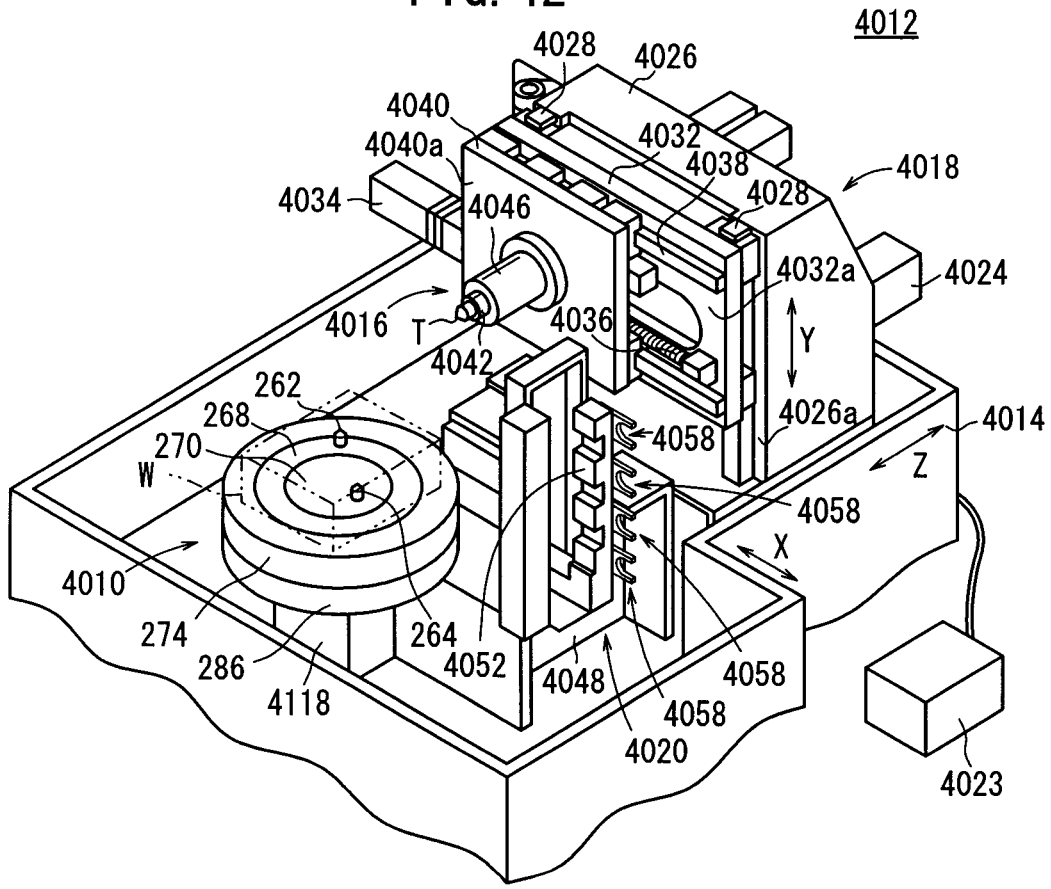
FIG. 42 is a partial cutaway perspective view of a machine tool on which a workpiece positioning table is mounted according to a third embodiment.
Figure 43:
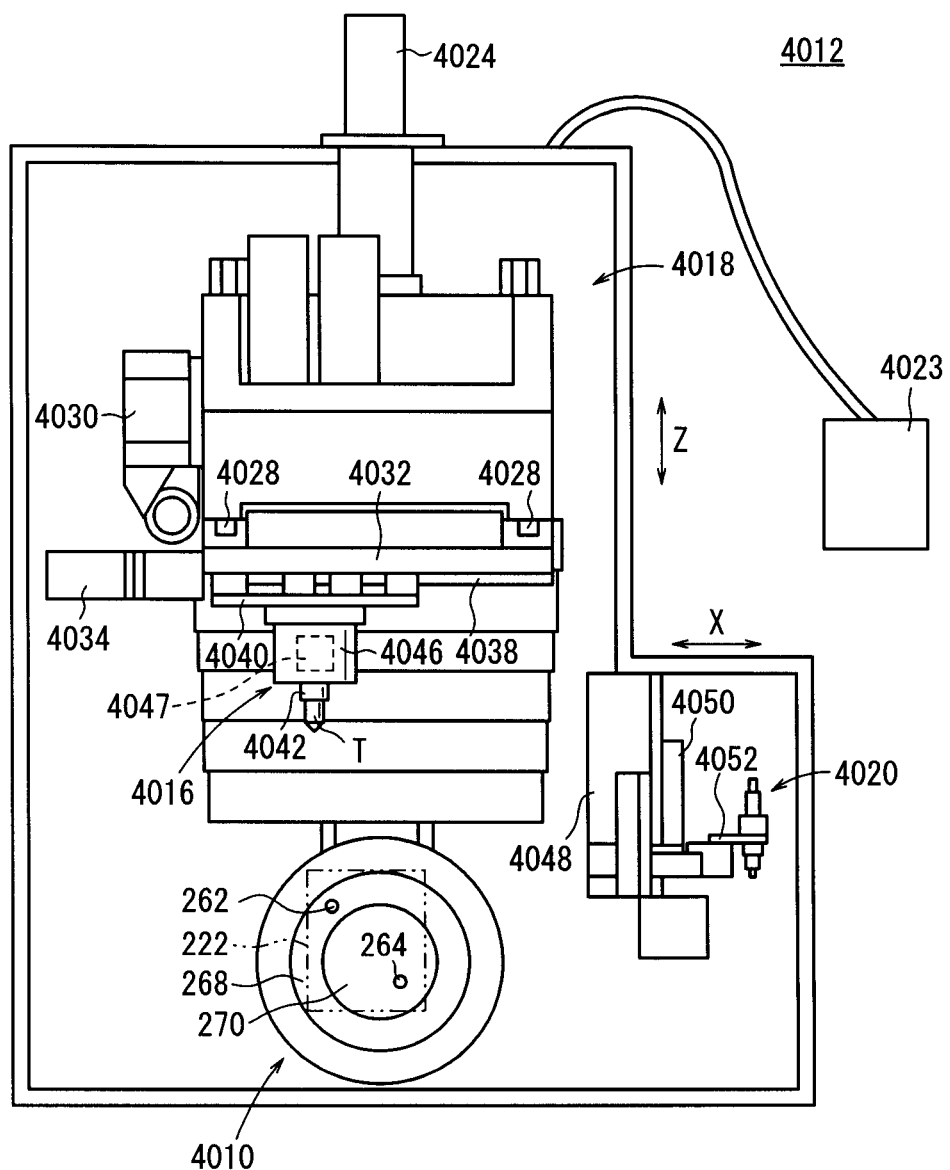
FIG. 43 is a plan view of a machine tool on which a workpiece positioning table is mounted according to the third embodiment.
Figure 44:
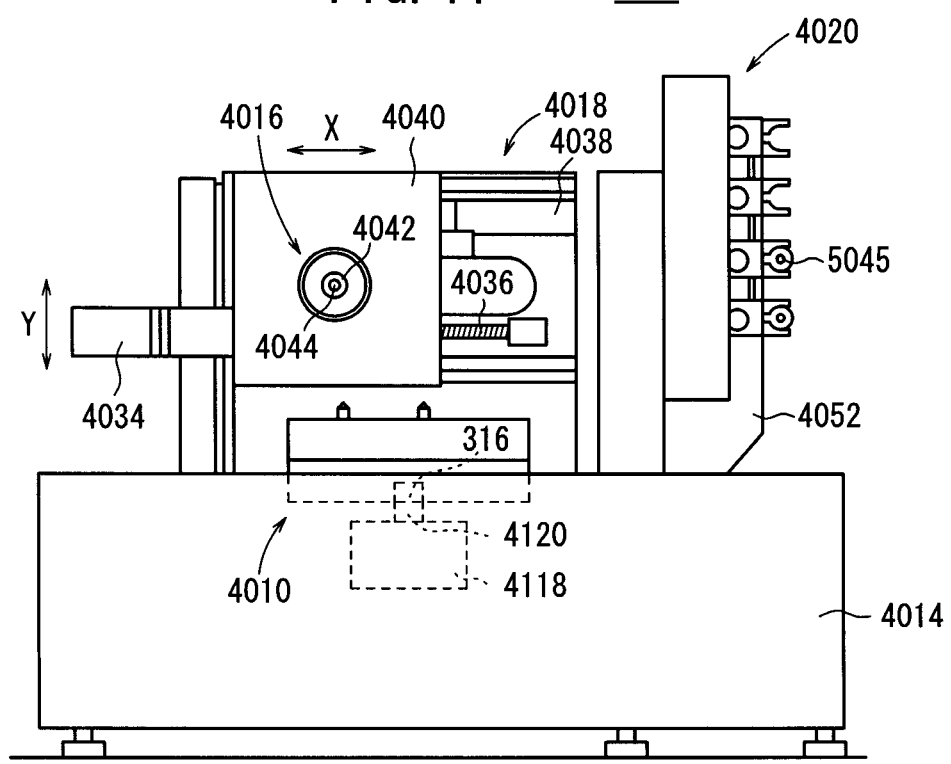
FIG. 44 is a front view of a machine tool on which a workpiece positioning table is mounted according to the third embodiment.

FIG. 42 is a partial cutaway perspective view of a machine tool 4012 on which a workpiece positioning table 4010 is mounted according to a third embodiment, FIG. 43 is a plan view of the machine tool 4012, and FIG. 44 is a front view of the machine tool 4012. The machine tool 4012 is a so-called numerically controlled machine tool (NC machine tool), which enables highly precise positioning of a tool T.

Figure 45:
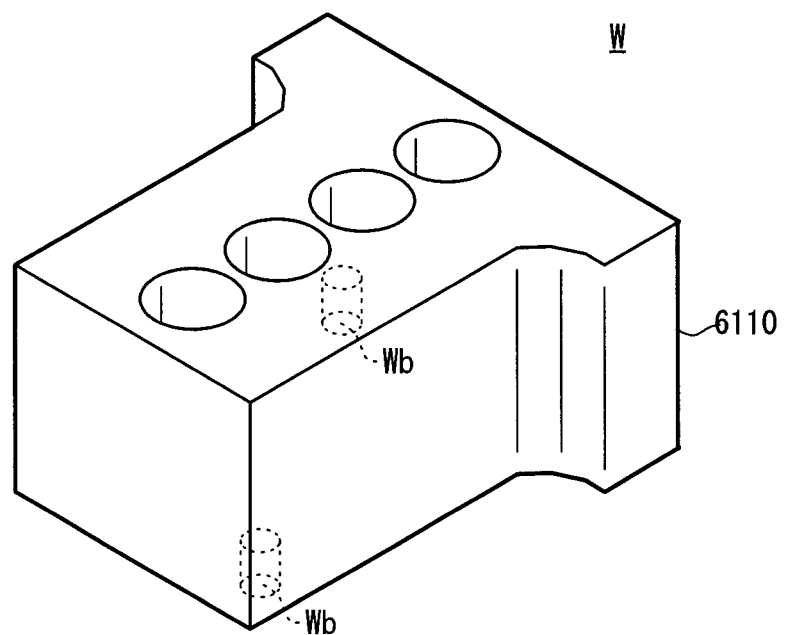
FIG. 45 is a perspective view of a workpiece.

The machine tool 4012 comprises a base 4014, with a table 4010 serving as a workpiece positioning table, a spindle head unit 4018, which axially supports a spindle unit 4016 rotationally, and in addition, so as to be movable to a given position in three dimensions, consisting of two horizontal directions (the arrow Z-axis direction, and the arrow X-axis direction perpendicular to the Z-axis direction) and a vertical direction (the arrow Y-axis direction), and a tool exchanging unit 4020. A workpiece W (see FIG. 45), which is processed by the machine tool 4012, is positioned on and affixed to the table 4010. As examples of the workpiece W, a cast cylinder block or a cylinder head, etc., may be given, wherein various shapes may be affixed depending on the engine type.

Further, in the vicinity of the machine tool 4012, a controller 4023 is provided, which serves as a control means for controlling driving of the respective movable components of the machine tool 4012, or for carrying out the control of processing steps on the workpiece W.

The spindle head unit 4018 comprises a movable column 4026, which is movable in horizontal directions (Z-axis directions) on the base 4014 through a first drive motor 4024 and a non-illustrated ball screw means, a raisable and lowerable table 4032, which engages with a pair of guide rails 4028 oriented vertically (Y-axis direction) and is disposed on a front surface 4026a of the movable column 4026, wherein the raisable and lowerable table 4032 is supported for being raised and lowered in the Y direction through a second drive motor 4030 and a non-illustrated ball screw means, and a movable table 4040, which engages with a pair of guide rails 4038 oriented horizontally (X-axis direction) and is disposed on the front surface 4032a of the raisable and lowerable table 4032, and is supported for displacement in the X-axis direction, through a third drive motor 4034 and a ball screw means 4036.

Further, on a front surface 4040a of the movable table 4040, a spindle unit 4016 is disposed, which is directed toward the table 4010 and projects from the movable table 4040. A tool T is detachably mounted on an end of the spindle 4046 of the spindle unit 4016 through a tool holder 4042. The spindle 4046 is supported on the movable table 4040 in a rotatable condition by a spindle drive motor 4047. The first drive motor 4024, the second drive motor 4030, the third drive motor 4034 and the spindle drive motor 4047, are constituted, for example, by servo motors.

In this manner, the spindle head unit 4018 comprises the movable column 4026, which is movably disposed in the Z-axis direction on the base 4014, the raisable and lowerable table 4032, which is supported for being raised and lowered in the Y-axis direction on the front surface 4026a of the movable column 4026, and the movable table 4040, which is supported for displacement in the X-axis direction on the front surface 4032a of the raisable and lowerable table 4032.

Owing thereto, the spindle 4046 of the spindle unit 4016 that projects on the front surface 4040a of the movable table 4040 and the tool T on the end of the spindle 4046 are supported rotationally and movably under operations of the controller 4023 in X-axis, Y-axis and Z-axis directions. Further, as discussed above, because the machine tool 4012 is an NC machine tool, movement of the spindle unit 4016 can be controlled with high precision.

Figure 46:
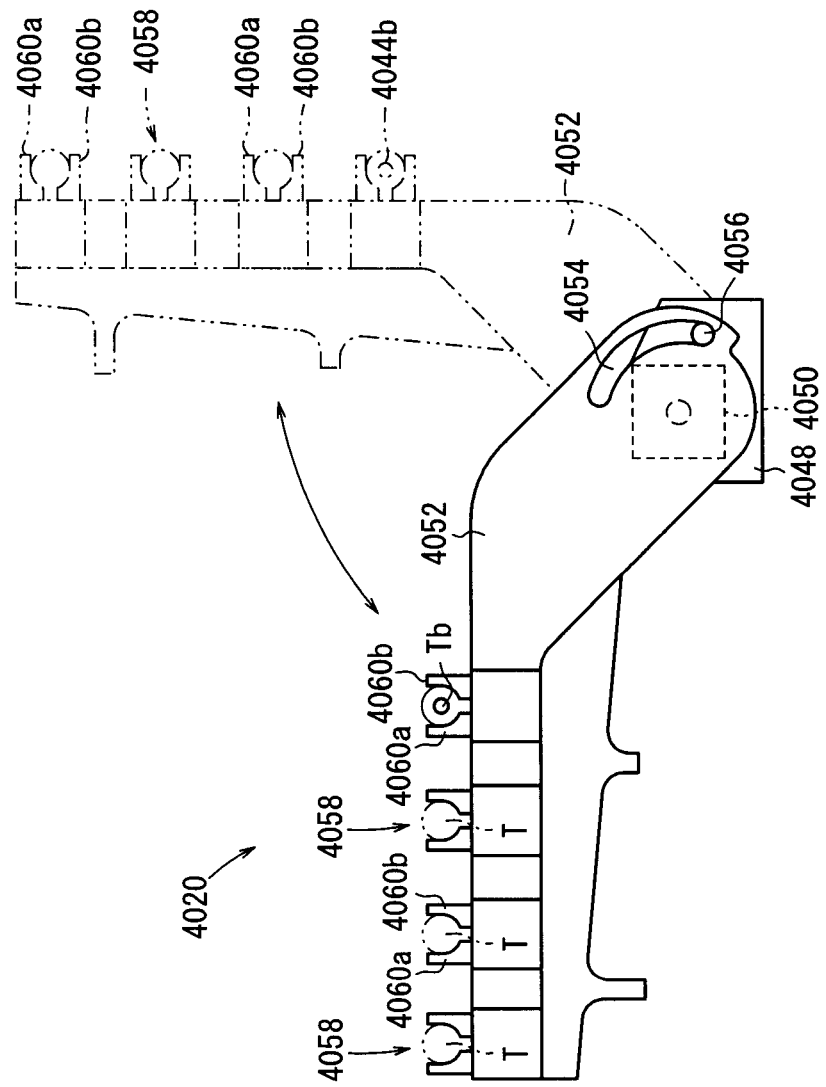
FIG. 46 is an explanatory diagram of operations of a tool exchanging unit provided on a machine tool on which a workpiece positioning table is mounted according to the third embodiment.

As shown in FIG. 43, FIG. 44 and FIG. 46, a tool exchanging unit 4020 includes an arm drive motor 4050 attached to a support base 4048, and a rotation arm 4052, one end of which is attached to the arm drive motor 4050 and which is rotatably driven thereby. An arcuate guide groove 4054 is disposed in the vicinity of the arm drive motor 4050 of the rotation arm 4052. A guide pin 4056, which slidably engages with the guide groove 4054, is disposed on the support base 4048.

In addition, the rotation arm 4052, while being guided by the guide groove 4054 and the guide pin 4056, has a swing angle range by which the rotation arm 4052 is regulated to the positions shown in FIG. 46, from the position of the actual line to that of the two-dot chain line. The arm drive motor 4050, similar to the aforementioned first drive motor 4024 etc., is constituted for example by a servo motor.

Further, on another end side, which is on an opposite side from the arm drive motor 4050 of the rotation arm 4052, a plurality of, e.g., four individual gripping means 4058 for pulling out from a tool holder 4042 a tool T that is detachably mounted in the tool holder 4042 on the spindle unit 4016, and for supplying a new tool (e.g., the tool Tb) to the tool holder 4042, are disposed on the machine tool 4012.

The tool gripping means 4058 include, respectively, a pair of claw members 4060a, 4060b, whereupon by opening/closing movements of the claw members 4060a, 4060b, the tool holder 4042 is gripped for carrying out an engaging operation for a tool T or a moving tool 5044 to be discussed later. Specifically, on the machine tool 4012, under operations of the controller 4023, the spindle unit 4016 is moved to a predetermined tool exchanging position by the spindle head unit 4018, and together therewith, when the rotation arm 4052 is rotated at the angle shown by the solid line in FIG. 46, a tool exchange operation is carried out by opening/closing operations of the gripping means 4058, and by movement of the spindle unit 4016 in the X-axis direction.

Concerning the table 4010, locations thereof which have the same structure as those of the table 202 shown in FIGS. 11 and 12 are designated by the same reference numerals, and detailed explanations of such features have been omitted.

Below, a preferred embodiment of a control method for a machine tool according to the present invention, and the relationship thereof with a machine tool that executes the control method, shall be presented and explained in detail with reference to the accompanying drawings.

Figure 54:
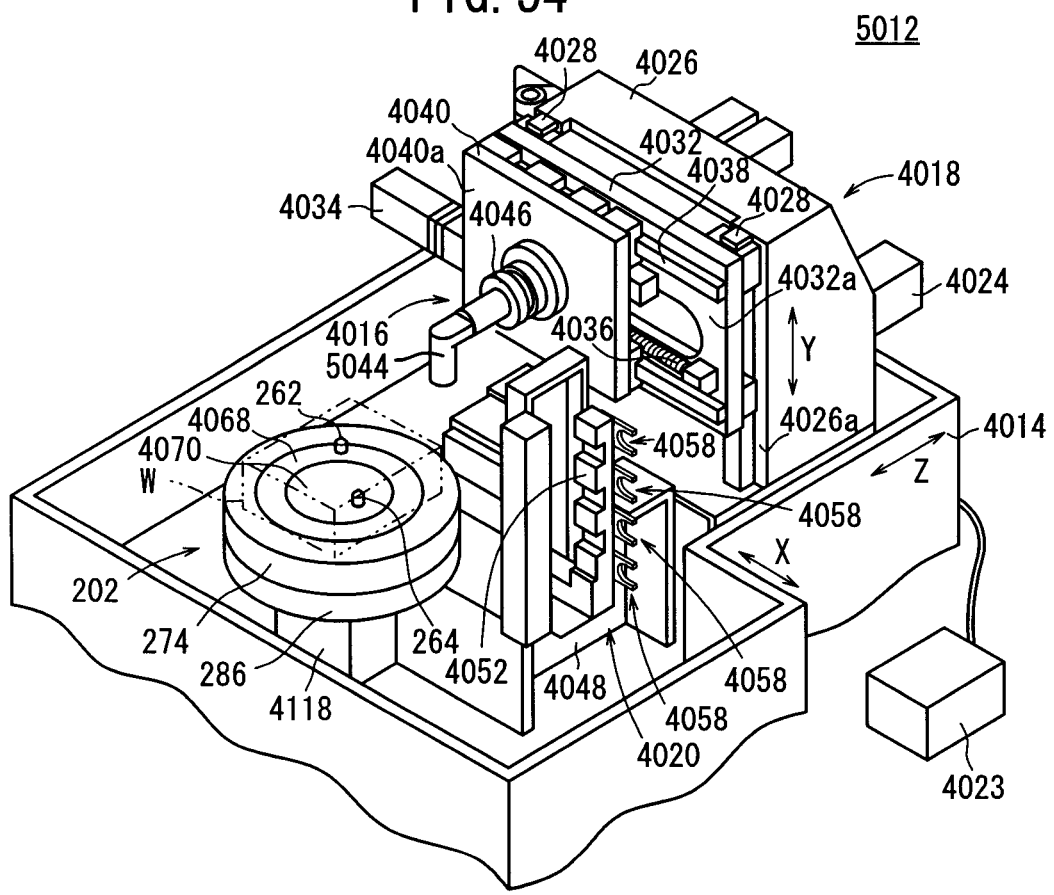
FIG. 54 is a partial cutaway perspective view of a machine tool according to a fourth embodiment.
Figure 55:
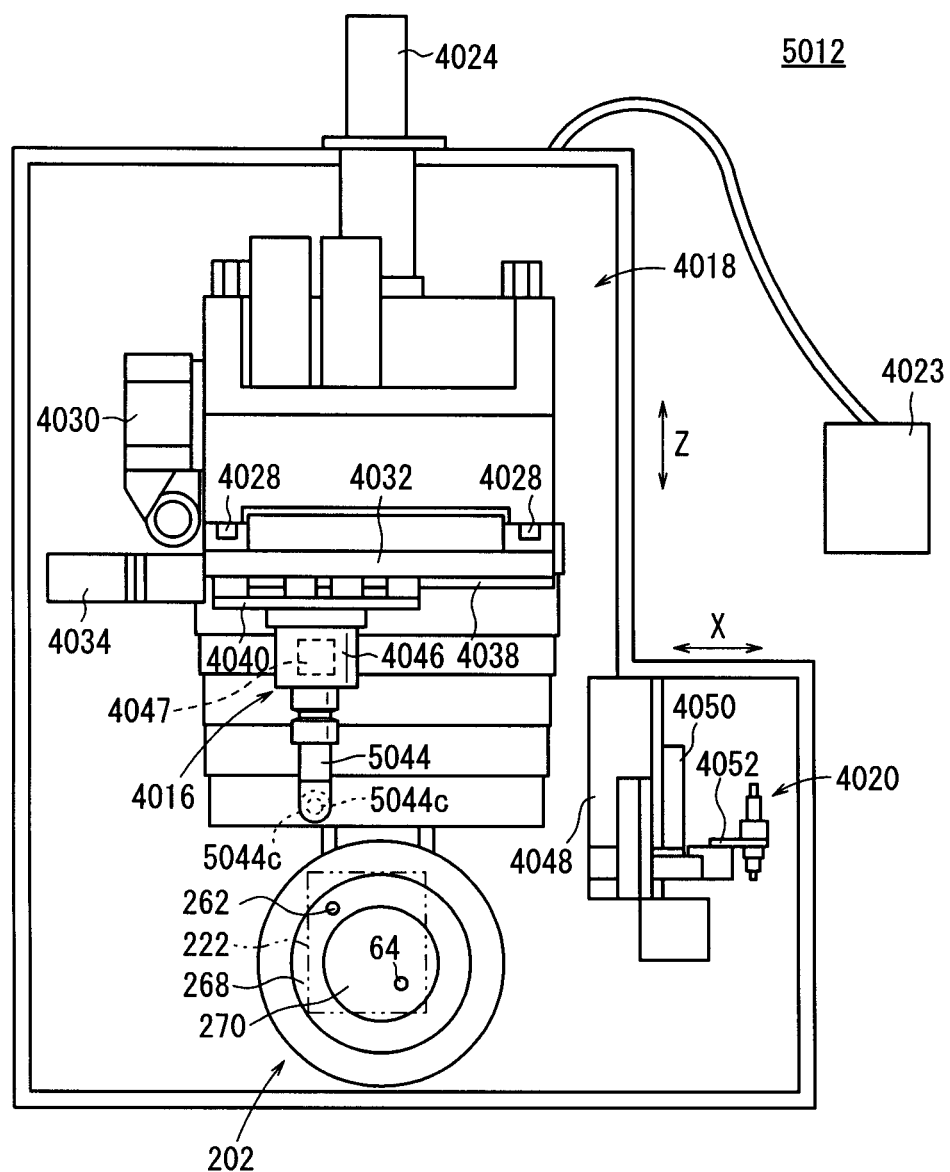
FIG. 55 is a plan view of the machine tool according to the fourth embodiment.

FIG. 54 is a partial cutaway perspective view of a machine tool 5012 according to a fourth embodiment of the present invention, and FIG. 55 is a plan view of the machine tool 5012. The machine tool 5012 is a so-called numerically controlled machine tool (NC machine tool), which enables highly precise positioning of the tool T. In the machine tool 5012, the table 4010 of the aforementioned machine tool 4012 is replaced by the aforementioned table 202, and a moving tool 5044 is provided thereon.

For this purpose, the spindle 4046 of the spindle unit 4016 that projects on the front surface 4040a of the movable table 4040, and the moving tool 5044, which is mounted onto an end portion of the spindle 4046, are movable in X-axis, Y-axis and Z-axis directions, as well as being rotatably supported, through the first drive motor 4024, the second drive motor 4030, the third drive motor 4034 and the spindle drive motor 4047, which function as drive sources of the spindle head unit 4018, by the controller 4023. Further, as discussed above, because the machine tool 5012 is an NC machine tool, movements of the spindle unit 4016 are controlled with high precision.

Figure 56:
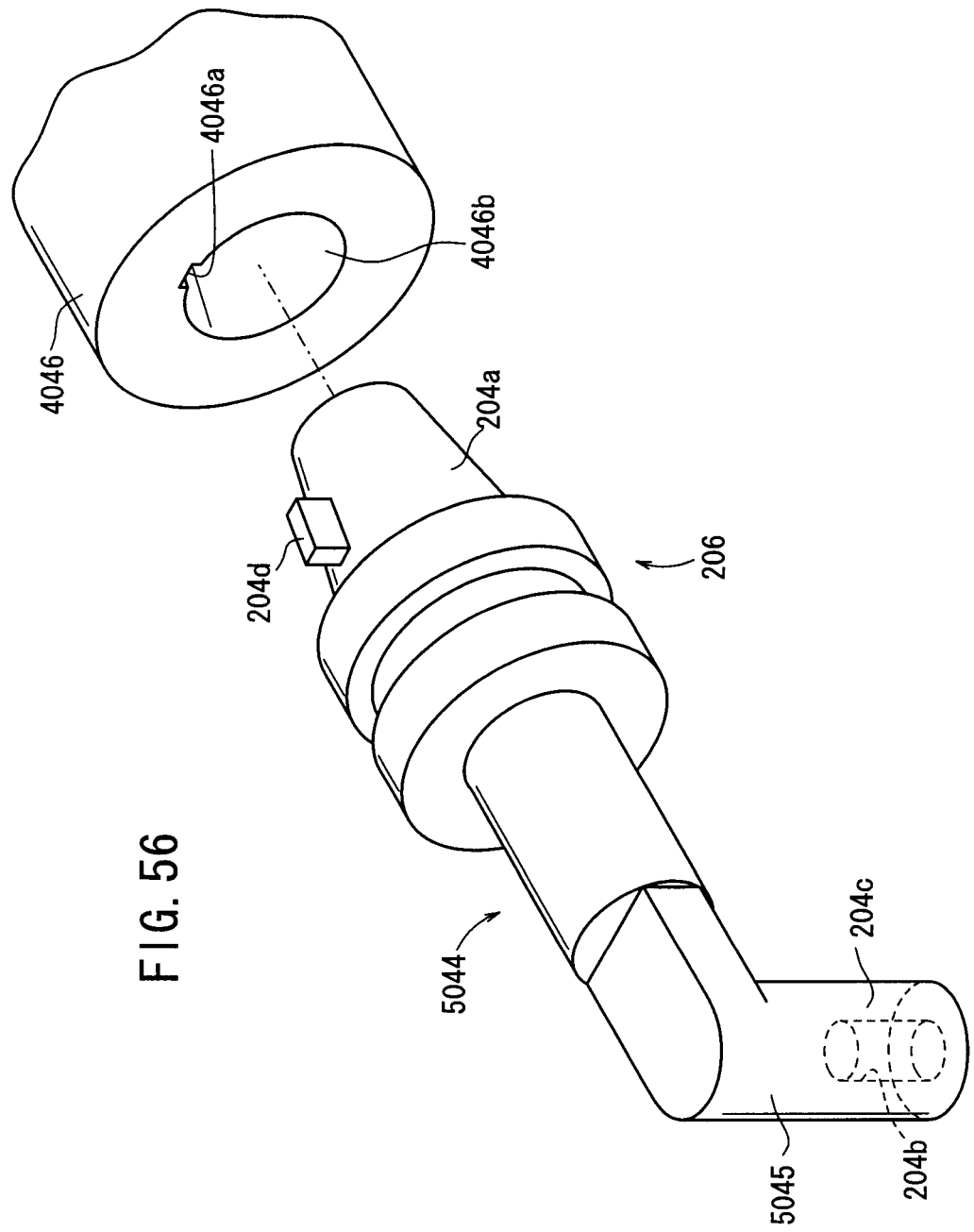
FIG. 56 is a perspective view of a moving tool used in the fourth embodiment.
Figure 57:
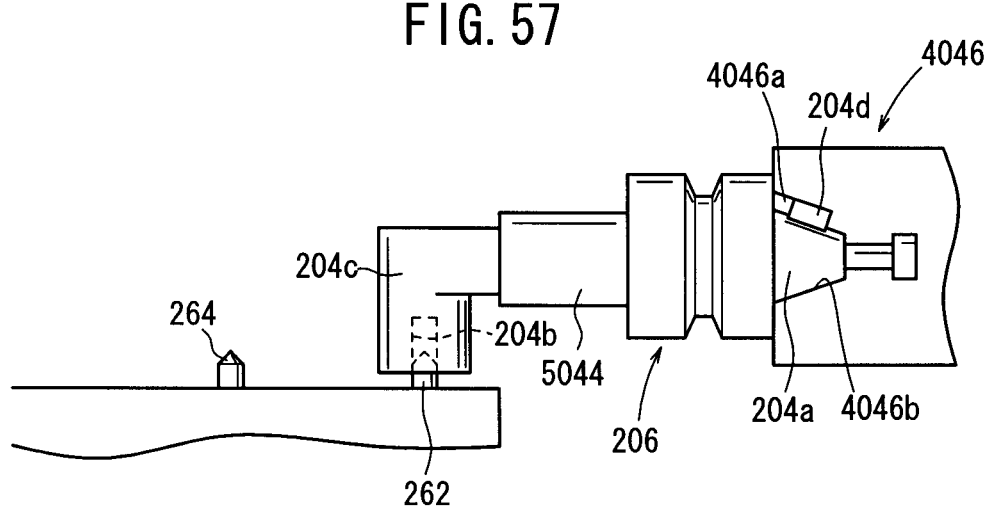
FIG. 57 is a side surface view for the purpose of explaining a condition wherein the moving tool engages with a knock pin.

As shown in FIG. 56, the moving tool 5044 has basically the same structure as that of the aforementioned moving tool 204 (see FIG. 10), having different dimensions only in respect to the length of the end portion 5045 thereof, which differs so as to conform to the corresponding length on the machine tool 5012.

The moving tool 5044 is constructed so as to be capable of installation in an installation hole 4046b of the spindle 4046 through a mounting portion 204a, and is equipped with an engagement portion 204c in which a hole 204b is formed that engages with knock pins 262, 264 of the table 202. The engagement portion 204c of the moving tool 5044 is inserted into and incorporated integrally with a tool holder 206, wherein the engagement portion 204c and the tool holder 206 are positioned by a non-illustrated positioning member.

With the machine tool 5012 according to the fourth embodiment, under an action of the controller 4023, the knock pin 262 is moved to a desired position as a result of the knock pin 262 being moved rotationally via an outer side rotation member 268 by the moving tool 5044, and is fixed in place by a first brake 304. Similarly, the knock pin 264 is moved to a desired position as a result of the knock pin 264 being moved rotationally via an inner side rotation member 270 by the moving tool 5044, and is fixed in place by a second brake 310.

As shown in FIGS. 55 and 56, the moving tool 5044 is set in the spindle 4046 through a key 204d, so that the engagement portion 204c (and hole 204b) thereof is oriented downward. Further, thereafter, the spindle drive motor 4047 is stopped such that the engagement portion 204c (and hole 204b) is maintained in the downward oriented state.

With the machine tool 5012, using the moving tool 5044, similar to the case of using the moving tool 204 in the machine tool 10, the knock pins 262 and 264 of the table 202 can be moved to suitable positions conforming to the holes Wa of the workpiece W.

Further, the rotation arm 4052 of the tool exchanging unit 4020 is rotated and fixed at the angle shown by the solid line in FIG. 46. Further, at this time, by driving the first drive motor 4024, the second drive motor 4030 and the third drive motor 4034 on the spindle head unit 4018, the spindle unit 4016 is moved in X-axis, Y-axis and Z-axis directions and stopped at a predetermined tool exchanging position.

In addition, by opening/closing operations of a predetermined gripping means 4058 on the rotation arm 4052, and movement in the X-axis direction etc. of the spindle unit 4016, the moving tool 5044 is replaced with a tool T required for carrying out processing on the workpiece W.

Again, by means of the spindle head unit 4018, the spindle unit 4016 is moved in X-axis, Y-axis and Z-axis directions, and is stopped at a location where the tool T is adjacent to a processing position on the workpiece W.

Next, the tool T is rotatably driven by the spindle drive motor 4047, and while the tool T is moved in X-axis, Y-axis and Z-axis directions by the spindle head unit 4018, predetermined processing is performed on the workpiece W. At this time, because the outer side rotation member 268 and the inner side rotation member 270 are each reliably locked in position by the first brake 304 and the second brake 310, during processing on the workpiece W, the occurrence of shifting of the knock pins 262, 264 due to loads such as cutting resistance or the like can be prevented.

Thereafter, as necessary, while the positioned state of the workpiece W on the table 202 is maintained, the table 202 is rotated by the table drive motor 4118, and the workpiece W is moved into a posture at which processing can be carried out at a next processing location, and in the same manner as above, predetermined processing is performed on the workpiece.

In the foregoing manner, in accordance with the machine tool 5012 according to the fourth embodiment, using the moving tool 5044, the knock pins 262, 264 can be directly and easily moved to positions corresponding to the holes Wa of the workpiece W, and to suitable positions for positioning the workpiece W at a desired posture. Owing thereto, processing can be carried out with respect to the workpiece W, under a condition in which various workpiece shapes may be positioned easily at desired postures.

Further, since the controlled movements of the aforementioned moving tool 5044 can be controlled by the spindle head unit 4018 of the machine tool 5012, positioning of the knock pins 262, 264 can be carried out highly precisely through an NC (numerically controlled) axis.

Figure 59:
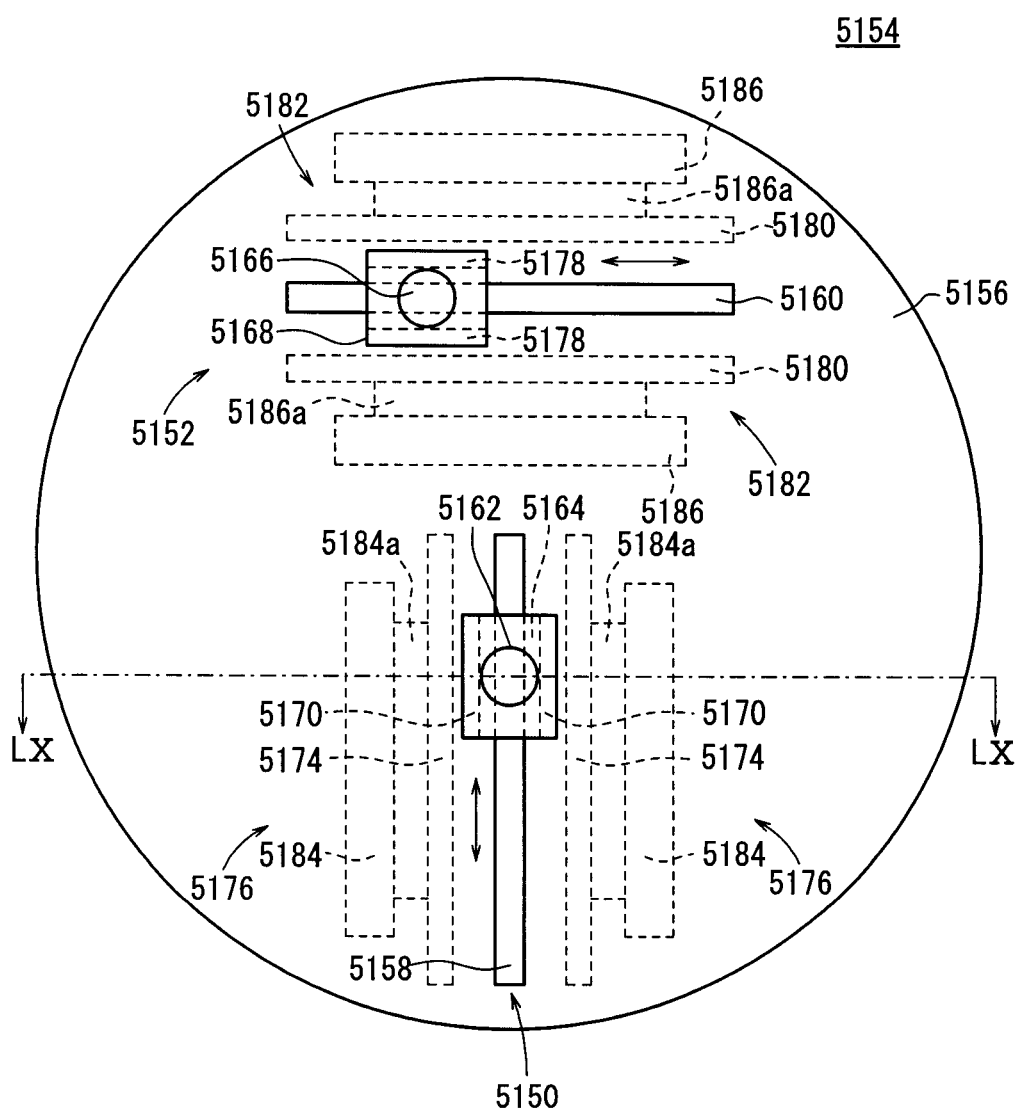
FIG. 59 is a plan view of a table, which is used in a modified example of the fourth embodiment.

Further, the outer side rotation member 268 and the inner side rotation member 270 each have cylindrical shapes as described previously and are disposed through bearings 276, 278, and in addition, when processing is performed on the workpiece W, the rotation members 268, 270 are fixed in place reliably by the first brake 304 and the second brake 310. Owing thereto, during processing of the workpiece W, the occurrence of shifting of the knock pins 262, 264 due to loads such as cutting resistance or the like can be prevented. In addition, although it is not included in the machine tool 5012, in an exemplary case, in which rotation is effected by a gear drive, backlash thereof or the like can be prevented. With the machine tool 5012, because a rotating table 202 is utilized, which makes use of the bearings 276, 278 therein, radial loads as well, which are caused by cutting resistance and the like during processing of the workpiece W, can be suppressed sufficiently, compared with a linear slide configuration as shown in FIG. 59.

Further, the bearings 276, 278 are reliably sealed off from cutting chips and cutting oil from the workpiece W by means of the seals 280, 282. Owing thereto, the durability of the table 202 can be substantially improved.

Further, by using the aforementioned moving tool 5044, a drive system for the purpose of rotatably driving the knock pins 262, 264 in the table 202, for example, a drive system for rotatably driving the outer side rotation member 268 and the inner side rotation member 270, is rendered unnecessary, and thus the structure of the table 202 can be simplified (and made lightweight).

In the foregoing description, when the knock pins 262, 264 are positioned, both of the knock pins 262, 264 are rotated together. However, naturally, it is possible for positioning of the workpiece to be performed by rotatably moving only one of the knock pin 262 and the knock pin 264.

Figure 49:
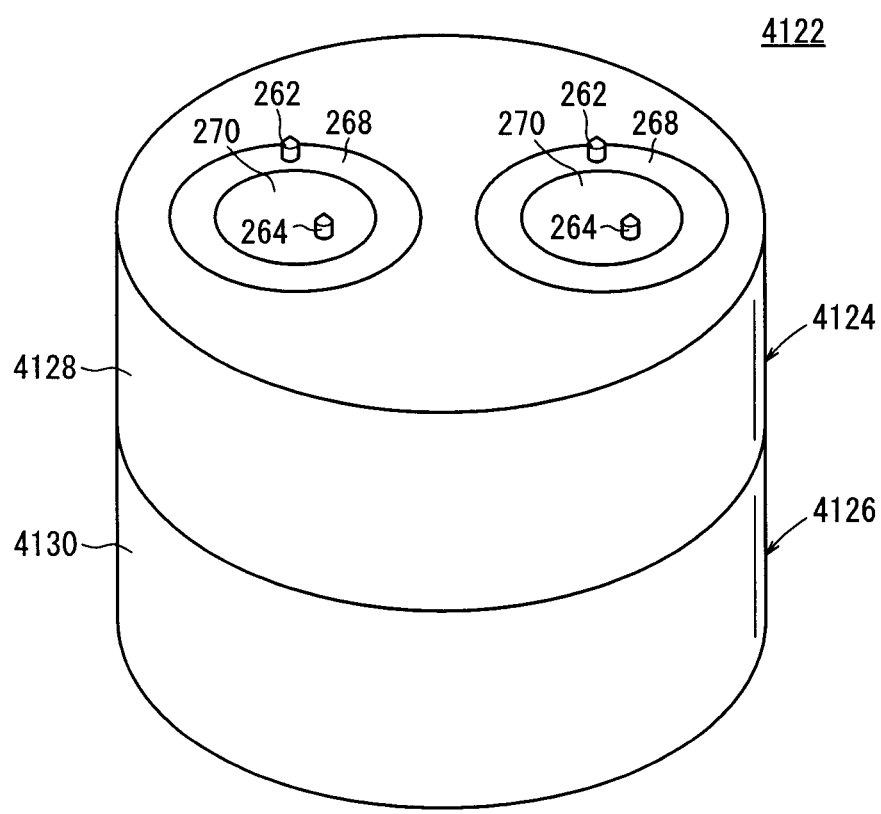
FIG. 49 is a perspective view of a workpiece positioning table according to a first modified example of the third embodiment.
Figure 50:
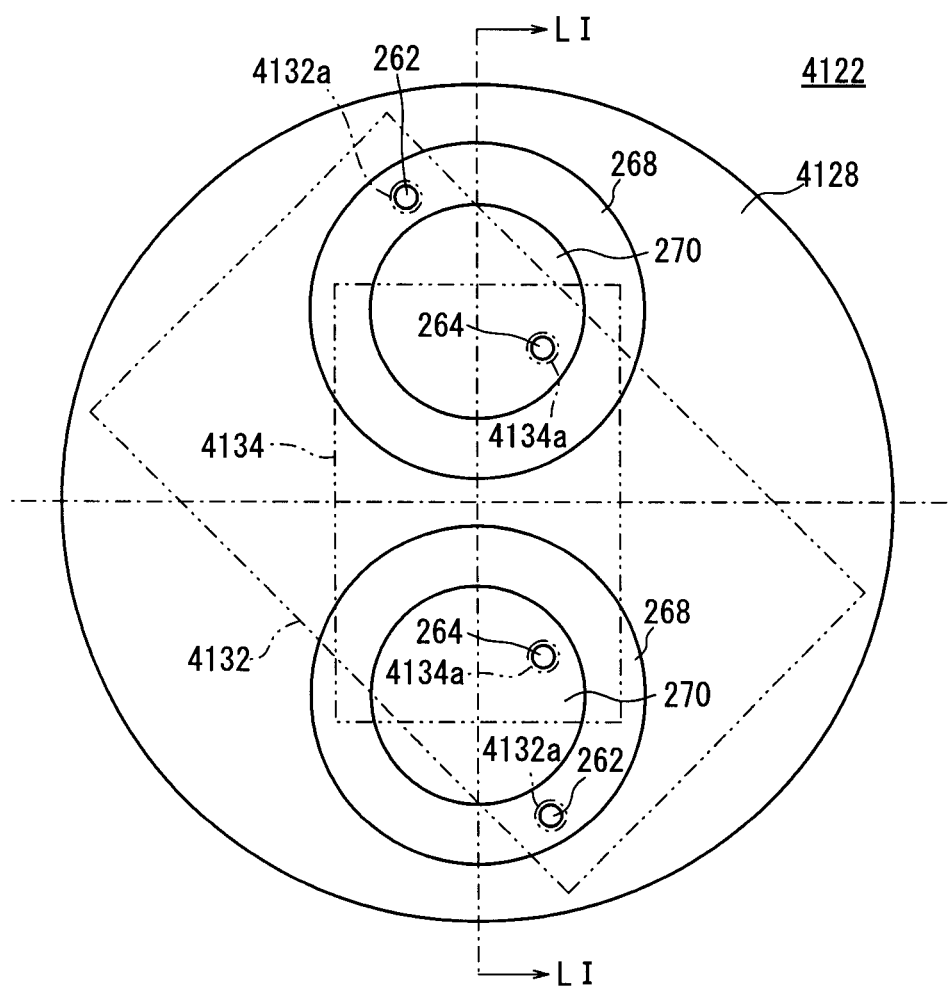
FIG. 50 is a plan view of the workpiece positioning table according to the first modified example of the third embodiment.
Figure 51:
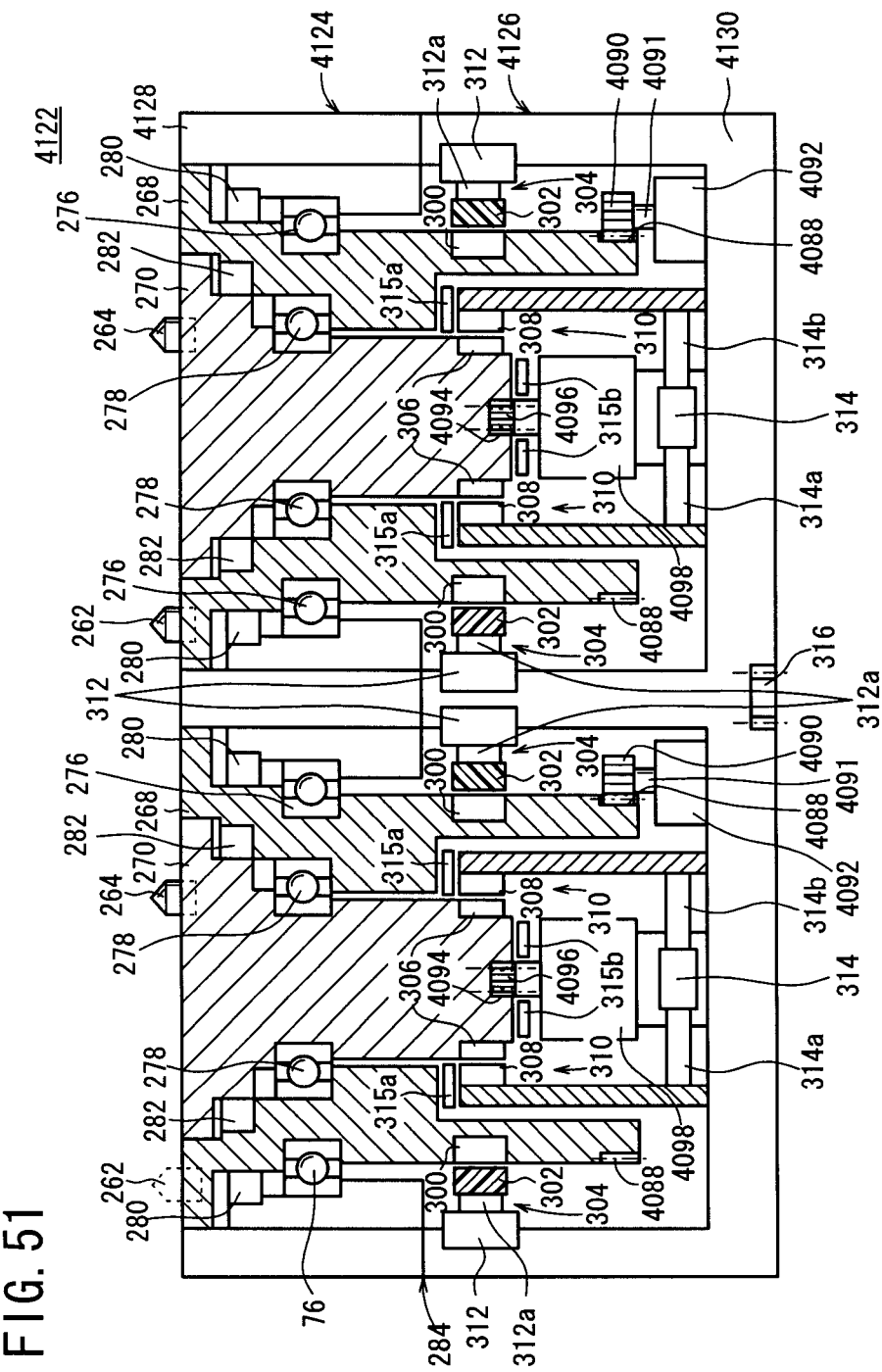
FIG. 51 is a sideways cross sectional view taken along the line LI-LI in FIG. 50.
Figure 52:
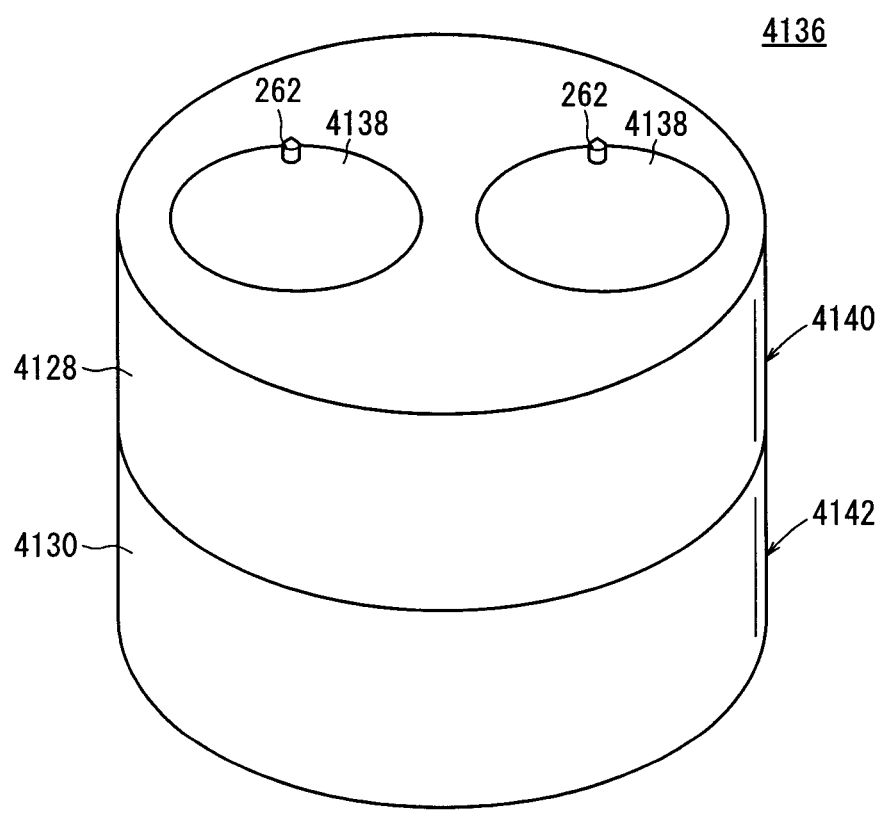
FIG. 52 is a perspective view of a workpiece positioning table according to a second modified example of the third embodiment.
Figure 53:
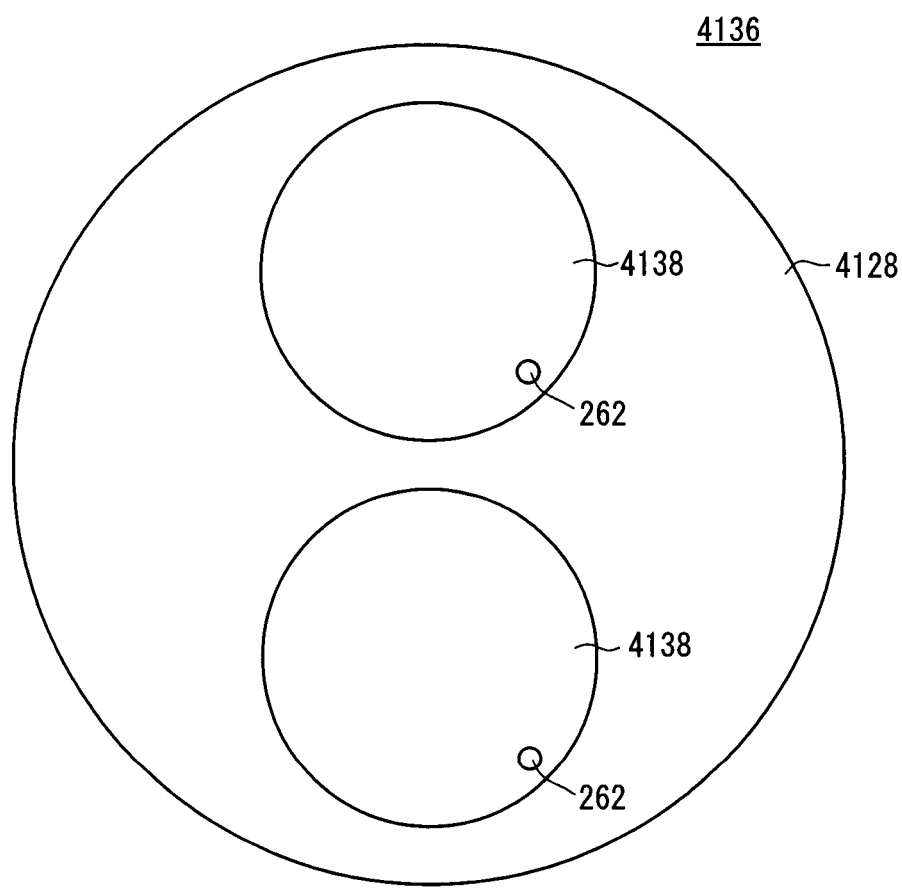
FIG. 53 is a plan view of the table according to the second modified example of the third embodiment.

Further, positioning of the knock pins 262, 264 using the moving tool 5044 may also be applied, for example, to the table 4122 shown in FIGS. 49 to 51, or to the table 4136 shown in FIGS. 52 and 53.

Figure 47:
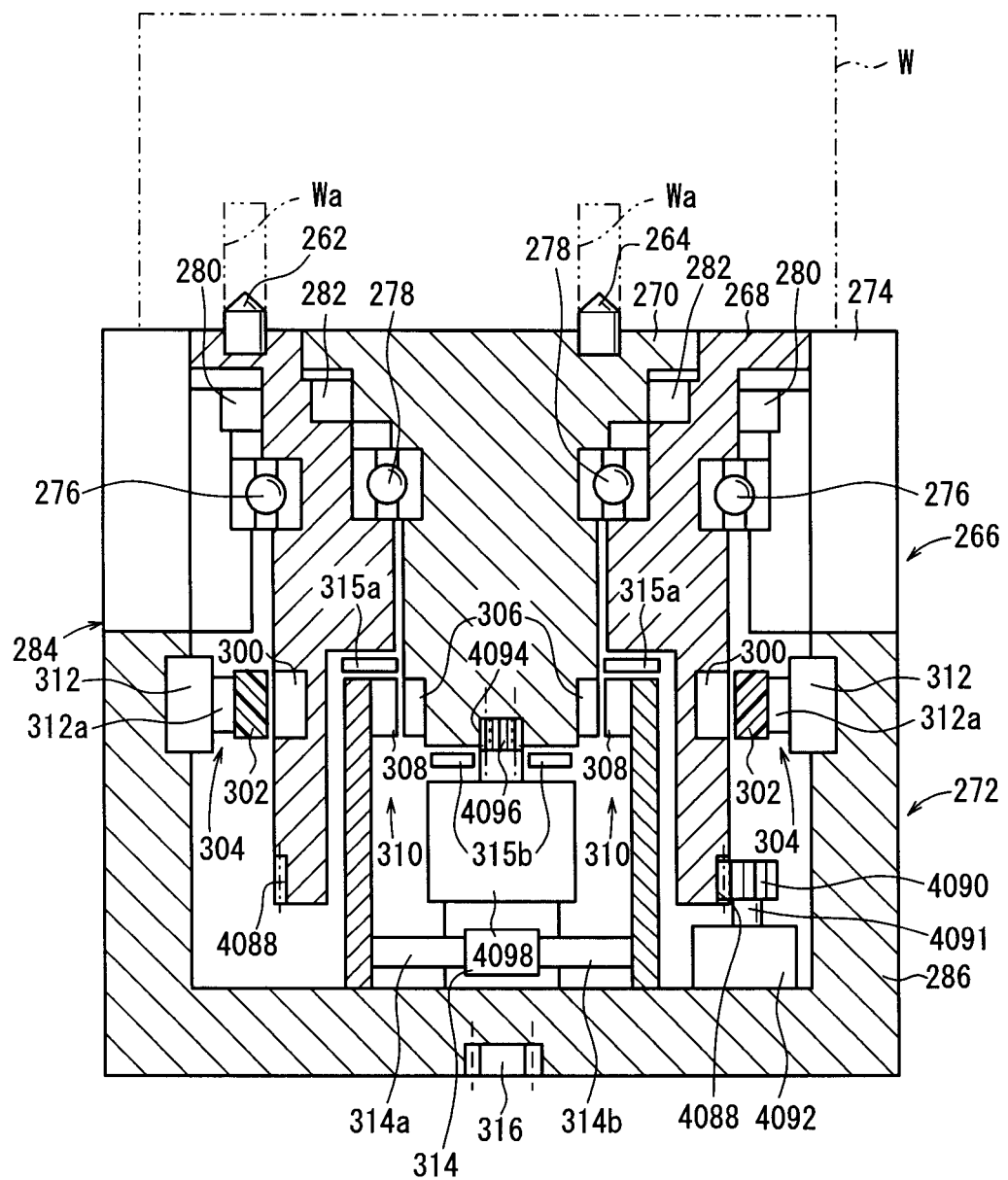
FIG. 47 is a sideways cross sectional view of the workpiece positioning table according to the third embodiment.
Figure 48:
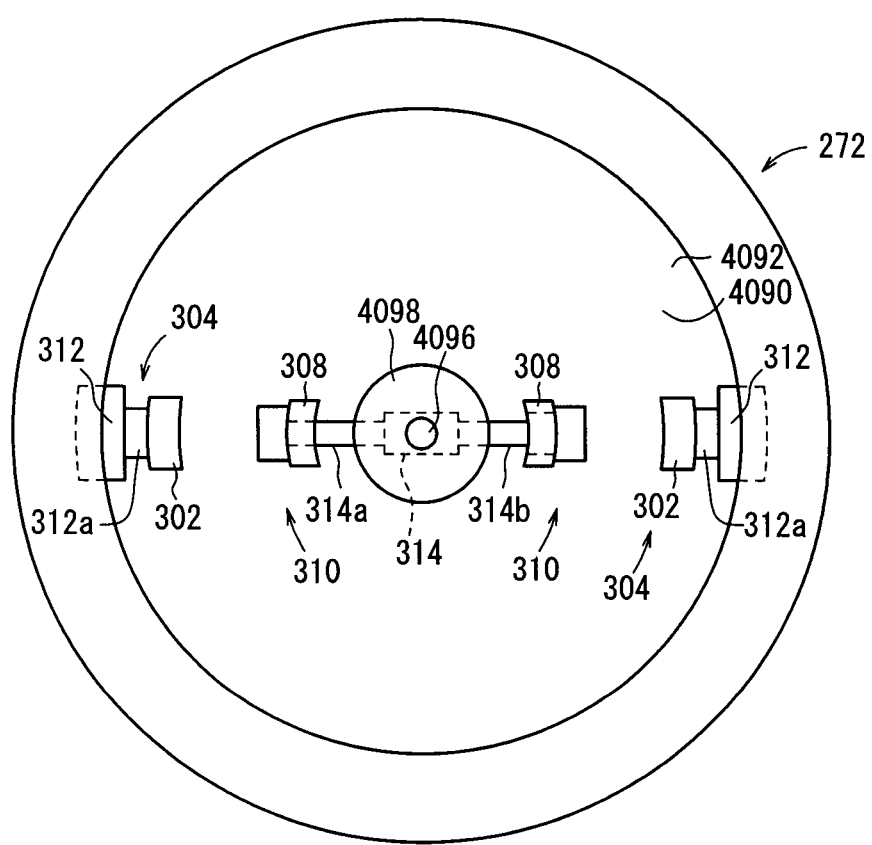
FIG. 48 is a partially omitted plan view of a driving section in the workpiece positioning table according to the third embodiment.

In this case, the drive system for rotatably moving the knock pins 262, 264, for example, a drive system for rotationally driving the outer side rotation member 268 and the inner side rotation member 270 (i.e., the outer side rotation member drive motor 4092, and the inner side rotation member drive motor 4098 of FIG. 47) are unnecessary, and thus the structures of the tables 4122 and 4136 can be simplified (and made lightweight).

Figure 58:
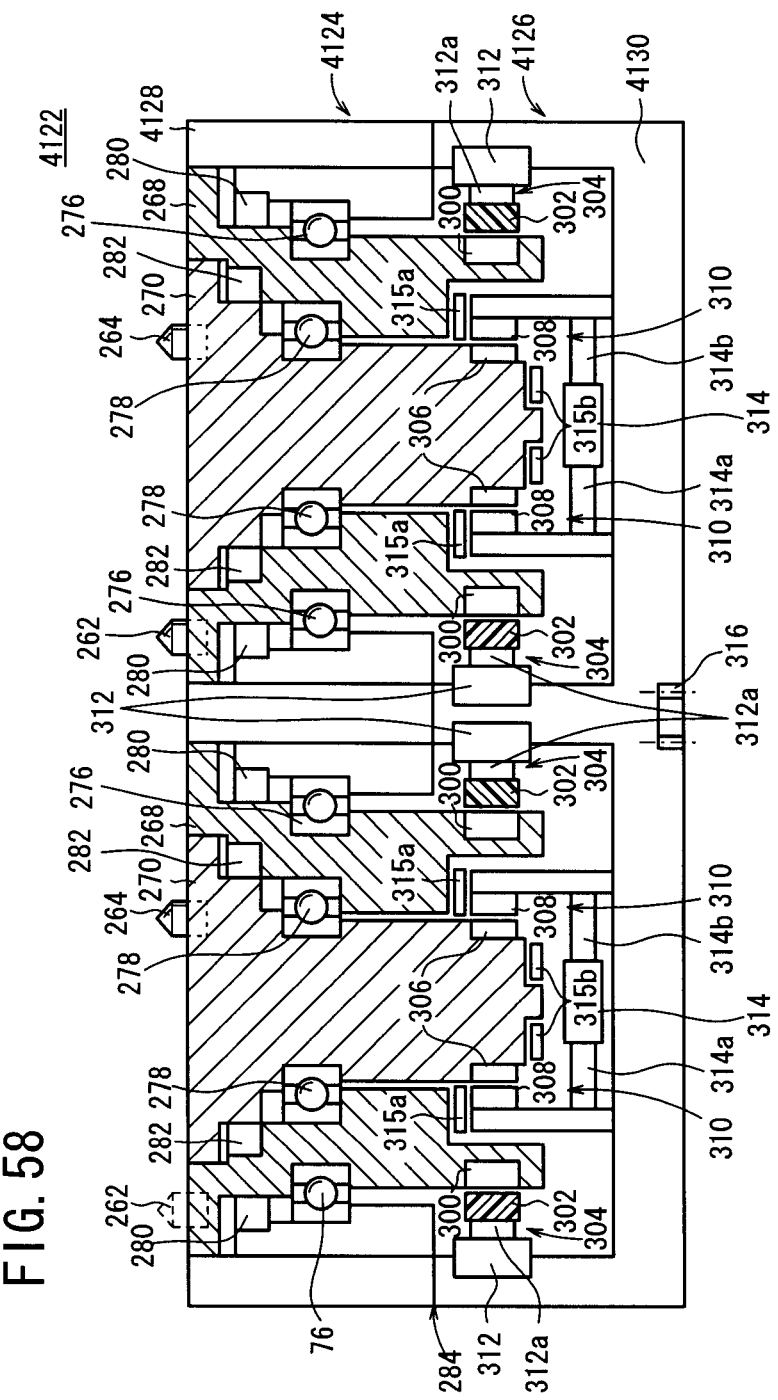
FIG. 58 is a sideways cross sectional view showing a structure in which a drive system is omitted from the workpiece positioning table according to the first modified example of the third embodiment.

With respect to the table 4122 (see FIGS. 49 to 51), in the case that positioning of the knock pins 262, 264 is performed using the moving tool 5044, a structure in which the drive system has been omitted is shown in FIG. 58.

Next, a table 5154 according to a modified example of the fourth embodiment shall be described with reference to FIGS. 59 and 60.

Concerning the table 5154, compared to the aforementioned table 202, a difference exists in that, in place of the outer side rotation member 268 and the inner side rotation member 270, a table 5154 is provided having a first slide mechanism 5150 and a second slide mechanism 5152.

The table 5154 includes a frame 5156, and as shown in FIG. 59, grooves 5158, 5160 are formed in the frame 5156 in mutually perpendicular directions.

Figure 60:
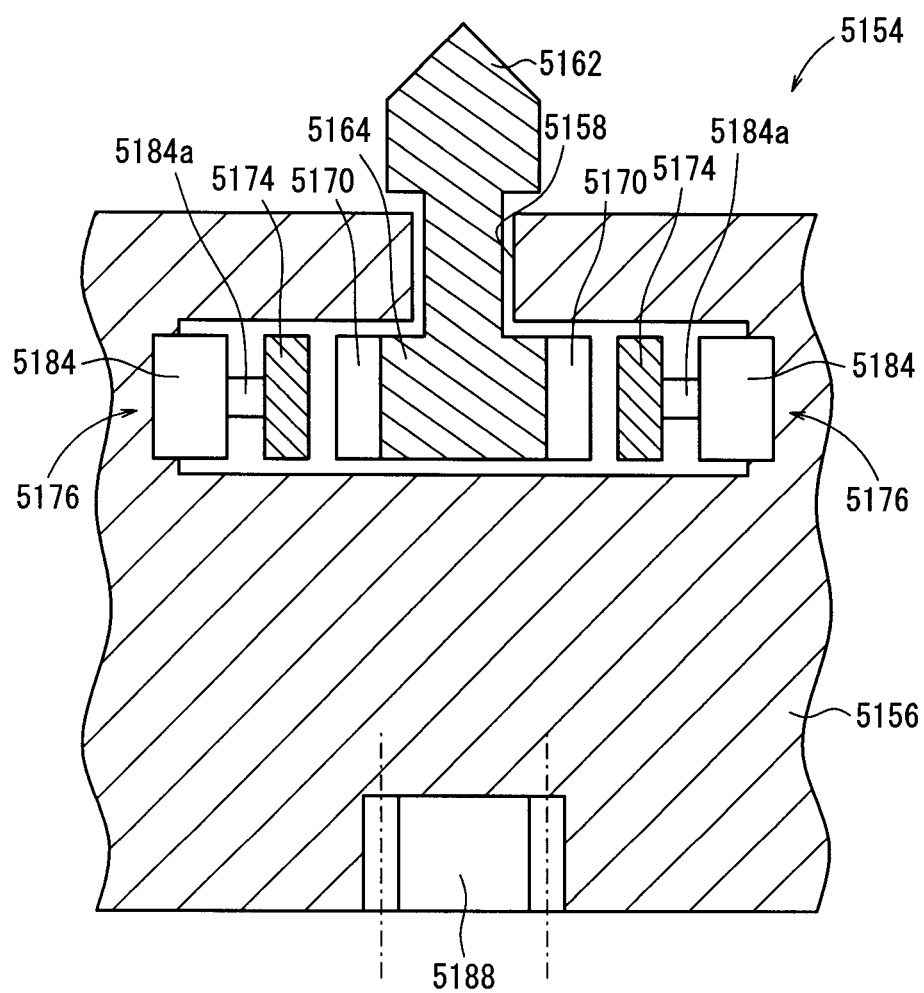
FIG. 60 is a cross sectional view taken along the line LX-LX in FIG. 59.

The first slide mechanism 5150 is equipped with a slide member 5164 having a knock pin 5162, wherein an end on an opposite side from the knock pin 5162 of the slide member 5164 engages in the groove 5158, as shown in FIG. 60. Similarly, the second slide mechanism 5152 is equipped with a slide member 5168 having a knock pin 5166, wherein an end on an opposite side from the knock pin 5166 of the slide member 5168 engages in the groove 5160, in the same manner as the aforementioned first slide mechanism 5150.

Owing thereto, the slide members 5164, 5168 are capable of advancing and retracting inside the respective grooves 5158, 5160.

Further, in the first slide mechanism 5150, a pair of brakes 5176 is provided, in which by means of friction produced by pressing abutment of pads 5174 with respect to moving elements 5170 formed on the end of the slide member 5164, movement of the slide member 5164 is stopped and the slide member 5164 is fixed in place. Similarly, in the second slide mechanism 5152, a pair of brakes 5182 is provided, in which by means of friction produced by pressing abutment of pads 5180 with respect to moving elements 5178 formed on the end of the slide member 5168, movement of the slide member 5168 is stopped and the slide member 5168 is fixed in place. An engagement hole 5188 is formed at the bottom center of the frame 5156 on the table 5154.

Under operation of the controller 4023, the brakes 5176, 5182 are pressure operated by expansion and contraction of rods 5184a, 5186a in the cylinder mechanisms 5184, 5186, and by pressing of the pads 5174, 5180 against the moving elements 5170, 5178, whereby the slide members 5164, 5168 are stopped and fixed in place.

In the above manner, because the table 5154 is equipped with the first slide mechanism 5150 and the second slide mechanism 5152, by means of the moving tool 5044 in the machine tool 5012, the knock pins 5162, 5166 can be moved easily forward and backward. Further, by means of the brakes 5176, 5182, the slide members 5164, 5168 can reliably be stopped (fixed in place) at predetermined positions. Accordingly, under a condition in which workpieces having various shapes are positioned easily at desired postures, desired processing can be carried out with respect to the workpieces W.

Further, with the table 5154, as fixing parts used for positioning the workpiece, the knock pins 5162, 5166 on the first slide mechanism 5150 and the second slide mechanism 5152 are used. Owing thereto, the structure of the table 5154 is simplified, and is operative in accordance with usage conditions of the machine tool 5012 as well as with various workpiece types.

The present invention is not limited to the above embodiment, and various other configurations can be adopted as a matter of course without deviating from the essence and gist of the present invention.

For example, as workpieces that are positioned on the above tables 202, 5154, naturally the invention is not limited to the workpieces W shown in the above embodiments, and positioning and processing of workpieces having a large variety of shapes is possible. Further, as a method for positioning of such workpieces W in place of engagement between the holes Wa of the workpieces W and the knock pins 262, 264, 5162, 5166, projecting members (pins) may be provided respectively on the workpieces W and in place of the knock pins 262, 264, 5162, 5166, positioning may be accomplished by forming respective concave holes on each of the tables 202, 5154. In this case, the end of the moving tool 5044 may be formed with a shape that engages with the concave holes formed respectively in each of the tables 202, 5154.

Further, it is desirable for the moving tool 5044 to be capable of moving the fixing parts, which are used for the purpose of positioning the workpiece W.

Further, it is a matter of course that the invention is not limited to the spindle head unit 4018, the tool exchanging unit 4020, etc. used in the machine tool 5012 of each of the above embodiments. Further, movement in three dimensions of the spindle 4046 of the spindle unit 4016 is not limited to a Cartesian coordinate system configuration in accordance with the aforementioned X-axis, Y-axis and Z-axis system. Control may also be carried out using a polar coordinate system configuration including a rotational axis.

Furthermore, in the above tables 202, 5154, it is preferable to have a structure that enables the knock pins 262, 264, 5162, 5166 to be rotated and stopped (fixed) in place, although the invention is not limited to the structures noted for the above embodiments.

With the table 4122, the combination of the outer side rotation member 268 and the inner side rotation member 270 is made up of two units, however, a structure involving a combination of three or more units naturally may be provided. Similarly, in the table 5454, a structure may be provided comprising a plurality of first slide mechanisms 5150 and second slide mechanisms 5152.

Below, concerning a workpiece positioning table according to the present invention, a preferred embodiment thereof, and the relationship with a machine tool on which the workpiece positioning table is mounted, shall be presented and explained in detail with reference to the accompanying drawings.

Figure 61:
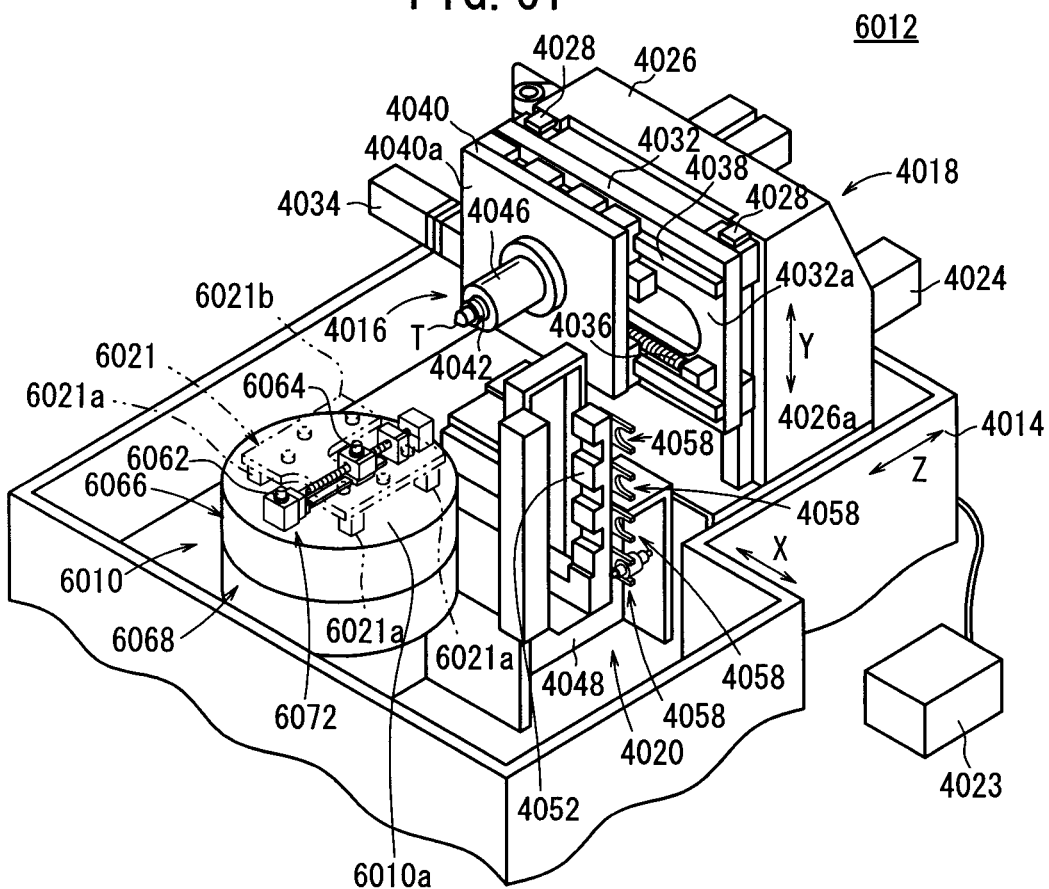
FIG. 61 is a partial cutaway perspective view of a machine tool on which a workpiece positioning table is mounted according to a fifth embodiment.
Figure 62:
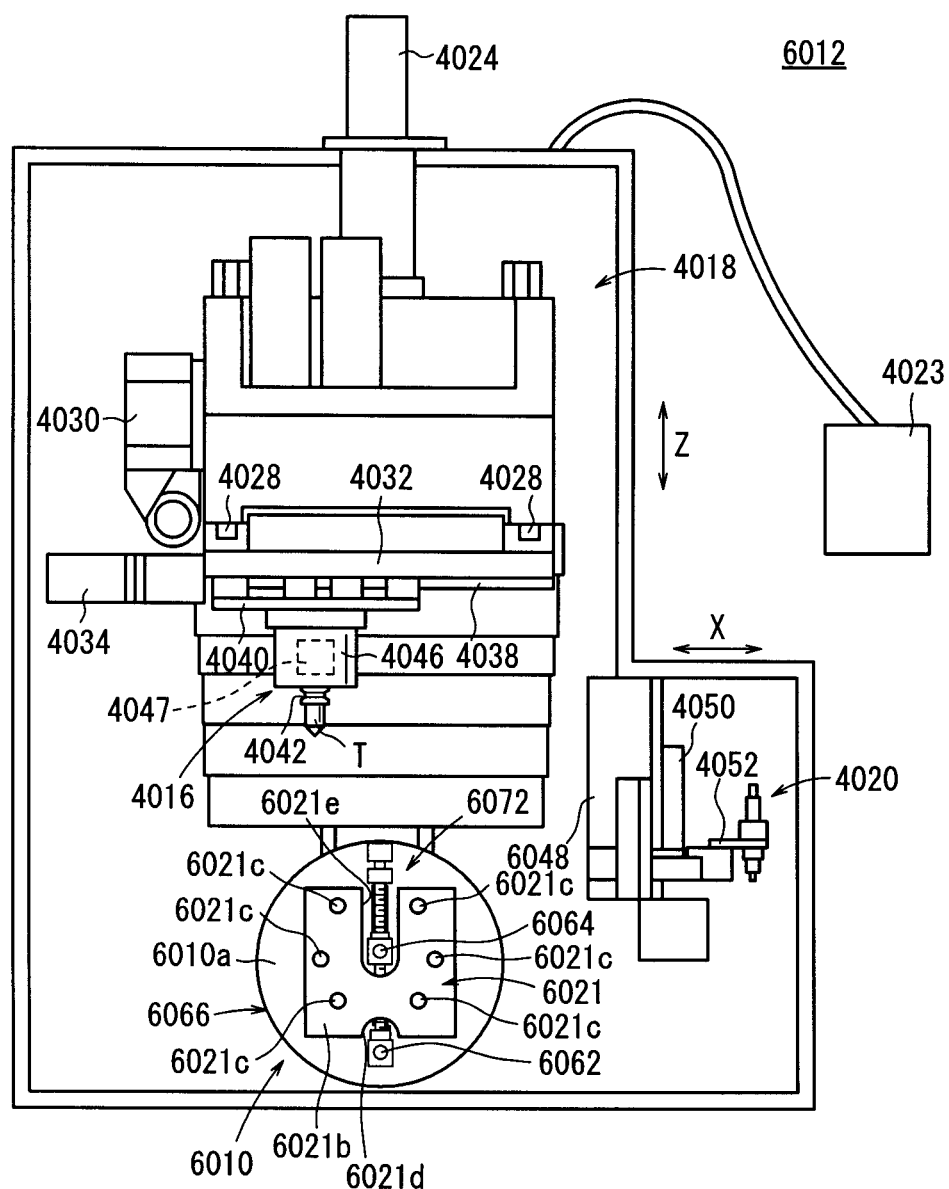
FIG. 62 is a plan view of a machine tool on which a workpiece positioning table is mounted according to the fifth embodiment.
Figure 63:
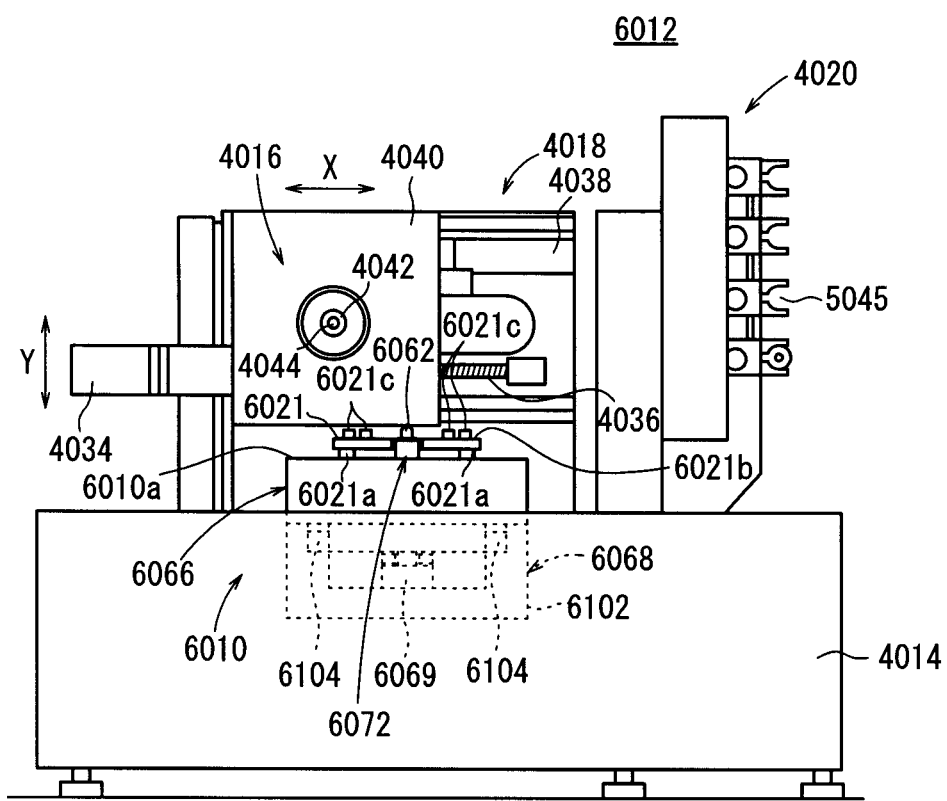
FIG. 63 is a front view of a machine tool on which a workpiece positioning table is mounted according to the fifth embodiment.

FIG. 61 is a partial cutaway perspective view of a machine tool 6012 on which a table 6010 is mounted, which makes up a workpiece positioning table according to a fifth embodiment, FIG. 62 is a plan view of the machine tool 6012, and FIG. 63 is a front view of the machine tool 6012. The machine tool 6012 is a so-called numerically controlled machine tool (NC machine tool), which enables highly precise positioning of a spindle 4046 (processing spindle). In the machine tool 6012, the table 4010 utilized with respect to the aforementioned machine tool 4012 is replaced by the table 6010.

As shown in FIGS. 61 to 63, a mounting base 6021 corresponds to the shape of a lower surface (i.e., a surface that abuts against the top of the mounting base 6021) of the workpiece W, which is provided for the purpose of reliably mounting the workpiece W. The mounting base 6021 further comprises a structure in which a mounting plate 6021b is assembled onto four legs 6021a, which are detachably affixed to a top of the table surface 6010a. Further, on the mounting base 6021, six projections 6021c are disposed on top of the mounting plate 6021b, which correspond to non-illustrated recesses formed in the bottom surface of the workpiece W.

Furthermore, on the mounting base 6021, two escape portions 6021d, 6021e are formed, which make up inwardly curved (gulf shaped) hole portions. The escape portion 6021d is provided so as to avoid a fixed pin 6062. Further, a movable pin 6064 faces inwardly from the escape portion 6021e (see FIGS. 64 and 65). The escape portion 6021e faced by the movable pin 6064 has an elongate shape, which enables the movable pin 6064 to be moved within a predetermined range.

Figure 64:
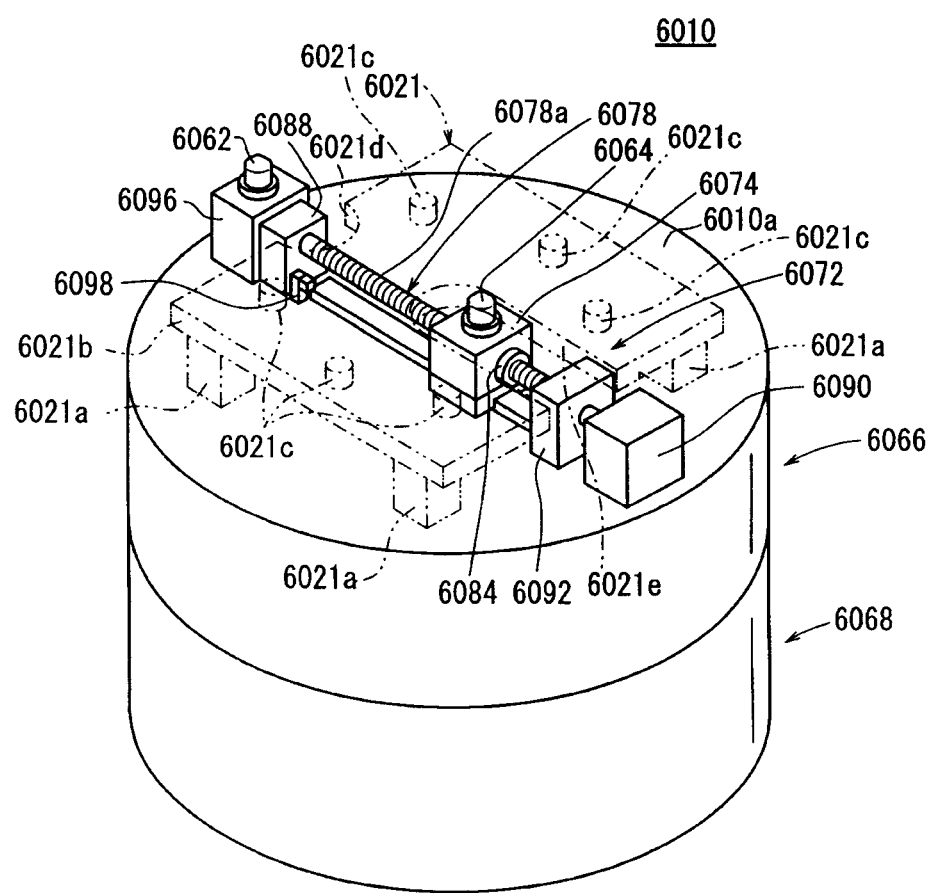
FIG. 64 is a perspective view of a table used in the machine tool according to the fifth embodiment.
Figure 65:
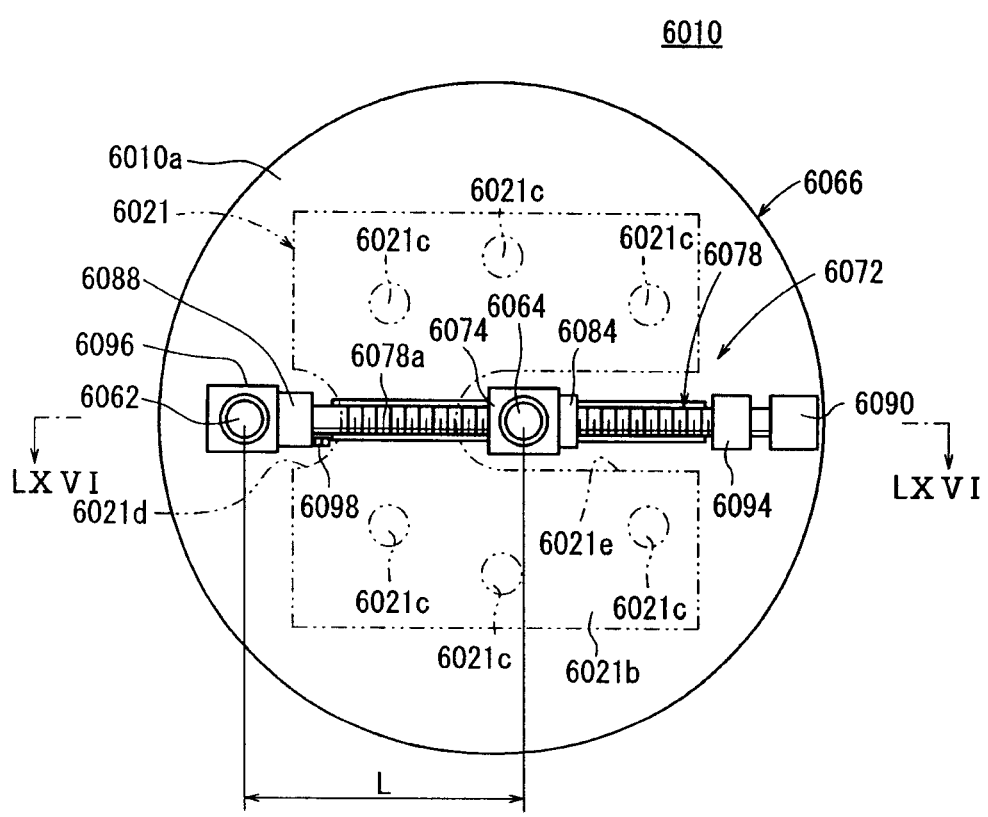
FIG. 65 is a plan view of a table used in the machine tool according to the fifth embodiment.
Figure 66:
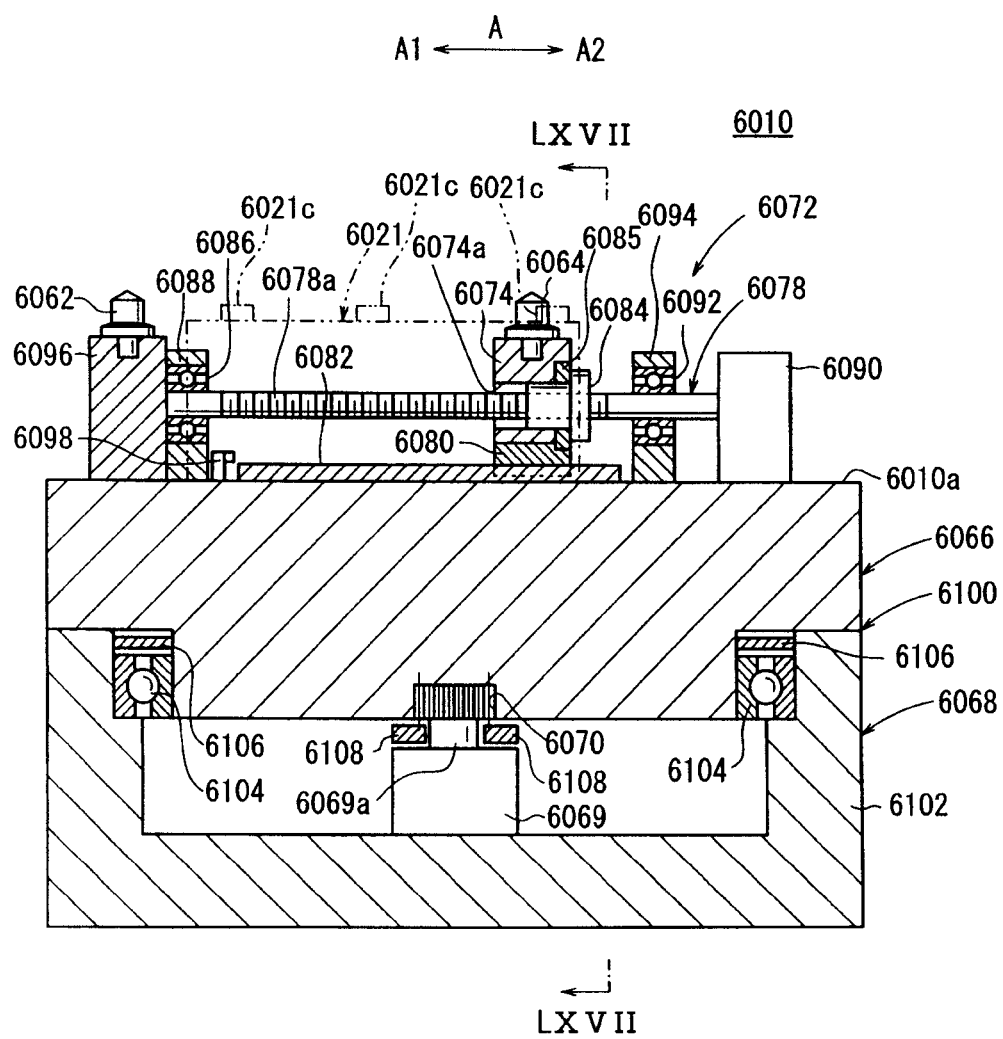
FIG. 66 is a cross sectional view taken along the line LXVI-LXVI in FIG. 65.

As shown in FIGS. 64 to 66, the table 6010 comprises a rotating portion 6066 having a table surface 6010a, and a drive section 6068 (rotation means) attached under the rotating portion 6066 for rotatably (rotationally) driving the rotating portion 6066. The bottom surface of the drive section 6068 is affixed on top of the base 4014 of the machine tool 6012 directly or through a non-illustrated member.

The rotating portion 6066 is a stepped, columnar shaped member having a table surface 6010a thereon, with a engagement hole 6070, which engages with the drive shaft 6069a of a rotating portion drive motor 6069 of a drive section 6068, to be discussed later, being provided in the bottom center thereof. Further, on top of the table surface 6010a, a fixed pin 6062 (first reference member) and a movable pin 6064 (second reference member) are arranged, which make up respective knock pins for engagement with two reference holes Wa, Wb (first and second reference parts; see FIG. 45) that define positioning parts of the workpiece W, and which carry out positioning of the workpiece W.

Furthermore, on top of the table surface 6010a of the rotating portion 6066, a linear moving means 6072 is arranged for linearly moving the movable pin 6064.

Detailed explanations shall be made with reference to FIGS. 64 to 66 concerning the linear moving means 6072 utilized in the fifth embodiment. As noted above, the linear moving means 6072 makes up a moving means for linearly moving the movable pin 6064, and is arranged so as to extend in a straight line shape along an axis that passes through the center of the table surface 6010a.

Figure 67:
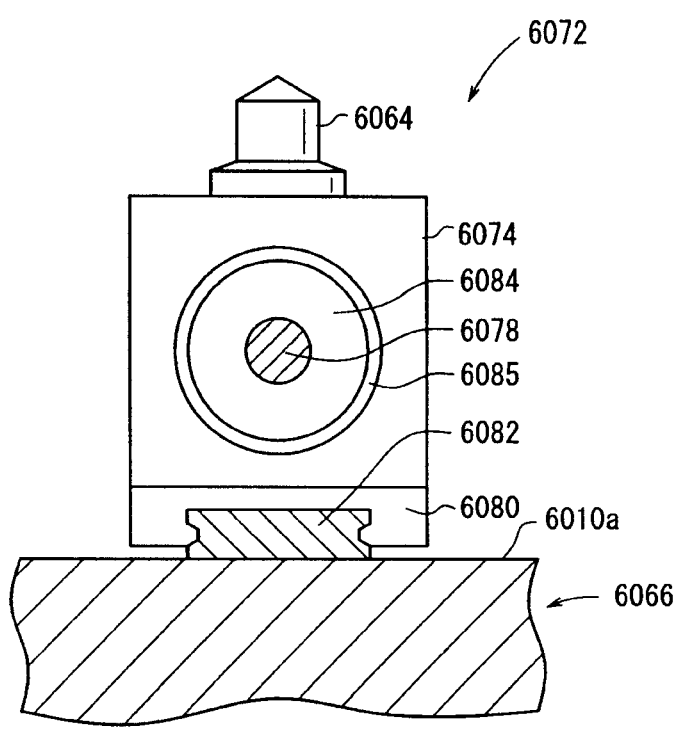
FIG. 67 is a partially omitted vertical cross sectional view taken along the line LXVII-LXVII in FIG. 66.

As shown in FIG. 66, the linear moving means 6072 comprises a movable member (moving part) 6074 on which the movable pin 6064 is disposed projecting on an upper portion thereof, and a ball screw (rotating member) 6078 having a screw portion 6078a that penetrates through a hole 6074a of the movable member 6074. By being supported on a linear guide 6082 (see FIG. 67) through a slider 6080 connected to a bottom part thereof, the movable member 6074 is linearly movable in the direction of the arrow A in FIG. 66. Further, a nut member 6084 (moving part), which is capable of threaded engagement with the screw portion 6078a, is interposed between the hole 6074a of the movable member 6074 and the screw portion 6078a that penetrates through the hole 6074a, wherein the movable member 6074 and the nut member 6084 are connected together through an elastic body 6085. The elastic body 6085 can utilize any material having good elasticity, for example, rubber, a disc spring, a coil spring, or the like.

Furthermore, the linear moving means 6072 is equipped with a support member 6088 having a bearing 6086 therein, which axially supports one end (arrow A2 direction in FIG. 66) of the ball screw 6078, and a rotary drive motor 6090, which is connected to the other end (arrow A1 direction) of the ball screw 6078 through a non-illustrated drive shaft. Further, in the arrow A1 direction of the rotary drive motor 6090, and at a position distanced slightly from the rotary drive motor 6090, a support member 6094 is provided, inside of which a bearing 6092 that supports the ball screw 6078 is installed.

Figure 68:
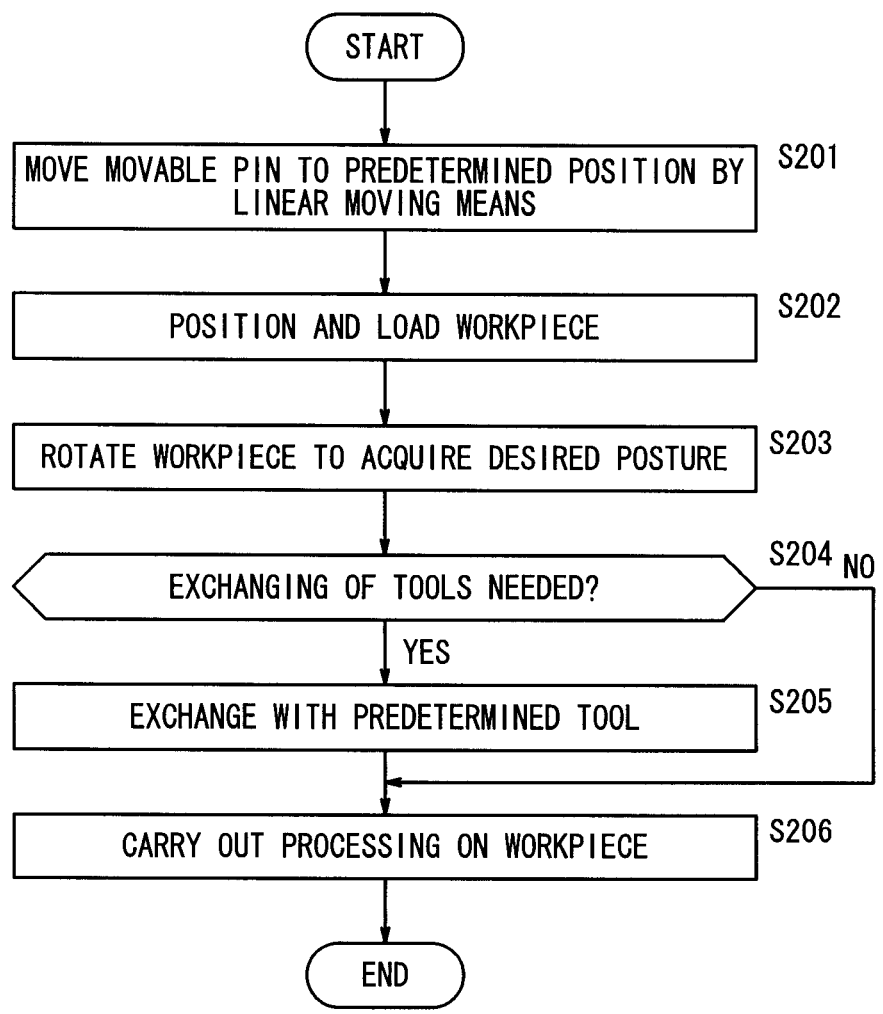
FIG. 68 is a flowchart for the purpose of explaining the sequence of workpiece processing by the machine tool according to the fifth embodiment.

On top of the table surface 6010*a*, in the arrow A1 direction of the support member 6088, a fixed member 6096, on which the fixed pin 6062 projects on an upper portion thereof, is arranged in parallel. In addition, as shown in FIG. 68, the height of the mounting base 6021 is set to be higher than the fixed member 6096 and the movable member 6074, yet lower than the fixed pin 6062 and the movable pin 6064.

Accordingly, with the linear moving means 6072, by rotating the ball screw 6078 through a rotation drive force of the rotary drive motor 6090, the movable member 6074 is moved linearly together with the nut member 6084, which is threadedly engaged with the screw portion 6078*a*. Owing thereto, the movable pin 6064 can be moved linearly, and a distance L (see FIG. 65) between the movable pin 6064 and the fixed pin 6062 is capable of being changed to a predetermined distance. At this time, the movement distance of the movable member 6074 may be detected by an optical sensor 6098 (first detection means), which points toward the direction of the movable member 6074 and is positioned alongside the support member 6088. Further, a non-illustrated linear encoder head may be assembled onto the slider 6080, which slides on top of the linear guide 6082, and a ribbon scale of the linearly encoder may be assembled onto the side of a non-illustrated linear guide, that is, on the table surface 6010*a*, whereby the movement distance of the movable member 6074 can be detected thereby.

At this time, as described above, since the escape portion 6021*e* is provided in the mounting base 6021, the movable pin 6064 can be moved within a sufficient range (in the direction of the arrow A of FIG. 66) for positioning the workpiece W.

Further, in the foregoing manner, the movable member 6074 is affixed with respect to the nut member 6084 through an elastic body 6085. Owing thereto, in a state where the movable member 6074 (movable pin 6064) is fixed in a predetermined position, more specifically, in a state where the screw portion 6078*a* and the nut member 6084 are threadedly engaged and affixed at a predetermined position, because the movable member 6074 (movable pin 6064) is supported elastically by the elastic body 6085, a small amount of movement (fine movement) thereof is possible in the axial direction (direction of the arrow A in FIG. 66). Through operation of such an elastic body 6085, when the movement range (movement width) of the movable member 6074 (movable pin 6064) is set to be larger than any looseness due to the threaded engagement between the screw portion 6078*a* of the ball screw 6078 and the nut member 6084, the movable member 6074 (movable pin 6064) can be elastically supported with a sufficient movement amount.

The movable member 6074 on which the movable pin 6064 projects is elastically supported so that, as described above, a small amount of movement in the axial direction (movement direction) is permitted by the elastic body 6085. However, in the direction of rotation (a direction perpendicular to the aforementioned axial direction; see FIG. 70A) of the table surface 6010*a*, the movable member 6074 is supported with high rigidity, without being resiliently supported on the elastic body 6085. Accordingly, on the table 6010, while pitch errors and the like are absorbed by being elastically supported in the axial direction of the movable pin 6064, the workpiece can be easily positioned, and furthermore, the positioning thereof can be carried out with high precision.

On the other hand, the drive section 6068 is formed with a substantially bottomed cylindrical shape, having a base portion 6102 in which the rotating portion 6066 is detachably engaged through an engagement part 6100, and as described above, the drive section 6068 is affixed onto the base 4014 at the bottom surface thereof.

In addition, in the drive section 6068, the rotating portion 6066 is rotatably and axially supported by means of bearings 6104 (axial support means) arranged on an inner circumferential portion of the base portion 6102, and at an inside center portion of the base portion 6102, a rotating portion drive motor 6069 is provided. An engagement hole 6070 of the rotating portion 6066 is engaged by a drive shaft 6069*a* of the rotating portion drive motor 6069 for driving rotation (turning) of the rotating portion 6066. The rotational position and rotational amount of the drive shaft 6069*a* can be detected by an encoder 6108 (second detection means), which is disposed around the circumferential surface of the drive shaft 6069*a*.

Further, seal members 6016 are disposed on upper portions of the bearings 6104. Such seal members 6016 are provided for the purpose of preventing cutting chips and cutting oil, when the workpiece W is processed, from entering from gaps at the engagement part 6100, and thereby from causing defects in the bearings 6104. Further, because the base portion 6102 is of a bottomed cylindrical shape, in conformity with the actions of the seal members 6016, cutting chips, cutting oil and the like do not get mixed into the encoder 6108, and erroneous operations, etc., of the encoder 6108 can be prevented.

As a result of the above, with the table 6010, the rotary drive motor 6090 constituting the linear moving means 6072 is directed under the control of the controller 4023, wherein by rotary driving of the ball screw 6078, the movable pin 6064 is moved to a predetermined position in the direction of the arrow A in FIG. 66. As a result, the distance L (see FIG. 65) between the fixed pin 6062 and the movable pin 6064 can be matched with the pitch of two reference holes Wa, Wb of the workpiece W, which serve to position the workpiece W, and the workpiece W can be loaded onto the mounting base 6021 in a properly positioned condition (see FIGS. 69, 70A and 70B). Further, under control of the controller 4023, the table surface 6010*a* also is rotated by effecting rotation of the rotating portion 6066 by the rotating portion drive motor 6069 of the drive section 6068, whereby the workpiece W can be made to confront the tool Ta at a desired posture.

In this manner, on the table 6010, by changing the desired distance between the fixed pin 6062 and the movable pin 6064 corresponding to the positions (pitch) of the reference holes Wa, Wb of the workpiece W, the workpiece W can easily be positioned and loaded on top of the mounting base 6021. Furthermore, by the rotating portion 6066, the workpiece W, which is positioned and loaded on top of the table surface 6010*a*, can easily be moved rotatably into a desired posture. Accordingly, through use of the table 6010, a complex configuration such as that of the aforementioned conventional structure is not used, and with a simple structure made up of the drive section 6068 comprising the linear moving means 6072 and a rotating means, workpieces of various shapes can be positioned easily at desired postures.

Moreover, as described above, in the table 6010, the rotating portion 6066 and the drive section 6068 are easily detachable through the engagement part 6100. Owing thereto, the rotating portion 6066 and the drive section 6068 can be separated, and a simple and lightweight rotating portion 6066 without carrying the driving component may be used as a transporting pallet that positions and fixes the workpiece W for transporting the workpiece W. Further, a plurality of such rotating portions 6066 serving as pallets may be prepared, whereby workpieces W can be exchanged by exchanging as necessary the pallets with respect to the drive section 6068.

Next, based on the flowchart of FIG. 68, explanations shall be made concerning exemplary operations for a case in which processing is carried out on a concerned processing surface 6110 on a workpiece W (see FIGS. 45 and 70A), by means of the machine tool 6012 equipped with the table 6010 constructed basically as described above.

First, in step S201, under control of the controller 4023, the rotary drive motor 6090 of the linear moving means 6072 is driven, whereupon by rotary driving of the ball screw 6078, the movable pin 6064 is moved linearly. In addition, rotation of the rotary drive motor 6090 is stopped at a predetermined position, that is, a position where the distance L (see FIG. 65) between the movable pin 6064 and the fixed pin 6062 matches the pitch of the reference holes Wa, Wb of the workpiece W.

As a result thereof, the movable pin 6064 and the fixed pin 6062 are affixed in positions that can position the workpiece corresponding to the positions of the reference holes Wa, Wb of the workpiece W. At this time, the position and movement amount of the movable pin 6064 is detected by the optical sensor 6098. Detection of the position of the movable pin 6064 is not limited to using an optical sensor 6098. For example, detection can be performed by providing a non-illustrated encoder on the drive axis of the rotary drive motor 6090. Further, detection can also be performed by providing the aforementioned non-illustrated linear encoder.

Figure 69:
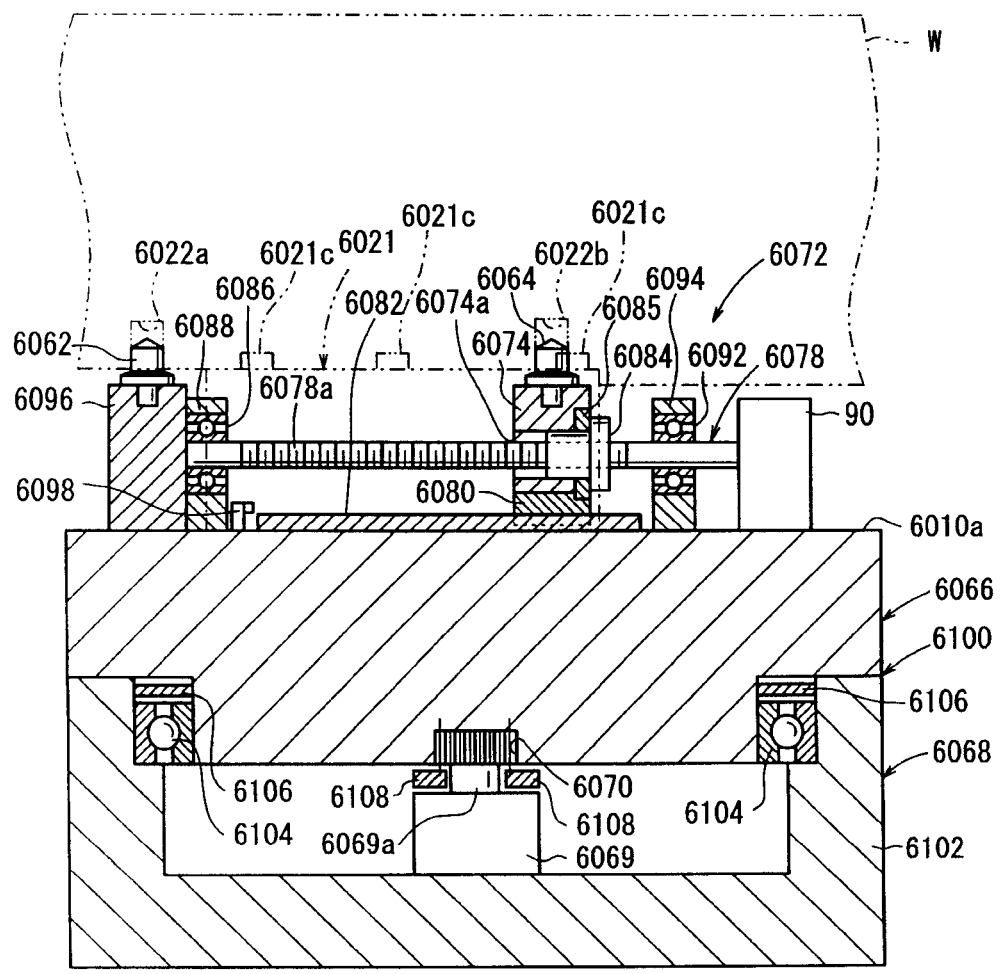
FIG. 69 is a partially omitted vertical cross sectional view for the purpose of explaining a condition in which a workpiece is positioned on a table in the machine tool according to the fifth embodiment.

Next, in step S202, as shown in FIG. 69, the movable pin 6064 and the fixed pin 6062 engage in the reference holes Wa, Wb of the workpiece W, and the workpiece W is mounted in a positioned state on the mounting base 6021.

Incidentally, with the table 6010 according to the fifth embodiment, as described previously, the movable member 6074, on which the movable pin 6064 projects, is supported elastically so as to be capable of moving flexibly in the axial direction by the elastic body 6085, while also being supported with high rigidity in the rotation direction (in a direction perpendicular to the aforementioned axial direction) of the table surface 6010a.

Owing thereto, by means of the table 6010, when the fixed pin 6062 and the movable pin 6064 are made to engage with respect to the reference holes Wa, Wb of the workpiece W, the movable pin 6064 moves flexibly in the axial direction. Accordingly, positioning of the workpiece W can be carried out, while pitch errors between the reference hole Wa and the reference hole Wb, or between the fixed pin 6062 and the movable pin 6064, are absorbed by such flexible movements of the movable pin 6064. Further, even in the case of errors in posture (e.g., a case in which the workpiece W becomes slightly tilted, or the like), which may occur when the workpiece W is introduced, by flexible movement of the movable pin 6064, generation of engagement defects (positioning defects) or the like can be prevented. Consequently, a situation in which positioning defects of the workpiece W are caused, resulting in overall operations of the machine tool 6012 being stopped, can be prevented.

Furthermore, on the table 6010, as described previously, the movable member 6074 is supported with high rigidity in the rotation direction of the table surface 6010a. Accordingly, with the table 6010, due to the highly rigid support in the rotation direction of the movable pin 6064, as well as secure supporting by the fixed pin 6062, positioning of the workpiece W can be performed highly accurately, even while pitch errors and the like are absorbed by elastically supporting the movable pin 6064 in the axial direction.

Figure 70A:
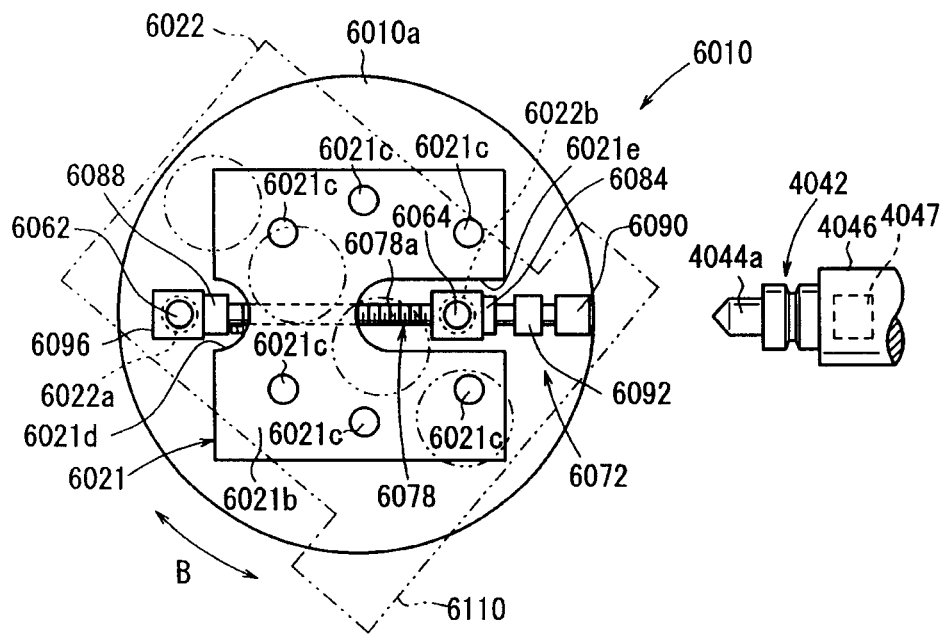
FIG. 70A is a plan view for the purpose of explaining a condition in which a workpiece is positioned on a table.

Incidentally, in the above-mentioned step S202, on the workpiece W, which is positioned and loaded on top of the table surface 6010a, for example, at the posture shown in FIG. 70A, the concerned processing surface 6110 to be processed does not confront the tool Ta installed in the spindle 4046. Accordingly, in such a condition, the processing of the concerned processing surface 6110 cannot be suitably carried out.

Consequently, next, in step S203, under control of the controller 4023, the rotating portion drive motor 6069 of the drive section 6068 of the table 6010 is driven, thereby rotary driving the table surface 6010a (rotating portion 6066). Stated otherwise, the workpiece W, which is positioned and affixed on top of the table surface 6010a, is rotated (in the arrow B direction of FIG. 70A).

Figure 70B:
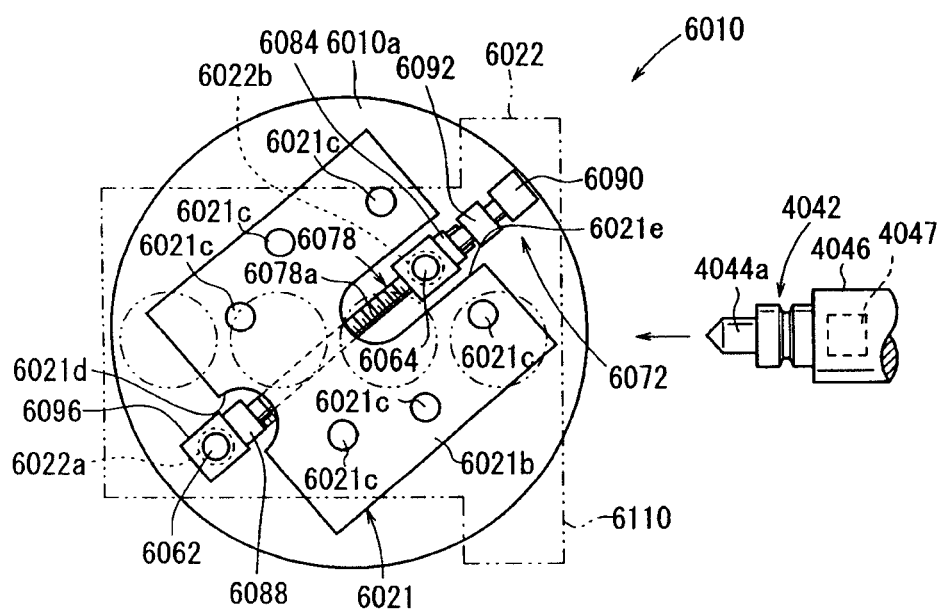
FIG. 70B is a plan view for the purpose of explaining a condition in which the table surface is rotated from the state of FIG. 70A, and the workpiece is placed in a desired processing posture.

In addition, as shown in FIG. 70B, the rotating portion drive motor 6069 is stopped at a position where the workpiece W acquires a desired posture, that is, a posture in which the concerned processing surface 6110 thereof confronts the spindle 4046 (tool Ta). Accordingly, the workpiece W is positioned at a desired posture for processing. At this time, detection of the rotary position and rotated amount of the workpiece W (rotating portion 6066) is performed by the encoder 6108 installed in the drive section 6068. Further, apart from a method using the encoder 6108, concerning detection of the rotary position and rotated amount of the workpiece W, for example, a sensor that detects the rotation amount of the table 6010 may be arranged in the vicinity of the table 6010, and detection can be performed thereby.

Next, in step S204, when processing is carried out this time, in the case it is judged that processing can be carried out using the tool Ta presently installed in the spindle 4046, next, step S206 is carried out. On the other hand, in the event it is judged that exchanging of the tool is necessary, next, step S205 is executed.

More specifically, in step S204, when it is determined that exchanging of the tool is necessary, step S205 is executed, whereby, first, the rotation arm 4052 of the tool exchanging unit 4020 is rotated, and the rotation arm 4052 is fixed at the position shown by the solid line in FIG. 46. At this time, by rotation of the first drive motor 4024, the second drive motor 4030, and the third drive motor 4034 in the spindle head unit 4018, the spindle unit 4016 is moved in X-axis, Y-axis, and Z-axis directions, and is stopped at a predetermined tool exchanging position.

In addition, when a predetermined gripping means 4058 on the rotation arm 4052 is opened and closed, and by moving the spindle unit 4016 in the X-axis direction or the like, a tool required for processing the workpiece, for example, the tool Tb, is assembled onto the spindle 4046 via the tool holder 4042.

Once again, by means of the spindle head unit 4018, the spindle unit 4016 is moved in X-axis, Y-axis, and Z-axis directions, and is stopped at a location where the tool Tb is adjacent to a processing position with respect to the workpiece W.

Additionally, in step S206, while the tool Tb (4044a) is driven and rotated by the spindle drive motor 4047, and the tool Tb (4044a) is moved in X-axis, Y-axis, and Z-axis directions by the spindle head unit 4018, predetermined processing is carried out on the workpiece W.

Thereafter, as may be necessary, when the table surface 6010a is rotated by the rotating portion drive motor 6069, while in a state with the workpiece W positioned on the table 6010 as is, the workpiece W is moved easily into a posture that enables a processing location thereof to be processed, and predetermined processing thereon is carried out.

In the foregoing manner, by means of the table 6010 and the machine tool 6012 equipped with such a table 6010 according to the fifth embodiment, a simplified structure is provided, in which axes that are position-controlled by the controller 4023 are made up from two axes, including the linear axis (A axis) of the linear moving means 6072, and the rotation axis (B axis) of the rotating portion 6066. Owing thereto, while the structure of the table 6010 is simplified and made lightweight, workpieces having various types and shapes can be positioned at desired postures. Further, the essential controls performed by the controller 4023 when positioning the workpiece W at a desired posture involve only position controls for the aforementioned two axes. Consequently, in the machine tool 6012, the control load on the controller 4023 can be significantly reduced.

In the fifth embodiment, when the fixed pin 6062 and the movable pin 6064 are each assembled detachably with respect to the fixed member 6096 and the movable member 6074, various types of fixed pins 6062 and movable pins 6064 can suitably be used corresponding to the shape and size of the reference holes Wa, Wb of the workpiece W.

Figure 71:
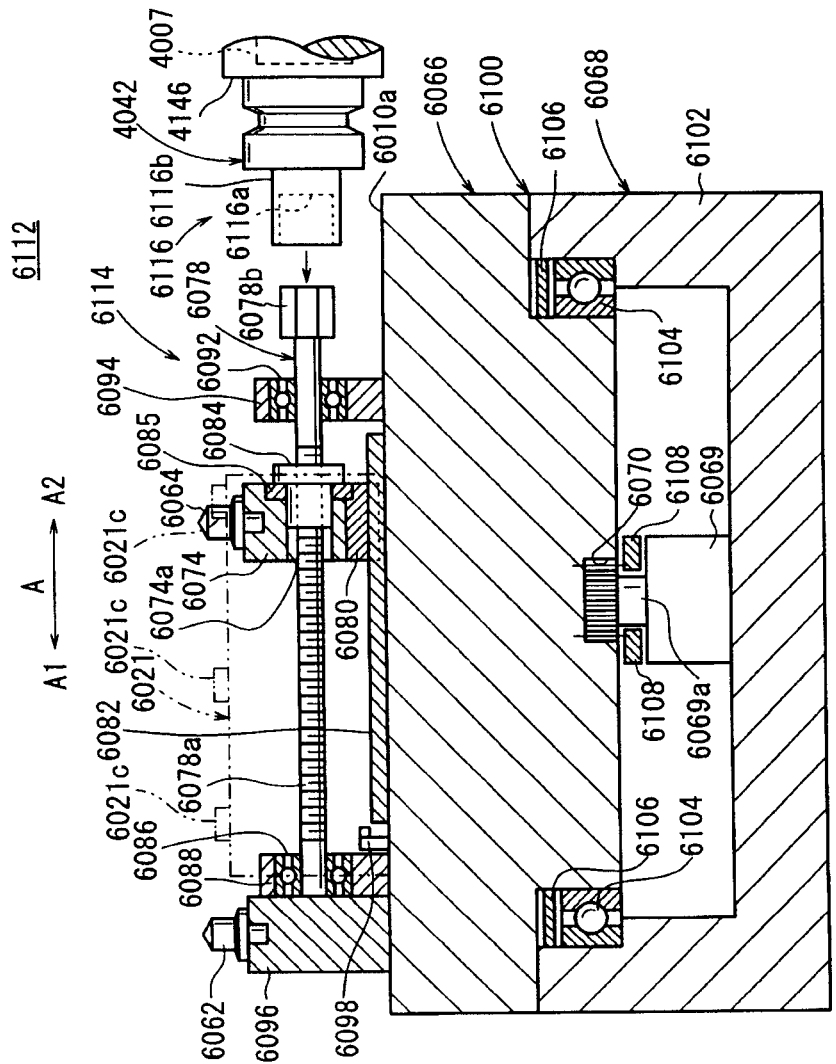
FIG. 71 is a vertical cross sectional view of a workpiece positioning table according to a first modified example of the fifth embodiment.
Figure 72:
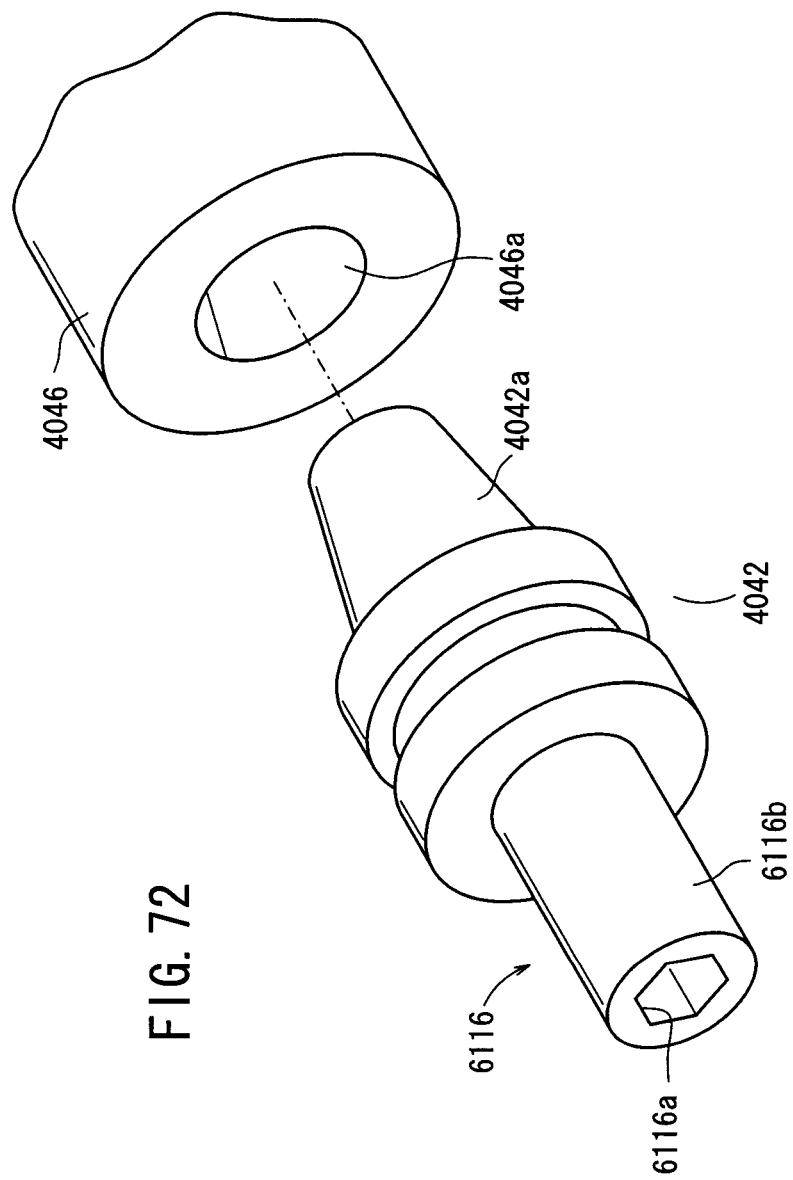
FIG. 72 is a partially omitted perspective view for the purpose of explaining a rotation tool used in the first modified example of the fifth embodiment.

Next, with reference to FIGS. 71 and 72, an explanation shall be given concerning a first modified example of the fifth embodiment. In FIGS. 71 and 72, the same reference numerals as those shown in FIGS. 61 to 70 indicate the same or similar structures, and therefore, as elements that offer identical or similar functions and effects, detailed explanations of such features have been omitted.

In the table 6112 (workpiece positioning table) according to the first modified example of the fifth embodiment, compared to the aforementioned table 6010, in place of the linear moving means 6072, a different linear moving means 6114 is provided.

As shown in FIG. 71, in the linear moving means 6114, the rotary drive motor 6090 used in the linear moving means 6072 is omitted, and on an end of the ball screw 6078 at the portion where the rotary drive motor 6090 was disposed, a head part 6078*b* is provided. Accordingly, when the movable pin 6064 on the table 6112 is moved, for example, a predetermined tool that engages with the head part 6078*b* is used, whereby the ball screw 6078 may be rotated manually.

With the linear moving means 6114, a rotation tool 6116 having a shape capable of engagement with the head part 6078*b* is installed in the spindle 4046 of the machine tool 6012, and by rotary driving of the rotation tool 6116 by the spindle drive motor 4047, movement of the movable pin 6064 can also be automated. In FIG. 72, a partially omitted perspective view of such a rotation tool 6116 is shown.

As shown in FIG. 72, the rotation tool 6116 is configured so as to be detachably assembled into an installation hole 4046*a* of the spindle 4046 via a mounting part 4042*a* of a tool holder 4042, and comprises an engagement part 6116*b* formed with a hole 6116*a* that engages with the head part 6078*b* of the ball screw 6078. The engagement part 6116*b* of the rotation tool 6116 is inserted and incorporated into the tool holder 4042 and made integral therewith, and by a non-illustrated positioning member, the engagement part 6116*b* and the tool holder 4042 are positioned together.

In addition, when the ball screw 6078 is rotary-driven using the rotation tool 6116, under control of the controller 4023, first, by means of a tool exchange operation as described in step S205 in the aforementioned embodiment, the rotation tool 6116 is installed onto the spindle 4046 via the tool holder 4042.

Next, by driving of the spindle 4046, the axial direction of the rotation tool 6116 and the axial direction of the ball screw 6078 are made to coincide (see FIG. 71). In addition, after the engagement part 6116*b* has engaged with the head part 6078*b* of the ball screw 6078, by rotating the rotation tool 6116 through the spindle drive motor 4047, the ball screw 6078 is rotary-driven, whereby moving (positioning) of the movable pin 6064 is performed.

In the foregoing manner, on the table 6112, as a result of the linear moving means 6114 not having a rotary drive motor 6090, the structure of the linear moving means 6114 can be even further simplified. Accordingly, compared to the table 6010, the table 6112 can be further simplified and made lighter in weight.

Figure 73:
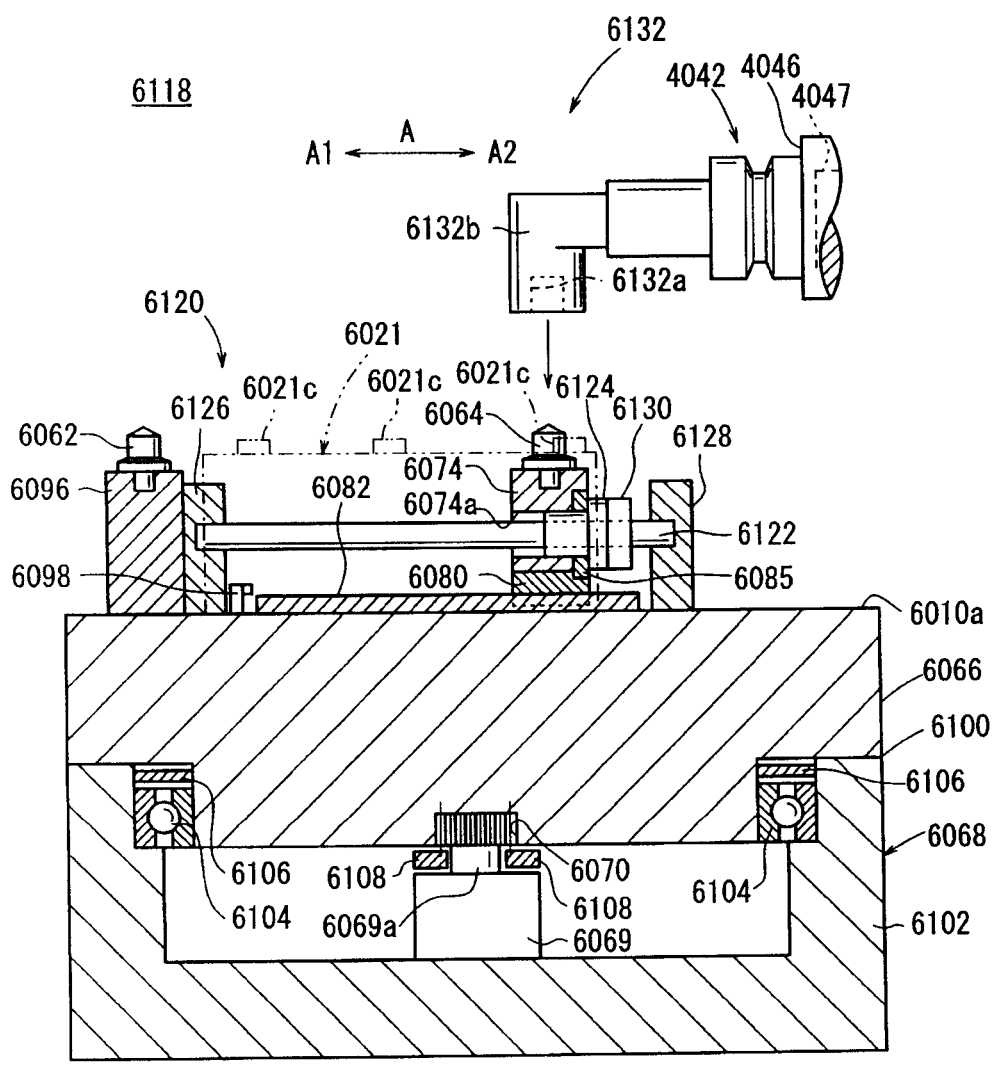
FIG. 73 is a vertical cross sectional view of a workpiece positioning table according to a second modified example of the fifth embodiment.

Next, with reference to FIGS. 73 and 56, an explanation shall be given concerning a second modified example of the fifth embodiment.

The table 6118 (workpiece positioning table) according to the second modified example of the fifth embodiment differs in that, compared to the aforementioned table 6010, in place of the linear moving means 6072, a linear slide means 6120 is provided.

As shown in FIG. 73, in the linear slide means 6120, a guide rod 6122 is provided in place of the ball screw 6078 used in the linear moving means 6072, and instead of the nut member 6084, a slide member 6124 is provided, through which the guide rod 6122 penetrates in a slidable fashion.

The guide rod 6122 is formed in a rounded rod shape, both ends of which are fixedly supported by supporting members 6126, 6128. Accordingly, the movable member 6074 (movable pin 6064) is slidable in the arrow A direction by means of the slide member 6124, the slider 6080, and the linear guide 6082.

Furthermore, a brake means 6130, which is capable of locking the slide member 6124 with respect to the guide rod 6122, is connected to the slide member 6124 of the linear slide means 6120. As the brake means 6130, any structure is suitable, which is capable of locking the slide member 6124 with respect to the guide rod 6122. For example, a structure may be used in which a non-illustrated brake pad is pressed and fixed with respect to the guide rod 6122 by means of expanding/contracting operations of a non-illustrated cylinder and cylinder rod.

On the table 6118, a movable pin 6064 (movable member 6074), which is configured so as to be capable of sliding and being locked with respect to the guide rod 6122, is moved linearly by a moving tool 5044 (see FIG. 56) that is installed in the spindle 4046, and further which is capable of engagement with the movable pin 6064.

In addition, when the movable pin 6064 is moved using the moving tool 5044, under operations of the controller 4023, first, by means of the tool exchanging operations described in relation to step S205 in the aforementioned embodiments, the moving tool 5044 is installed onto the spindle 4046 through the tool holder 4042.

Next, by moving the spindle 4046, the axial direction of the hole 5044*a* of the moving tool 5044 and the axial direction of the movable pin 6064 are made to coincide (see FIG. 73). In addition, after the hole 5044*a* and the movable pin 6064 have engaged with each other, the movable pin 6064 is moved by moving the spindle unit 4016 in the direction of the arrow A in FIG. 73, whereby movement (positioning) of the movable pin 6064 is carried out. When the movable pin 6064 has been moved to a predetermined position, by means of the controller 4023, the brake means 6130 is driven, and the position of the movable pin 6064 is reliably fixed in place.

In the foregoing manner, on the table 6118, as a result of the linear slide means 6120 not possessing the rotary drive motor 6090 or the bearings 6086, 6092, the structure of the linear slide means 6120 can be further simplified. Accordingly, compared to the table 6010, the table 6118 can be simplified and made lighter in weight.

For example, as workpieces that are positioned on the above tables 6010, 6112 and 6118, naturally the invention is not limited to the workpiece W, and positioning and processing of workpieces having a large variety of shapes is possible. Further, as a method for positioning the workpiece W, in place of the reference holes Wa, Wb being provided in the workpiece W for engagement with the fixed pin 6062 and the movable pin 6064 as described in the above embodiments, projecting members (pins) may be provided respectively on the workpiece W, whereby positioning may be accomplished by forming respective concave holes on each of the tables 6010, 6112 and 6118.

Further, the rotation tool 6116 is considered adequate so long as it is capable of rotating the ball screw 6078, and similarly, the moving tool 5044 is adequate so long as it is capable of moving the movable pin 6064.

Furthermore, it is a matter of course that the invention is not limited to the spindle head unit 4018 and the tool exchanging unit 4020 used in the machine tool 6012 of the above embodiments. Further, movement in three dimensions of the spindle 4046 of the spindle unit 4016 is not limited to a Cartesian coordinate system configuration in accordance with the aforementioned X-axis, Y-axis and Z-axis system. Control may also be carried out using a polar coordinate system configuration including a rotational axis.

Still further, the drive section 6068 in the tables 6010, 6112 and 6118 is adequate, so long as it is capable of rotating the rotating portion 6066. For example, the base portion 6102 need not necessarily be provided, and a structure may also be used in which a direct rotating portion drive motor 6069 is arranged on the base 4014.

The invention claimed is:

1. A machine tool comprising:
    a machine platen;
    a Z table provided on the machine platen and slidably movable only in a Z direction relative to the machine platen, the Z direction forming one direction in a horizontal plane;
    a supporting body disposed on the Z table and which is slidably movable only in a vertical direction relative to the Z table, the supporting body having a front surface side disposed to face a workpiece;
    a rotation arm rotatably supported on the front surface side of the supporting body, the rotation arm rotatable 360 degrees about a horizontal rotation arm axis that extends in the Z direction;
    an arm drive source for rotating the rotation arm;
    a processing spindle rotatably supported on the rotation arm at a position distanced from the rotation arm axis, the processing spindle extending in the Z direction from the rotation arm, and the processing spindle rotatably supported with respect to the rotation arm so as to be rotatable relative to the rotation arm about a horizontal processing spindle axis that extends in the Z direction, the horizontal processing spindle axis being parallel with and spaced from the horizontal rotation arm axis; and
    a spindle drive source for rotating the processing spindle,
    wherein the machine tool is free of a mechanism that moves any of the Z table, the supporting body, and the arm drive source in an X direction that forms another direction in the horizontal plane and is perpendicular to the Z direction.

2. The machine tool according to claim 1, wherein the rotation arm axis and a spindle drive axis of the spindle drive source are at a same position in the vertical direction.

3. The machine tool according to claim 2, wherein:
    the arm drive source comprises a hollow arm motor and is disposed on the supporting body, the hollow arm motor being rotatable about the rotation arm axis;
    the spindle drive source is connected with the processing spindle through a power transmission member that penetrates through the hollow arm motor for transmitting power, the power transmission member including a power transmission shaft disposed in the hollow arm motor, the power transmission shaft being rotatable about the spindle drive axis, and the spindle drive source is disposed on a back surface side of the supporting body opposite to the front surface side of the supporting body; and
    the rotation arm axis is coaxial with the spindle drive axis.

4. The machine tool according to claim 3, wherein the power transmission shaft includes a proximal end adjacent to the back surface side of the supporting body and a distal end adjacent to the front surface side of the supporting body, the power transmission member further includes a pulley mechanism connecting the distal end of the power transmission shaft to the processing spindle, the pulley mechanism configured to transfer a rotation of the power transmission shaft about the spindle drive axis to a rotation of the processing spindle about the processing spindle axis.

5. The machine tool according to claim 1, further comprising an automated tool exchange mechanism equipped with a rotating magazine in which a plurality of tools that are attachable and detachable on the processing spindle are stored, the rotating magazine rotatable about a rotating magazine axis that extends in the Z direction,
    wherein the rotation arm axis and the rotating magazine axis are aligned along the vertical direction.

6. The machine tool according to claim 1, wherein a movable distance of the supporting body in the vertical direction is 1.7 to 20.0 times a distance from the rotation arm axis to the processing spindle.

7. The machine tool according to claim 1, wherein a movable distance of the supporting body in the vertical direction is 0.66 to 10.0 times a width of an equipment installation surface.

8. The machine tool according to claim 1, further comprising:
    a table equipped with fixing parts, which are movable in an unlocked state and which correspond to standard positioning parts of the workpiece; and
    a fixing part moving member which is capable of engagement with the fixing parts, and which is detachably installed on the processing spindle in place of the tool,
    wherein, at a time when the fixing part moving member is installed on the processing spindle and a lock of the fixing parts is unlocked, the fixing part moving member is made to engage with the fixing parts, and each of the fixing parts is moved corresponding to positions of the respective positioning parts, so as to position the workpiece at a predetermined posture.

9. The machine tool according to claim 1, further comprising an automated tool exchange mechanism equipped with a main stocker in which a plurality of tools that are attachable and detachable on the processing spindle are stored, wherein the rotation arm axis and an axis of rotation of the main stocker are aligned along the vertical direction.

10. The machine tool according to claim 9, further comprising a sub-stocker, which stores a plurality of tools therein and which is disposed on a side surface in the X direction perpendicular to the Z direction in the horizontal plane, the sub-stocker comprising:
- a retaining arm, in which the tools are retained pointing in the X direction;
- a tool delivery and exchange mechanism, for extracting one of the tools from the retaining arm, changing a direction of the extracted tool to a Z direction, and delivering the tool to the processing spindle; and
- an index mechanism for intermittently moving the retaining arm.

11. The machine tool according to claim 9, wherein the processing spindle directly carries out attachment and detachment of the tool with respect to the main stocker.

12. The machine tool according to claim 9, further comprising a sensor, which measures a length of the tool installed in the processing spindle.

13. The machine tool according to claim 1, wherein the supporting body is secured to the Z table and is slidably movable in the vertical direction along the Z table.

* * * * *